United States Patent
Cirik et al.

(10) Patent No.: US 12,108,478 B2
(45) Date of Patent: *Oct. 1, 2024

(54) DOWNLINK BEAM FAILURE RECOVERY

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Alireza Babaei, Fairfax, VA (US); Hyoungsuk Jeon, Centreville, VA (US); Kyungmin Park, Vienna, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,952

(22) Filed: Apr. 27, 2022

(65) Prior Publication Data

US 2022/0264688 A1    Aug. 18, 2022

Related U.S. Application Data

(63) Continuation of application No. 16/354,752, filed on Mar. 15, 2019, now Pat. No. 11,490,442, which is a
(Continued)

(51) Int. Cl.
*H04W 76/19* (2018.01)
*H04B 7/06* (2006.01)
(Continued)

(52) U.S. Cl.
CPC .......... *H04W 76/19* (2018.02); *H04B 7/0695* (2013.01); *H04B 7/088* (2013.01);
(Continued)

(58) Field of Classification Search
CPC .. H04B 17/17; H04B 17/318; H04B 17/0695; H04B 17/088; H04B 7/0695;
(Continued)

(56) References Cited

U.S. PATENT DOCUMENTS 9,125,218 B2    9/2015   Chang
9,736,795 B2    8/2017   Dinan
(Continued)

FOREIGN PATENT DOCUMENTS

CN    108809580 A    11/2018
EP      3397015 A1    10/2018
(Continued)

OTHER PUBLICATIONS

Apr. 15, 2019—Extented European Search Report—EP 19150964.5.
(Continued)

*Primary Examiner* — Stephen J Clawson
(74) *Attorney, Agent, or Firm* — Banner & Witcoff, Ltd.

(57) ABSTRACT

Systems, apparatuses, and methods are described for beam (or any other communication resource) failure recovery in wireless communications. A wireless device may determine if only a subset of serving beams have failed, and may perform beam failure recovery using an uplink channel resource for beam failure recovery associated with the failed serving beam(s).

30 Claims, 54 Drawing Sheets

Related U.S. Application Data continuation of application No. 16/243,714, filed on Jan. 9, 2019, now Pat. No. 10,863,570.

(60) Provisional application No. 62/615,277, filed on Jan. 9, 2018, provisional application No. 62/615,269, filed on Jan. 9, 2018.

(51) Int. Cl.

| | |
|---|---|
| *H04B 7/08* | (2006.01) |
| *H04B 17/17* | (2015.01) |
| *H04B 17/318* | (2015.01) |
| *H04W 24/10* | (2009.01) |
| *H04W 72/044* | (2023.01) |
| *H04W 72/0446* | (2023.01) |
| *H04W 72/23* | (2023.01) |
| *H04W 74/0833* | (2024.01) |

(52) U.S. Cl.
 CPC ........... *H04B 17/17* (2015.01); *H04B 17/318* (2015.01); *H04W 24/10* (2013.01); *H04W 72/0446* (2013.01); *H04W 72/046* (2013.01); *H04W 72/23* (2023.01); *H04W 74/0833* (2013.01)

(58) Field of Classification Search
 CPC .... H04B 7/088; H04W 24/10; H04W 72/042; H04W 72/0446; H04W 72/046; H04W 72/0833; H04W 72/23; H04W 74/0833
 See application file for complete search history.

(56) References Cited

U.S. PATENT DOCUMENTS

| | | | |
|---|---|---|---|
| 9,949,298 | B1 | 4/2018 | Akoum et al. |
| 10,091,662 | B1 | 10/2018 | Bendlin et al. |
| 10,230,447 | B2 | 3/2019 | Nagaraja et al. |
| 11,122,642 | B2 | 9/2021 | Zhou et al. |
| 2002/0044531 | A1 | 4/2002 | Cooper et al. |
| 2007/0197251 | A1 | 8/2007 | Das et al. |
| 2010/0279700 | A1 | 11/2010 | Kim et al. |
| 2012/0275405 | A1* | 11/2012 | Kim ................ H04L 5/0053 370/329 |
| 2013/0039345 | A1 | 2/2013 | Kim et al. |
| 2013/0188580 | A1 | 7/2013 | Dinan |
| 2013/0250828 | A1 | 9/2013 | Chou et al. |
| 2015/0189574 | A1 | 7/2015 | Ng et al. |
| 2015/0208462 | A1 | 7/2015 | Lee et al. |
| 2015/0282122 | A1 | 10/2015 | Kim |
| 2015/0365921 | A1 | 12/2015 | Wu |
| 2017/0149480 | A1 | 5/2017 | Kakishima et al. |
| 2017/0195998 | A1 | 7/2017 | Zhang et al. |
| 2017/0207843 | A1 | 7/2017 | Jung et al. |
| 2017/0237477 | A1 | 8/2017 | Fujio et al. |
| 2017/0302355 | A1 | 10/2017 | Islam et al. |
| 2017/0303265 | A1 | 10/2017 | Islam et al. |
| 2017/0332406 | A1 | 11/2017 | Islam et al. |
| 2017/0339662 | A1 | 11/2017 | Lin et al. |
| 2017/0373731 | A1 | 12/2017 | Guo et al. |
| 2018/0006770 | A1 | 1/2018 | Guo et al. |
| 2018/0054348 | A1 | 2/2018 | Luo et al. |
| 2018/0054382 | A1 | 2/2018 | Luo et al. |
| 2018/0054783 | A1 | 2/2018 | Luo et al. |
| 2018/0054811 | A1 | 2/2018 | Luo et al. |
| 2018/0054812 | A1 | 2/2018 | Luo et al. |
| 2018/0054832 | A1 | 2/2018 | Luo et al. |
| 2018/0083753 | A1 | 3/2018 | Nagaraja et al. |
| 2018/0098334 | A1 | 4/2018 | Tie et al. |
| 2018/0110066 | A1 | 4/2018 | Luo et al. |
| 2018/0115940 | A1 | 4/2018 | Abedini et al. |
| 2018/0115990 | A1 | 4/2018 | Abedini et al. |
| 2018/0124687 | A1 | 5/2018 | Park et al. |
| 2018/0132245 | A1 | 5/2018 | Yerramalli et al. |
| 2018/0132266 | A1 | 5/2018 | Chen et al. |
| 2018/0138962 | A1* | 5/2018 | Islam .................. H04B 7/0695 |
| 2018/0176958 | A1 | 6/2018 | Islam et al. |
| 2018/0191422 | A1 | 7/2018 | Xia et al. |
| 2018/0199226 | A1 | 7/2018 | Tsai et al. |
| 2018/0219604 | A1 | 8/2018 | Lu et al. |
| 2018/0220448 | A1 | 8/2018 | Akkarakaran et al. |
| 2018/0227899 | A1 | 8/2018 | Yu et al. |
| 2018/0234960 | A1 | 8/2018 | Nagaraja et al. |
| 2018/0241452 | A1 | 8/2018 | Akkarakaran et al. |
| 2018/0242158 | A1 | 8/2018 | Tang |
| 2018/0249453 | A1 | 8/2018 | Nagaraja et al. |
| 2018/0270698 | A1 | 9/2018 | Babaei et al. |
| 2018/0270699 | A1 | 9/2018 | Babaei et al. |
| 2018/0270700 | A1 | 9/2018 | Babaei et al. |
| 2018/0278310 | A1 | 9/2018 | Lee et al. |
| 2018/0279150 | A1 | 9/2018 | He et al. |
| 2018/0279193 | A1 | 9/2018 | Park et al. |
| 2018/0279229 | A1 | 9/2018 | Dinan et al. |
| 2018/0288756 | A1* | 10/2018 | Xia .................. H04W 72/0453 |
| 2018/0302889 | A1 | 10/2018 | Guo et al. |
| 2018/0310321 | A1 | 10/2018 | Basu Mallick et al. |
| 2018/0317123 | A1 | 11/2018 | Chen et al. |
| 2018/0323856 | A1 | 11/2018 | Xiong et al. |
| 2018/0324723 | A1 | 11/2018 | Akkarakaran et al. |
| 2018/0324867 | A1 | 11/2018 | Basu Mallick et al. |
| 2018/0343653 | A1 | 11/2018 | Guo |
| 2018/0351611 | A1 | 12/2018 | Nagaraja et al. |
| 2018/0367374 | A1 | 12/2018 | Liu et al. |
| 2018/0368126 | A1 | 12/2018 | Islam et al. |
| 2018/0368142 | A1 | 12/2018 | Liou |
| 2019/0028174 | A1 | 1/2019 | Chakraborty et al. |
| 2019/0037423 | A1 | 1/2019 | Yu et al. |
| 2019/0037498 | A1 | 1/2019 | Tseng et al. |
| 2019/0053288 | A1 | 2/2019 | Zhou et al. |
| 2019/0059129 | A1 | 2/2019 | Uo et al. |
| 2019/0074882 | A1 | 3/2019 | Zhou et al. |
| 2019/0075600 | A1 | 3/2019 | Kwon et al. |
| 2019/0141592 | A1 | 5/2019 | Park et al. |
| 2019/0173740 | A1 | 6/2019 | Zhang et al. |
| 2019/0200248 | A1 | 6/2019 | Basu Mallick et al. |
| 2019/0230529 | A1 | 7/2019 | Sadiq et al. |
| 2019/0230545 | A1 | 7/2019 | Liou et al. |
| 2019/0245737 | A1 | 8/2019 | Zhou et al. |
| 2019/0268893 | A1 | 8/2019 | Tsai et al. |
| 2019/0306875 | A1 | 10/2019 | Zhou et al. |
| 2020/0120714 | A1 | 4/2020 | Wang et al. |
| 2020/0366339 | A1* | 11/2020 | Gao .................. H04B 7/088 |
| 2020/0389223 | A1 | 12/2020 | Guan et al. |
| 2021/0204346 | A1* | 7/2021 | Ye .................. H04B 7/00 |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |

(56) References Cited

FOREIGN PATENT DOCUMENTS

| | | |
|---|---|---|
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |
| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R1-1708678 3GPP TSG-RAN WG1 #89, Hangzhou, China, May 15-19, 2017, Source: Ericsson, Title: Beam failure recovery mechanism.

R2-1707001 3GPP TSG-RAN WG2 Meeting #AH, Qingdao, China, Jun. 27-29, 2017, Source: Lenovo, Motorola Mobility, Title: Random access procedure for beam recovery request.

R1-17111617 3GPP TSG RAN WG1 NR AH#2, Qingdao, China, Jun. 27-30, 2017, Source: CATT, Title: RACH power control and power ramping procedure (revision of R1-1710034).

R1-1711161 3GPP TSG RAN WG1 NR#2, Qingdao, China, Jun. 27-30, 2017, Source: Qualcomm Incorporated, Title: Beam recovery procedures.

International Search Report and Written Opinion for PCT/US2018/046368 mailing date Dec. 13, 2018.

May 22, 2019—Extended European Search Report—19156175.2.

R2-1800560 3GPP TSG-RAN WG2 NR, Vancouver, Canada, Jan. 22-26, 2018, Source: Sharp, Title: Remaining Issues on beam failure recovery.

R2-1800632 3GPP TSG-RAN WG2 AH, Vancouver, Canada, Jan. 22-26, 2018, Source: Huawei, HiSilicon, Title: Remaining issue for beam failure recovery.

R2-1801049 3GPP TSG-RAN WG2 AH, Vancouver, Canada, Jan. 22-26, 2018, Source: Huawei, HiSilicon, Title: Non-contention based random access for beam failure recovery in CA.

3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).

3GPP TS 38.213 V15.0.1 (Feb. 2018); Technical Specification; 3rd Generation Partnership Project; Technical Specification Group Radio Access Network; NR; Physical layer procedures for control (Release 15).

R2-1804475 3GPP TSG-RAN WG2 Meeting #101bis, Sanya, China, Apr. 16-20, 2018, Source: Spreadtrum Communications, Title: Beam Failure recovery on SCell.

May 14, 2019—European Extended Search Report—19157460.7.

R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).

3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).

3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).

3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).

3GPP TR 38.912 V14.0.0 (Mar. 2017), Technical Report, 3rd Generation Partnership Project; Technical Specification Group Radio Access Network; Study on New Radio (NR) Access Technology (Release 14).

R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).

R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).

R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).

R1-1709907 3GPP TSG RAN WG1 NR Ad-Hoc#2, Qingdao, China, Jun. 27-30, 2017, Source: Xinwei, Title: Discussion on Beam Failure Recovery.

R1-1709929 3GPP TSG RAN WG1 NR Ad Hoc Meeting, Qingdao, China, Jun. 27-30, 2017, Source: Huawei, HiSilicon, Title: General views on beam failure recovery.

R1-1710058 3GPP TSG RAN WG1 NR Ad-Hoc#2, Qingdao, China, Jun. 27-30, 2017, Source: CATT, Title: Considerations on DL beam failure and recovery.

R1-1710283 3GPP TSG RAN WG1 NR Ad-Hoc#2, Qingdao, China, Jun. 27-30, 2017, Source: LG Electronics, Title: Discussion on beam failure recovery.

R1-1710400 3GPP TSG RAN WG1 NR Ad-Hoc#2, Qingdao, China, Jun. 27-30, 2017, Source: Vivo, Title: Beam failure recovery procedure.

R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.

R1-1710810 3GPP TSG RAN WG1 AH_NR Meeting, Qingdao, China, Jun. 27-30, 2017, Source: MediaTek Inc., Title: Mechanism for flexible beam failure recovery.

R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.

R1-1711017 3GPP TSG RAN WG1 #89ah-NR, Qingdao, China, Jun. 27-30, 2017, Source: Ericsson, Title: Mechanism to recover from beam failure.

R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.

(56) References Cited

OTHER PUBLICATIONS

R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
Prach—Preamble Detection and Timing Advance Estimation for multi-UE in 3GPP LTE, 3GPP LTE Solutions, from www.mymowireless.com.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).
3gpp ts 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-1803362 3GPP TSG RAN WG1 Meeting #92, Athens, Greece, Feb. 26-Mar. 2, 2018, Source: MediaTek, Inc., Title: Summary on remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807481 3GPP TSG RAN WG2 Meeting #102, Busan, Korea, May 21-25, 2018, Source: Huawei, HiSilicon, Title: Remaining issues of temporary CQI reporting.
R2-1807584 3GPP TSG RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG-RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining Issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.

(56) References Cited

OTHER PUBLICATIONS

R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R1-1807210 3GPP TSG RAN WG1 Meeting #93, Busan, Korea, May 21-25, 2018, Source: ASUSTeK, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
Jan. 18, 2021—European Office Action—EP 19150964.5.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, Apr. 16-20, 2018, Source: Nokia, Nokia Shanghai Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG-RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.

(56) References Cited

OTHER PUBLICATIONS

R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, 2018, Source: ASUSTeK, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN. 1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.
R1-1704478 3GPP TSG RAN WG1 Meeting #88bis, Spokane, USA, Apr. 3-7, 2017, Source: Fujitsu, Title: Discussion on beam failure recovery procedure.
R1-1704723 3GPP TSG RAN WG1 Meeting #88bis, Spokane, USA, Apr. 3-7, 2017, Source: Intel Corporation, Title: Details for UL Beam Management.
R1-1704725 3GPP TSG RAN WG1 Meeting #88bis, Spokane, USA, Apr. 3-7, 2017, Source: Intel Corporation, Title: On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussion on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.

(56) References Cited

OTHER PUBLICATIONS

R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title: Beam Failure recovery.
R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated, Title: Beam recovery procedure.
R1-1716500 3GPP TSG RAN WG1 Meeting NR#3, Nagoya, Japan, 18-21, Sep. 2017, Source: Nokia, Nokia Shanghai Bell, Title Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.
R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT DOCOMO, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for AI 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAn WG2 #99, Berlin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTek, Title: Discussion on Beam Recover Request in NR.
R2-1800042 3GPP TSG-RAN WG2 AH, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.

(56) References Cited

OTHER PUBLICATIONS

R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: Ran WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, At&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.

(56) References Cited

OTHER PUBLICATIONS

R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
R2-1802554 3GPP TSG-RAN WG2 #101, Athens, Greece, Feb. 26-Mar. 2, 2018, Source: ASUSTeK, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: ink recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.

(56) References Cited

OTHER PUBLICATIONS

R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR peamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5QIs for URLLC.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.
R1-1716660 3GPP TSG RAN WG1 NR Ad-Hoc#3 Meeting, Nagoya, Japan, Sep. 18-21, 2017, Source: Sharp, Title: Discussion on mechanisms for beam failure recovery.
R1-1718434 3GPP TSG RAN WG1 Meeting 90bis, Prague, Czech Republic, Oct. 9-13, 2017, Source: Ericsson, Title: Basic beam recovery.
Aug. 18, 2023—European Search Report—EP App. No. 23153797.8

* cited by examiner

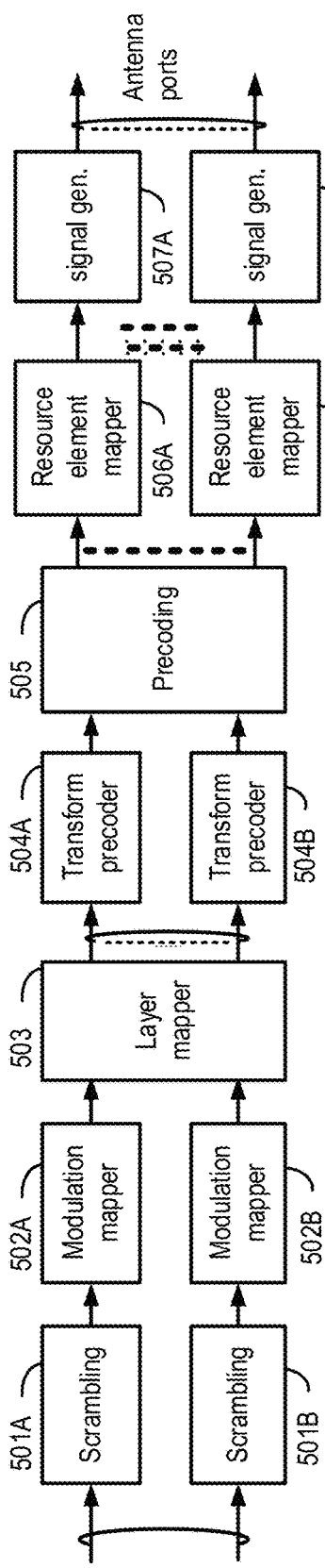
FIG. 5A Example uplink physical channel
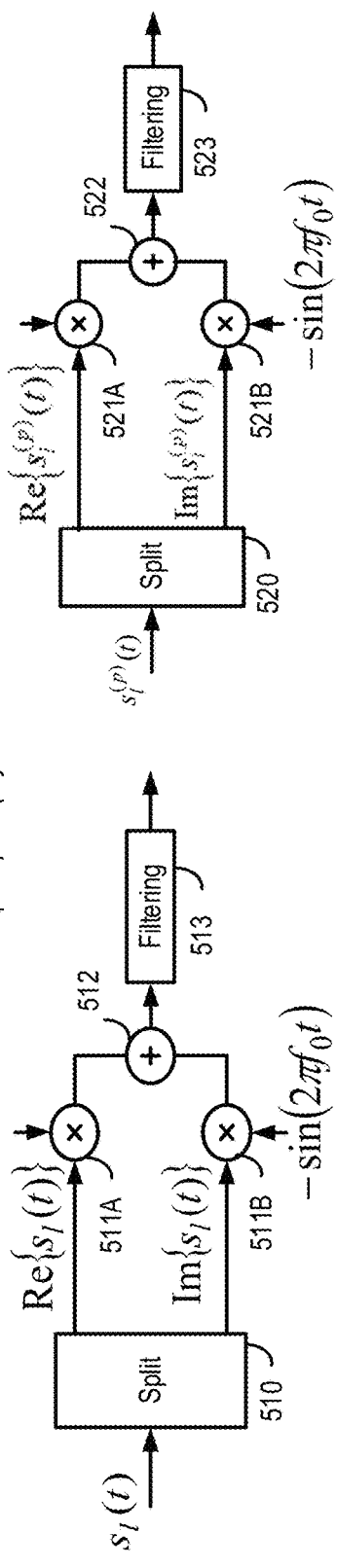
FIG. 5B Example uplink modulation
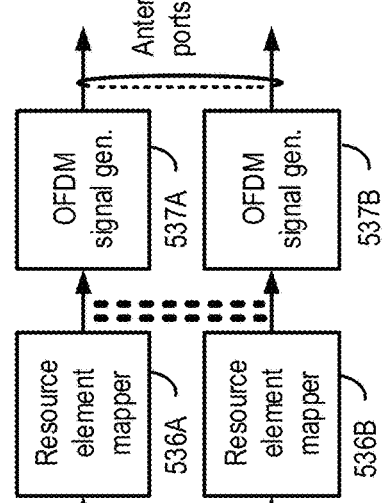
FIG. 5D Example downlink modulation
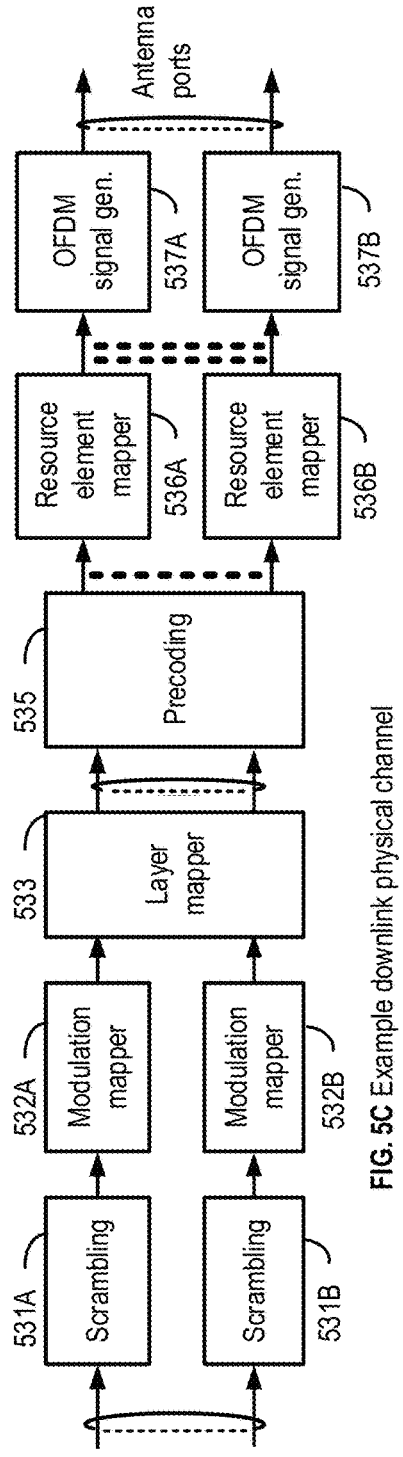
FIG. 5C Example downlink physical channel Dual-Connectivity- two MAC entities at UE side

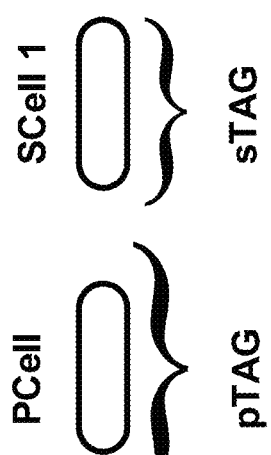
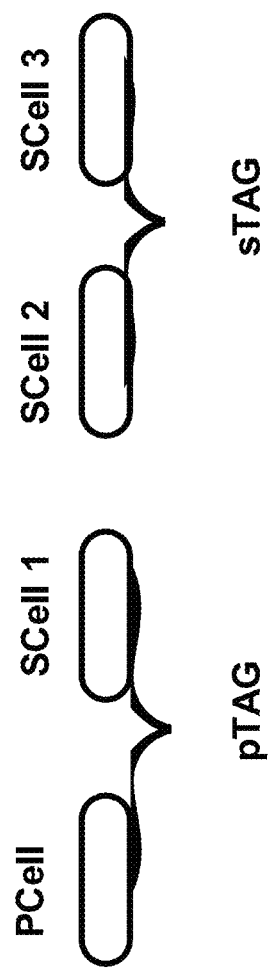
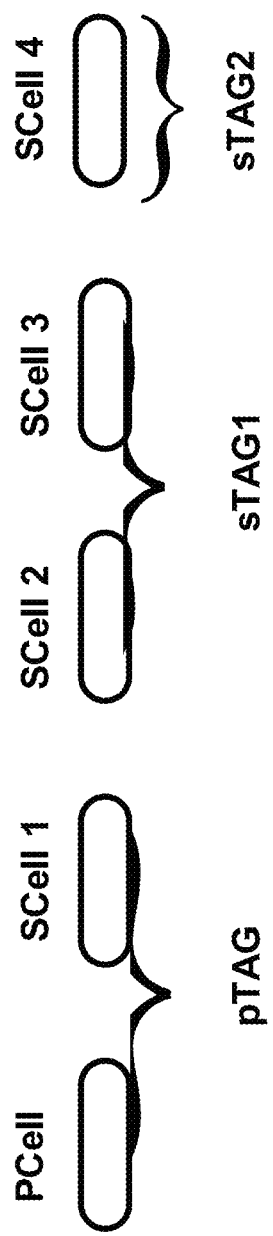
FIG. 8

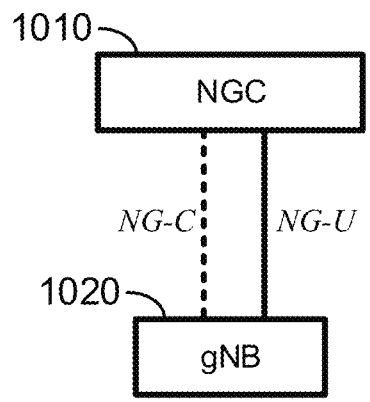
FIG. 10A gNB connected to NGC
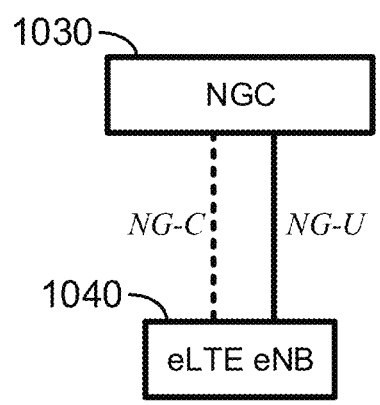
FIG. 10B eLTE eNB connected to NGC

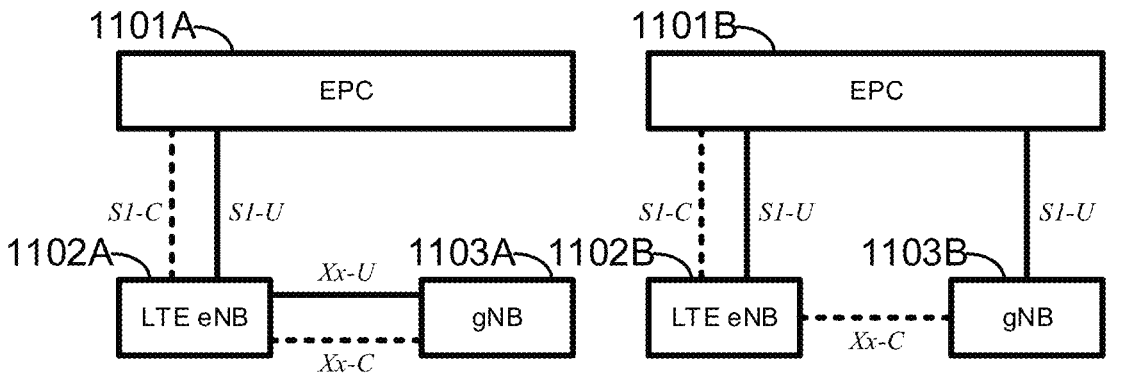

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

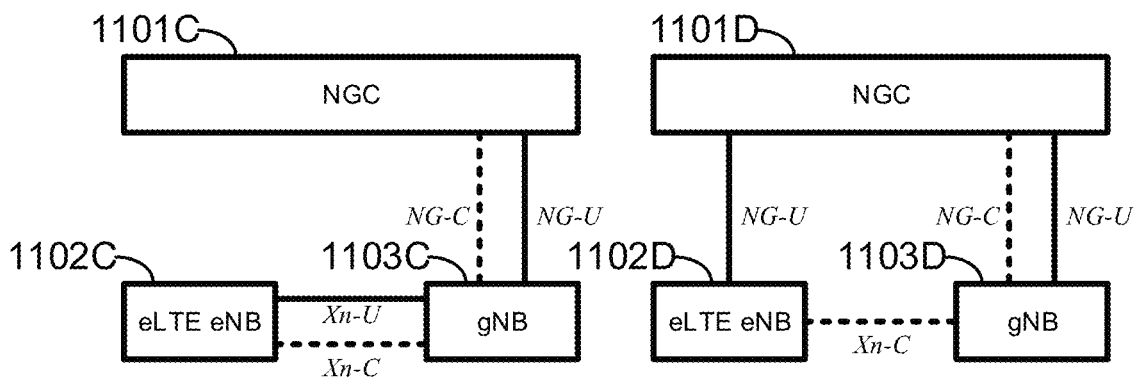

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

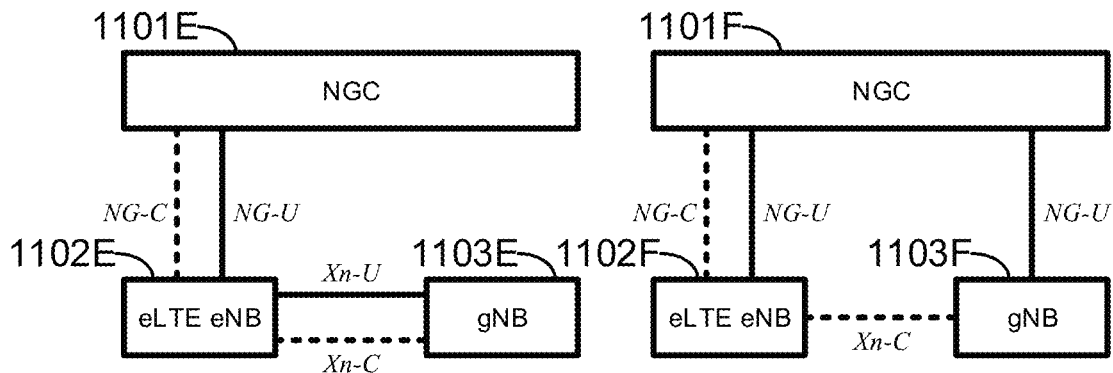

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

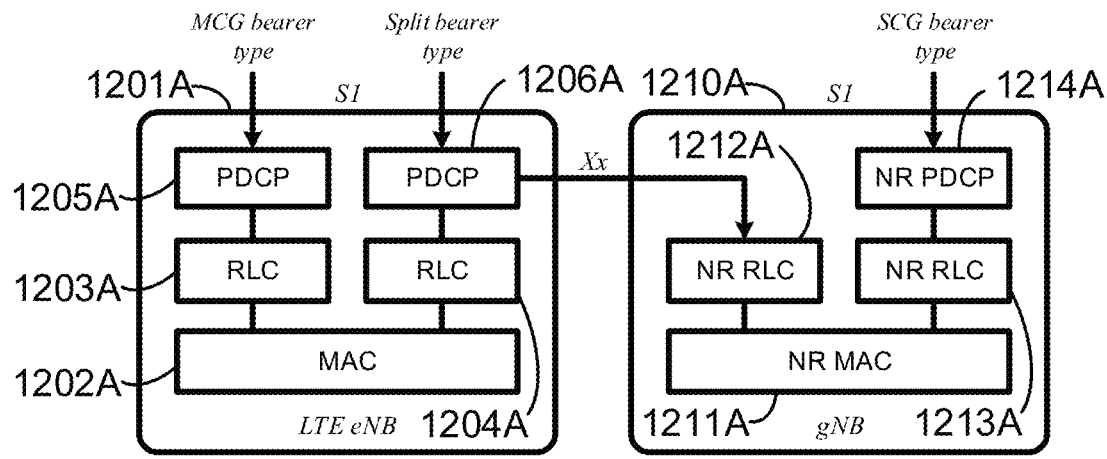
FIG. 12A  Radio protocol architecture for split bearer and SCG bearer. LTE eNB connected to EPC with non-standalone gNB.
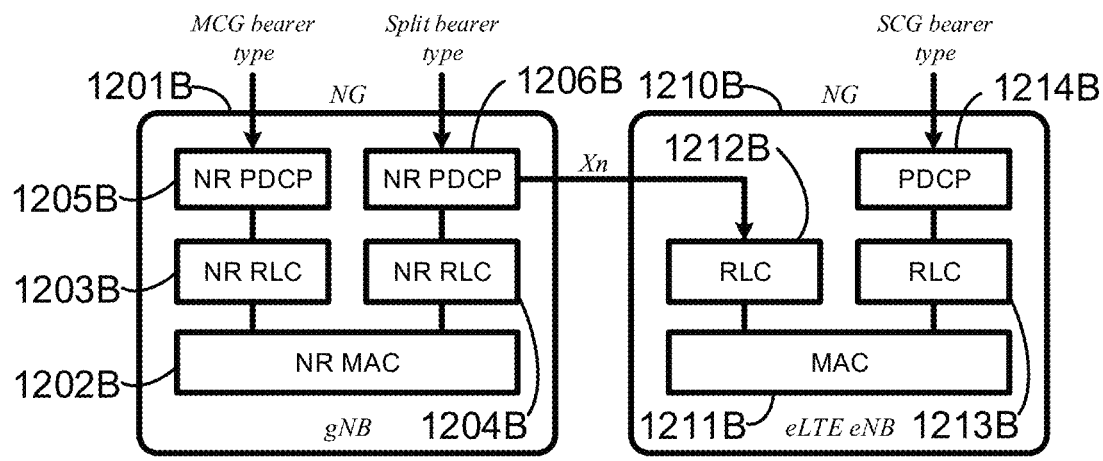
FIG. 12B  Radio protocol architecture for split bearer and SCG bearer. gNB connected to NGC with non-standalone eLTE eNB.
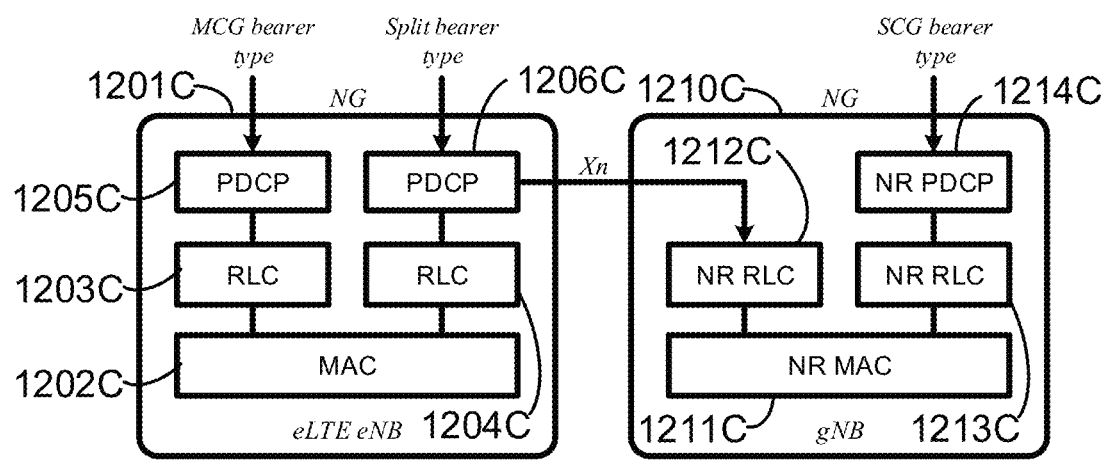
FIG. 12C  Radio protocol architecture for split bearer and SCG bearer. eLTE eNB connected to NGC with non-standalone gNB.

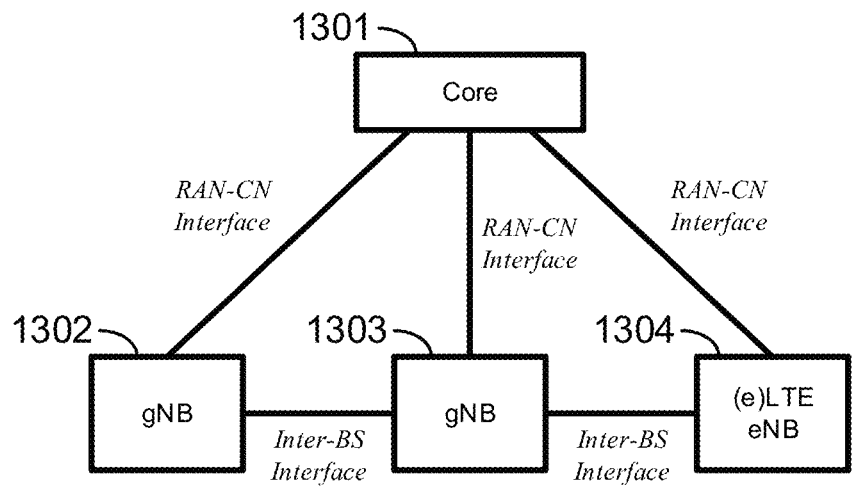
FIG. 13A Non-centralized deployment
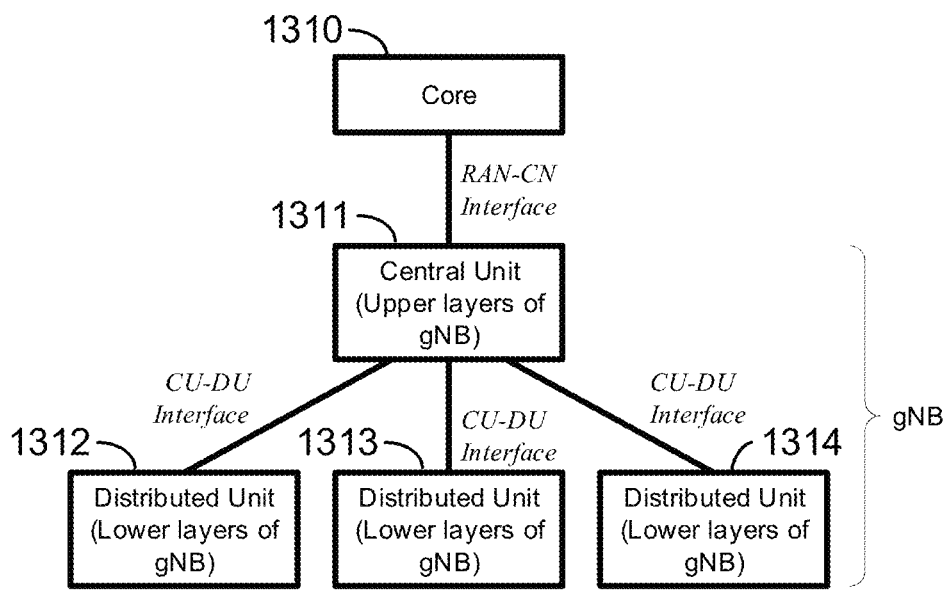
FIG. 13B Centralized deployment

| R | Timing Advance Command | | Oct 1 |
|---|---|---|---|
| Timing Advance Command | | UL Grant | Oct 2 |
| UL Grant | | | Oct 3 |
| UL Grant | | | Oct 4 |
| Temporary C-RNTI | | | Oct 5 |
| Temporary C-RNTI | | | Oct 6 |

MAC RAR

FIG. 18A

| R | Timing Advance Command | | Oct 1 |
|---|---|---|---|
| Timing Advance Command | | UL Grant | Oct 2 |
| UL Grant | | | Oct 3 |
| Temporary C-RNTI | | | Oct 4 |
| Temporary C-RNTI | | | Oct 5 |

MAC RAR for PRACH enhanced coverage level 2 or 3

FIG. 18B

| R | Timing Advance Command | | Oct 1 |
|---|---|---|---|
| Timing Advance Command | | UL Grant | Oct 2 |
| UL Grant | | | Oct 3 |
| UL Grant | | R | Oct 4 |
| Temporary C-RNTI | | | Oct 5 |
| Temporary C-RNTI | | | Oct 6 |

MAC RAR for NB-IoT UEs

FIG. 18C

| Value of CSI request field | Description |
|---|---|
| '000' | No aperiodic CSI report is triggered |
| '001' | Aperiodic CSI report is triggered for a 1$^{st}$ set of {CSI process, CSI-RS resource} configured by higher layers for serving cell $c$ |
| '010' | Aperiodic CSI report is triggered for a 2$^{nd}$ set of {CSI process, CSI-RS resource} configured by higher layers for serving cell $c$ |
| '011' | Aperiodic CSI report is triggered for a 3$^{rd}$ set of {CSI process, CSI-RS resource} configured by higher layers for serving cell $c$ |
| '100' | Aperiodic CSI report is triggered for a 4$^{th}$ set of {CSI process, CSI-RS resource} configured by higher layers for serving cell $c$ |
| '101' | Aperiodic CSI report is triggered for a 5$^{th}$ set of {CSI process, CSI-RS resource} configured by higher layers for serving cell $c$ |
| '110' | Aperiodic CSI report is triggered for a 6$^{th}$ set of {CSI process, CSI-RS resource} configured by higher layers for serving cell $c$ |
| '111' | Aperiodic CSI report is triggered for a 7$^{th}$ set of {CSI process, CSI-RS resource} configured by higher layers for serving cell $c$ |

FIG. 22

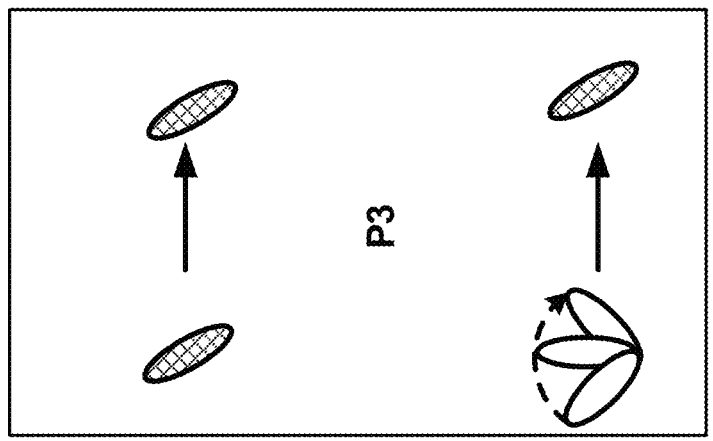
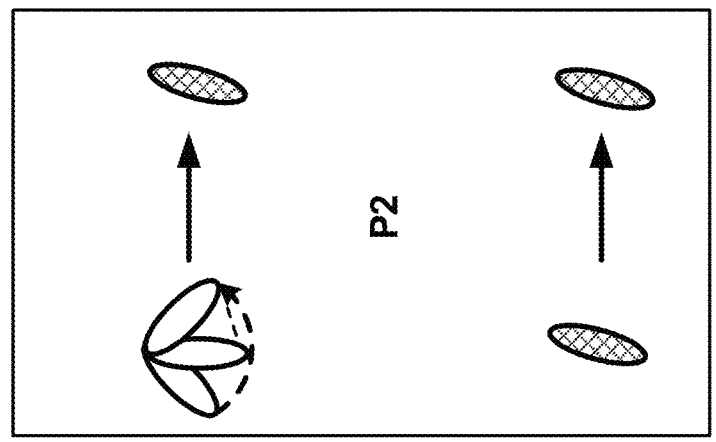
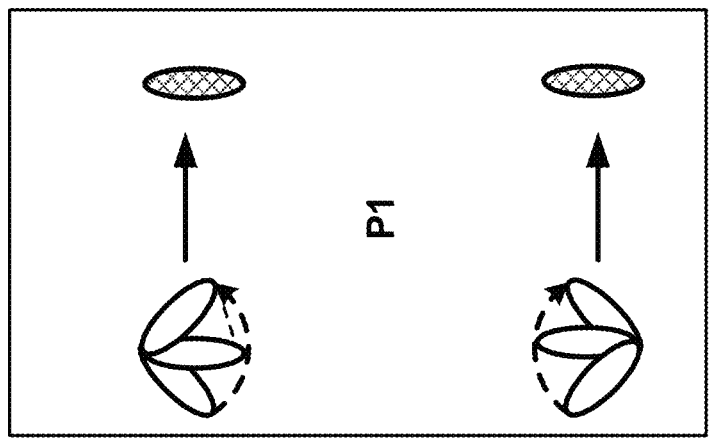
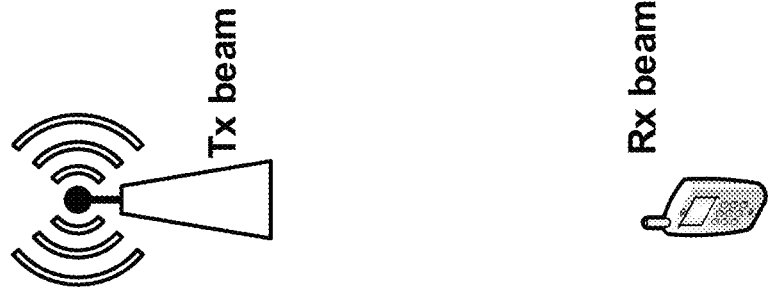
FIG. 24

Activation/Deactivation MAC Control Element with one oct

Activation/Deactivation MAC Control Element with 4 octs

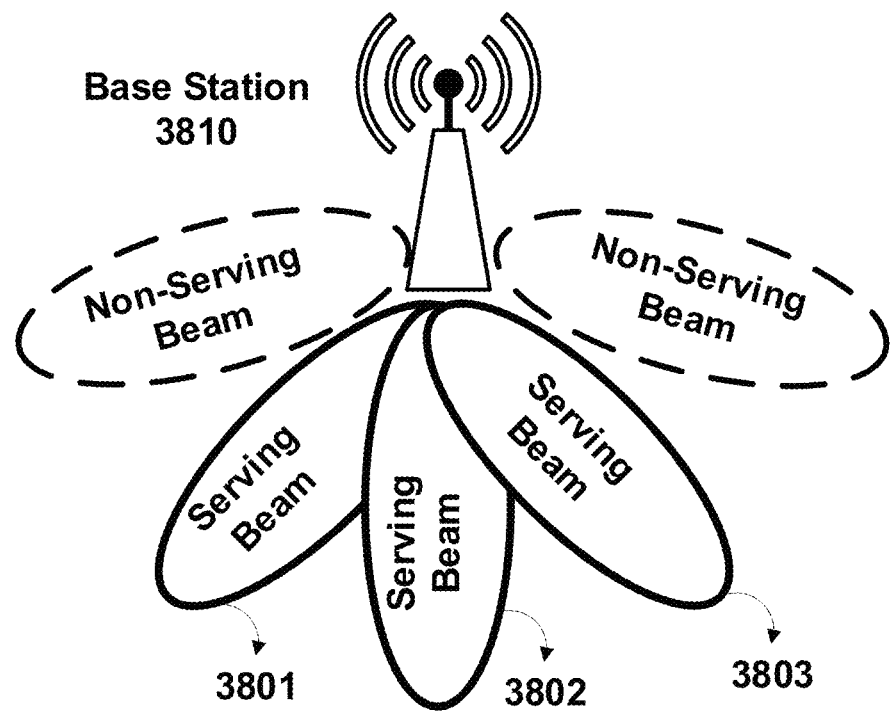

| Beam 3801 Status | Beam 3802 Status | Beam 3803 Status | Example Selection Scheme 3811 | Example Selection Scheme 3812 |
|---|---|---|---|---|
| Not failed | Not failed | Failed | $P_3$ on $T_1/F_1$ | $P_3$ on $T_2/F_2$ |
| Not failed | Failed | Not failed | $P_2$ on $T_1/F_1$ | $P_2$ on $T_3/F_3$ |
| Failed | Not failed | Not failed | $P_1$ on $T_2/F_2$ | $P_1$ on $T_3/F_3$ |
| Failed | Failed | Not failed | $P_3$ on $T_3/F_3$ | $P_3$ on $T_3/F_3$ |
| Failed | Not failed | Failed | $P_2$ on $T_2/F_2$ | $P_2$ on $T_2/F_2$ |
| Not failed | Failed | Failed | $P_1$ on $T_1/F_1$ | $P_1$ on $T_1/F_1$ |

FIG. 38

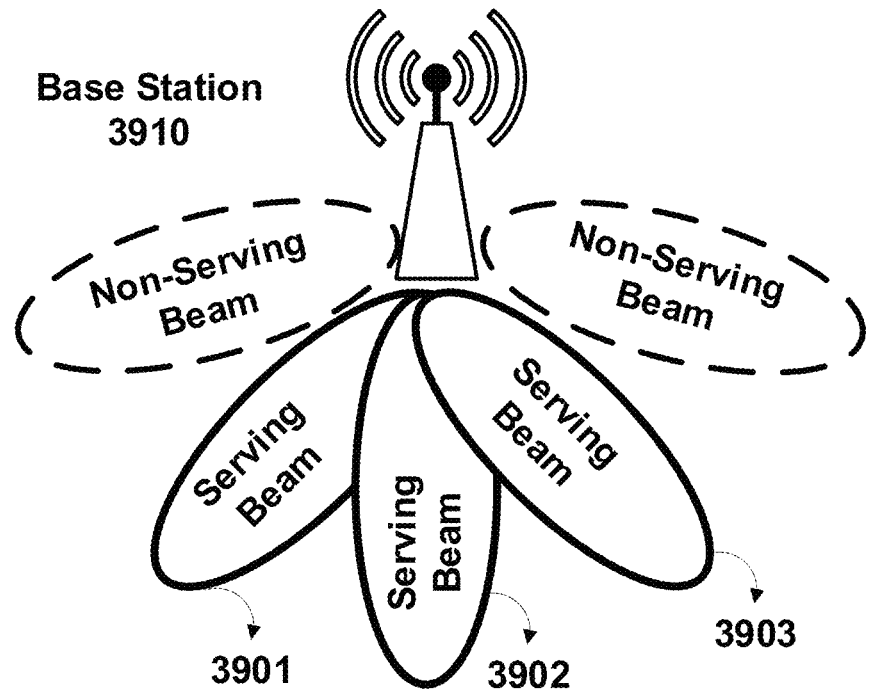

| Beam 3901 Status | Beam 3902 Status | Beam 3903 Status | Example Selection Scheme 3911 | Example Selection Scheme 3912 |
|---|---|---|---|---|
| Not failed | Not failed | Failed | $P_1$ on $T_3/F_3$ | $P_2$ on $T_3/F_3$ |
| Not failed | Failed | Not failed | $P_1$ on $T_2/F_2$ | $P_3$ on $T_2/F_2$ |
| Failed | Not failed | Not failed | $P_2$ on $T_1/F_1$ | $P_3$ on $T_1/F_1$ |
| Failed | Failed | Not failed | $P_3$ on $T_1/F_1$ | $P_3$ on $T_2/F_2$ |
| Failed | Not failed | Failed | $P_2$ on $T_1/F_1$ | $P_2$ on $T_3/F_3$ |
| Not failed | Failed | Failed | $P_1$ on $T_2/F_2$ | $P_1$ on $T_3/F_3$ |

FIG. 39

DOWNLINK BEAM FAILURE RECOVERY

CROSS-REFERENCE TO RELATED APPLICATIONS

This application is a continuation of U.S. application Ser. No. 16/354,752, filed on Mar. 15, 2019, which is a continuation of U.S. application Ser. No. 16/243,714, filed on Jan. 9, 2019 and now U.S. Pat. No. 10,863,570, which claims the benefit of U.S. Provisional Application No. 62/615,269, filed on Jan. 9, 2018, and U.S. Provisional Application No. 62/615,277, filed on Jan. 9, 2018. The above-reference applications are hereby incorporated by reference in their entireties.

BACKGROUND

In wireless communications, communication disruptions may occur. Interference that may cause an initial disruption, such as disconnection, may also prevent a reconnection. It is desired to improve wireless communications, including to improve reconnections, without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for communications associated with beam failure recovery. A wireless device may detect a beam failure (or any other wireless/communication resource failure). The wireless device may determine if only a subset of serving beams have failed. The wireless device may perform beam failure recovery on other serving beams that have not failed. If a beam failure recovery request is repeated, the wireless device may send the second request using a new beam a threshold distance, in time and/or frequency, from a beam used for the prior request.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

FIG. 18A, FIG. 18B, and FIG. 18C show example diagrams of a MAC RAR format of an example MAC RAR comprising a timing advance command, uplink (UL) grant, and temporary cell-radio network temporary identifier for a four-step RA procedure.

FIG. 22 shows an example diagram of a CSI request file for PDCCH/EPDCCH with uplink DCI format in UE specific search space.

FIG. 24 shows an example diagram of downlink beam management procedures.

FIG. 38 shows an example of a partial beam failure selection scheme.

FIG. 39 shows an example of a partial beam failure selection scheme.

DETAILED DESCRIPTION

Figure 1:
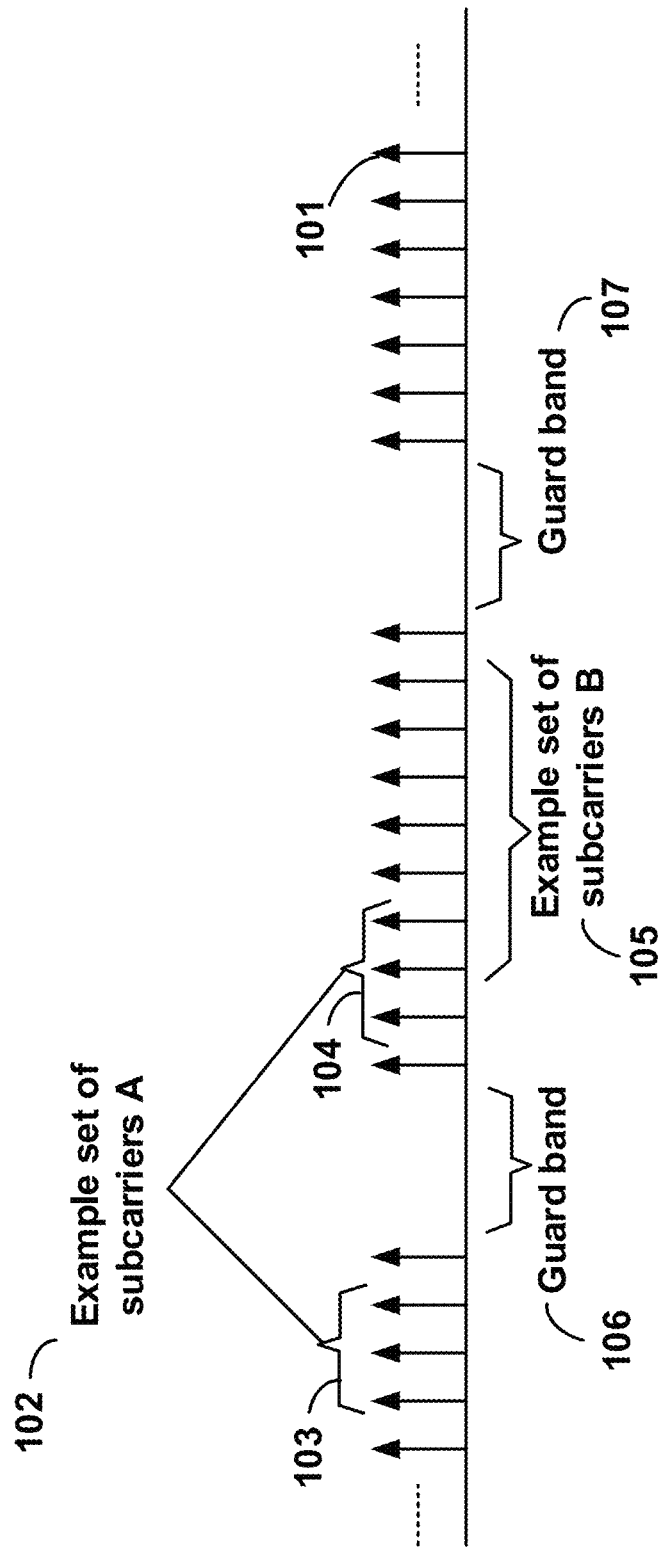
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

The features described herein may enable operation of carrier aggregation and may be used in the technical field of multicarrier communication systems. Examples may relate connection failures in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BLER block error rate
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RS reference signal
RSRP reference signal received power
RV redundancy version SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like.

Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
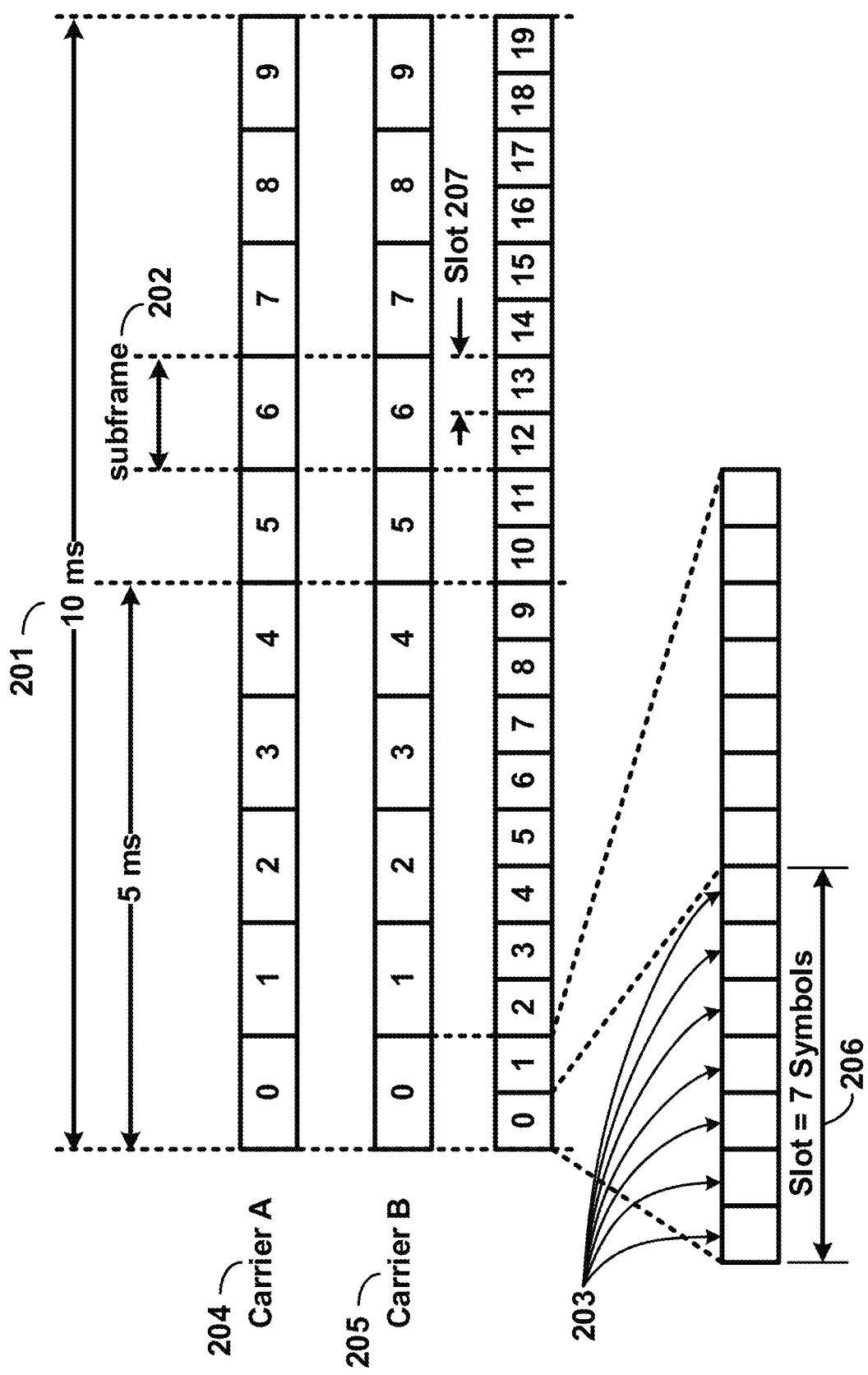
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. Each 10 msec radio frame 201 may be divided into ten equally sized subframes 202. Other subframe durations such as including 0.5 msec, 1 msec, 2 msec, and 5 msec may also be supported. Subframe(s) may comprise two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
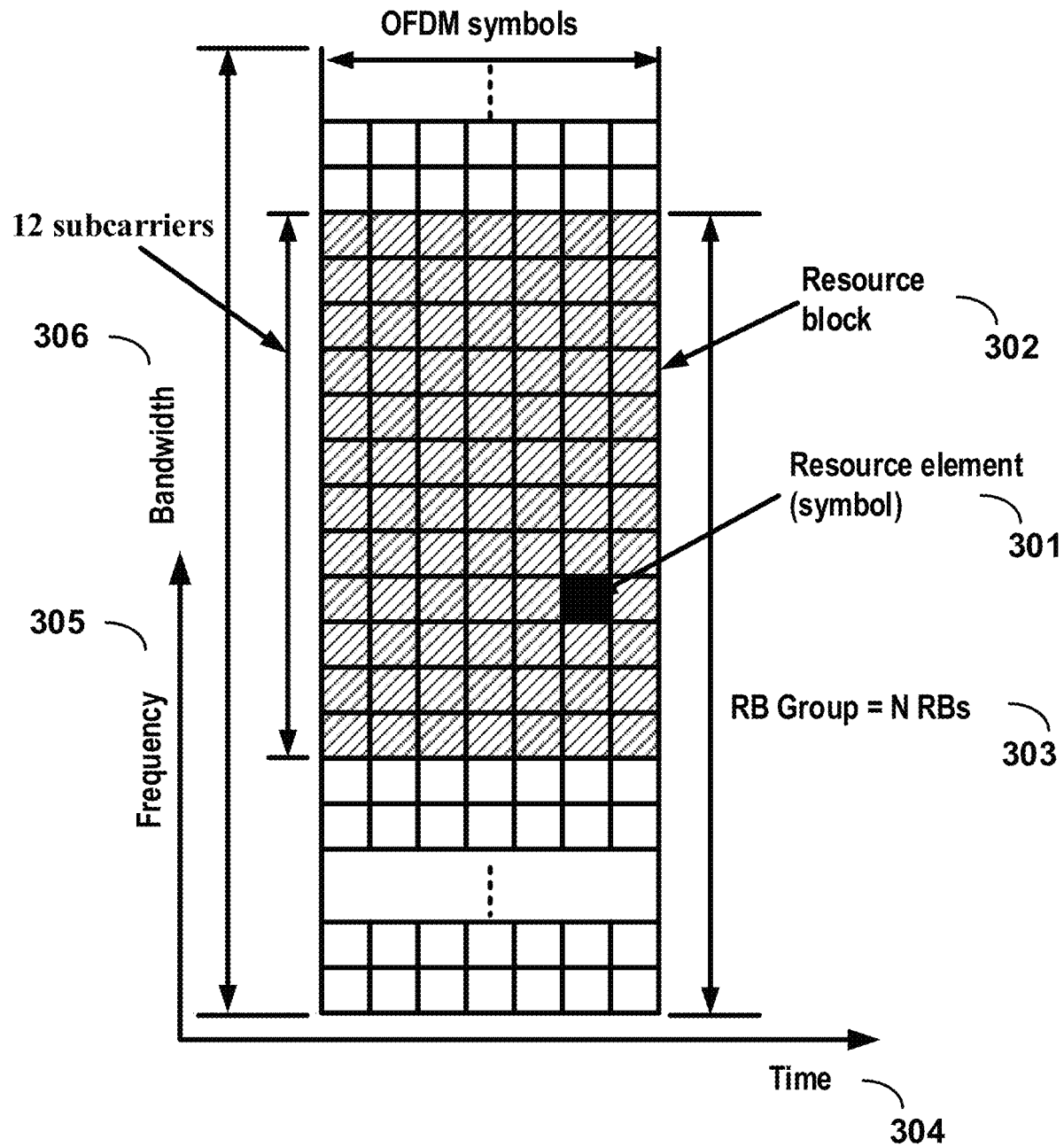
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
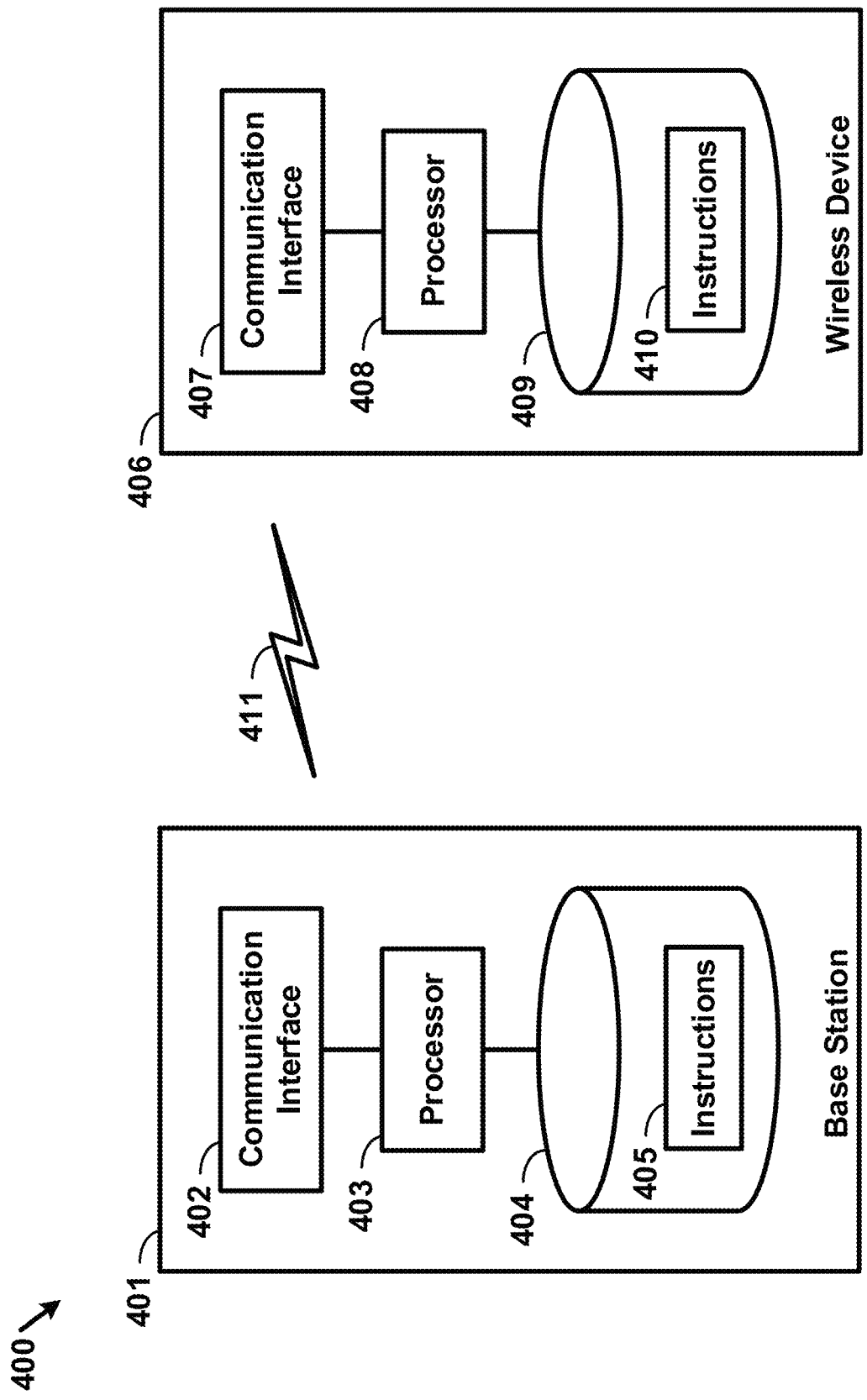
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403.

The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). Transceivers, which may comprise both a transmitter and receiver, may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. The hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network (e.g., a 5G network) may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may equally mean that the cell comprising the first carrier is activated.

A device may be configured to operate as needed by freely combining any of the example features described herein. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various example embodiments may be satisfied. Therefore, it may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may perform the following processes, which may be performed by the structures described below. These structures and corresponding functions are shown as examples, and it is anticipated that other mechanisms may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-1-DMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, Re $\{s_1(t)\}$ and Im$\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may perform the following processes, which may be performed by structures described below. These structures and corresponding functions are shown as examples, and it is anticipated that other mechanisms may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(P)}(t)$, may be split, by a signal splitter 520, into real and imaginary components, Re$\{s_1^{(P)}(t)\}$ and Im$\{s_1^{(P)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
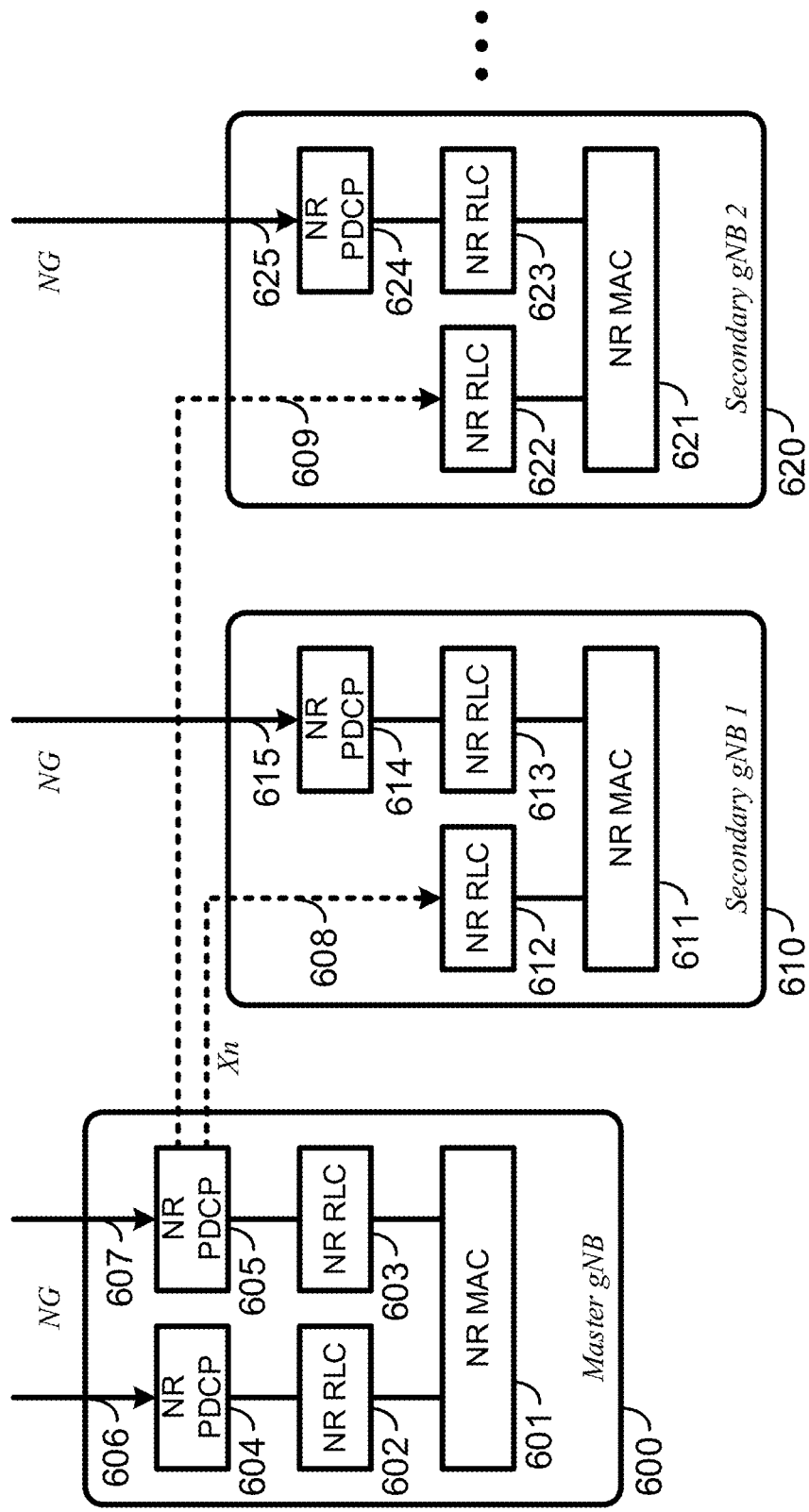
FIG. 6 shows an example protocol structure with multi-connectivity.
Figure 7:
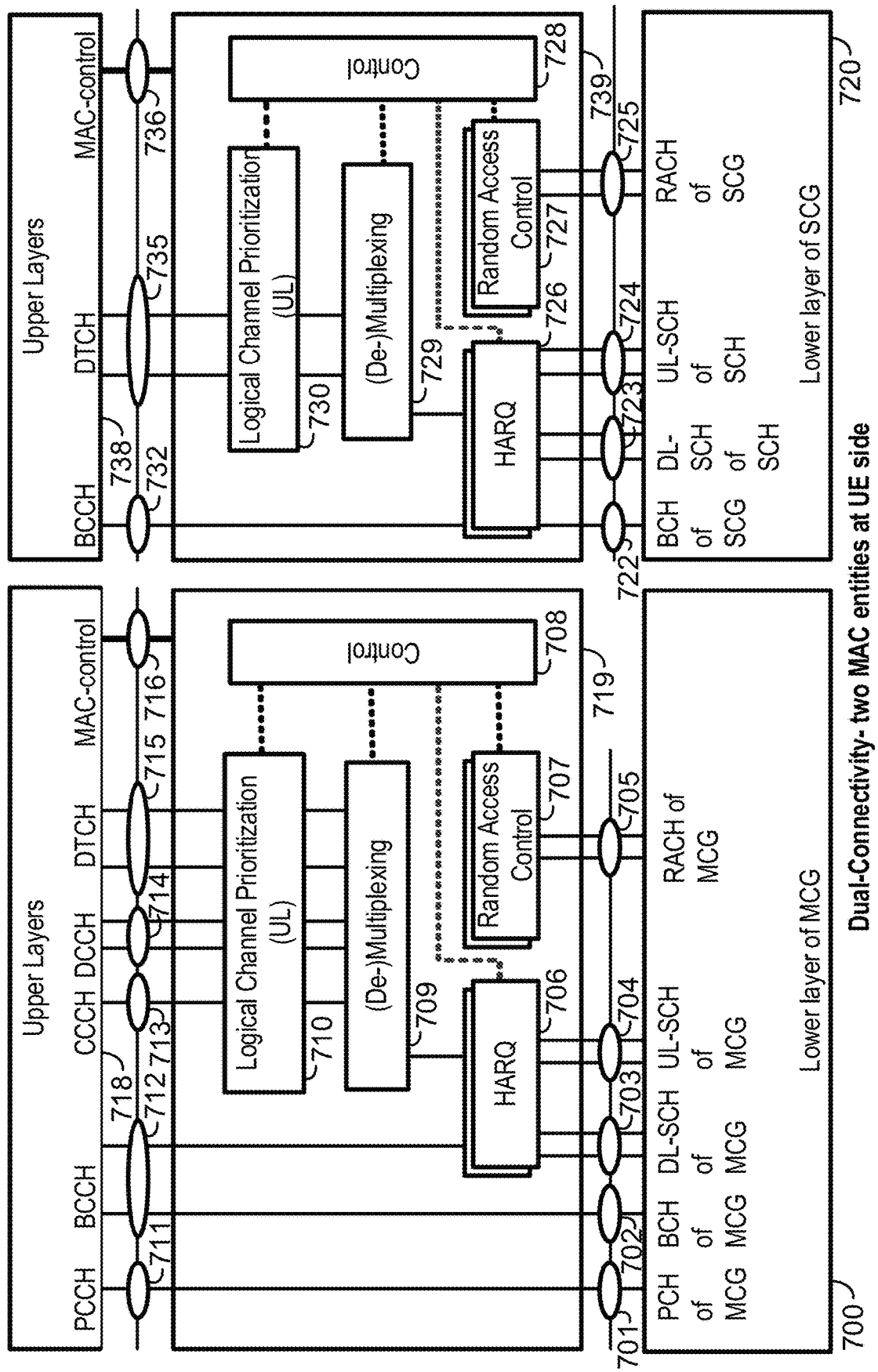
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
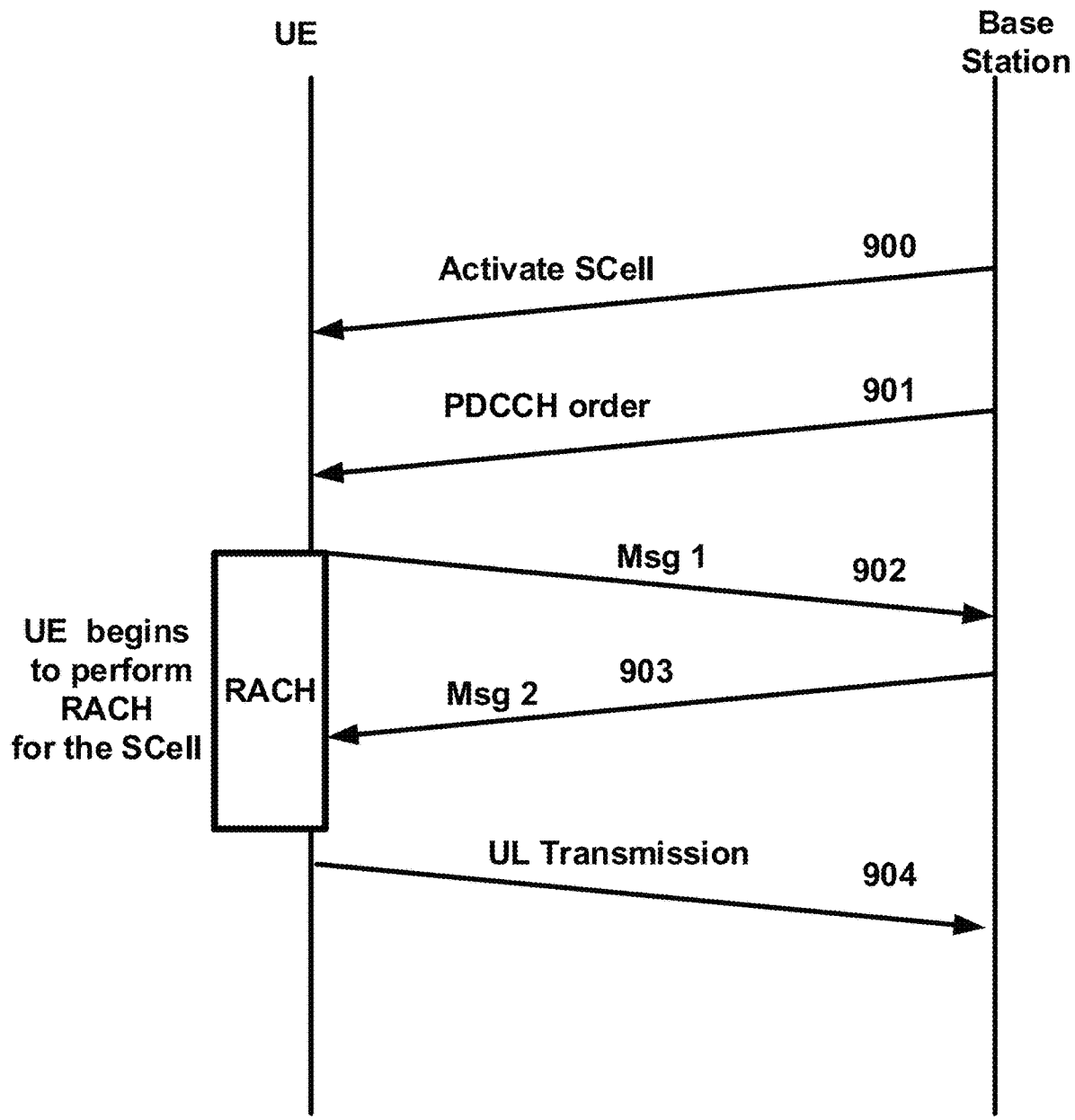
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

The purpose of an RRC connection reconfiguration procedure may be to modify an RRC connection, (e.g., to establish, modify and/or release RBs, to perform handover, to setup, modify, and/or release measurements, to add, modify, and/or release SCells). If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increases, and as the number of aggregated carriers increases, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cells within a group may be configured with a PUCCH. One SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

A timer may be considered to be running after it is started, until it is stopped, or until it expires; otherwise it may be considered to not be running A timer can be started if it is not running or restarted if it is running. For example, a timer may be started or restarted from its initial value.

Features described herein may enable operation of multi-carrier communications. Features may comprise a non-transitory tangible computer readable media comprising instructions executable by one or more processors to cause operation of multi-carrier communications. The features may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The devices herein may include processors, memory, interfaces, and/or the like. Features may comprise communication networks comprising devices such as base stations, wireless devices (or user equipment: UE), servers, switches, antennas, and/or the like.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
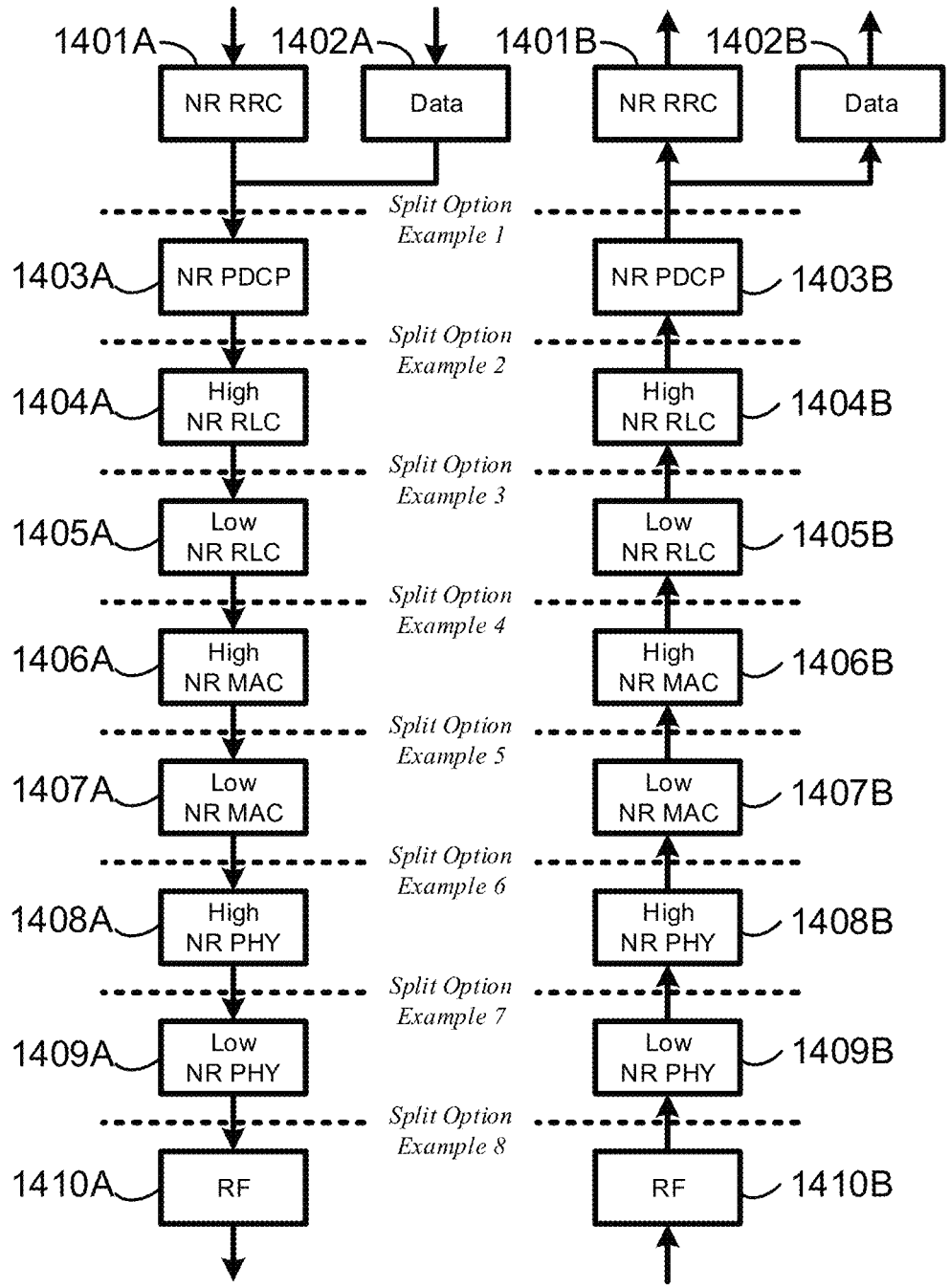
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF

1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing, and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively change (e.g., lower or increase) the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. Category 2 (e.g., LBT without random back-off) may be implemented. The duration of time that the channel is sensed to be idle before the transmitting entity transmits may be deterministic. Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from a base station perspective. If a base station is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A wireless device configured for operation with wireless resources (e.g., bandwidth parts (BWPs)) of a serving cell may be configured by higher layers for the serving cell. The wireless device may be configured for a set of BWPs for receptions by the wireless device (e.g., DL BWP set) and/or or a set of BWPs for transmissions by the wireless device (e.g., UL BWP set). For a DL BWP, an UL BWP in a set of DL BWPs, or an UL BWPs, the wireless device may be configured with at least one of following for the serving cell: a subcarrier spacing (SCS) for DL BWP and/or UL BWP, a cyclic prefix (CP) for DL BWP and/or UL BWP, a number of contiguous PRBs for DL BWP and/or UL BWP, an offset of the first PRB of DL BWP and/or UL BWP in the number of contiguous PRBs relative to the first PRB of a reference location, and/or Q control resource sets (e.g., if the BWP is a DL BWP). Higher layer signaling may configure a wireless device with Q control resource sets, for example, for each serving cell. For a control resource set q, such that $0 \leq q < Q$ the configuration may comprise one or more of following: a first OFDM symbol, a number of consecutive OFDM symbols, a set of resource blocks, a CCE-to-REG mapping, a REG bundle size (e.g., for interleaved CCE-to-REG mapping), and/or antenna port quasi-collocationBWP.

A control resource set may comprise a set of CCEs numbered from 0 to $N_{CCE,q}-1$ where $N_{CCE,q}$ may be the number of CCEs in control resource set q. Sets of PDCCH candidates that a wireless device monitors may be defined in terms of PDCCH wireless device-specific search spaces. A PDCCH wireless device-specific search space at CCE aggregation level $L \in \{1, 2, 4, 8\}$ may be defined by a set of PDCCH candidates for CCE aggregation level L. A wireless device may be configured (e.g., for a DCI format), per serving cell by one or more higher layer parameters, for a number of PDCCH candidates per CCE aggregation level L.

A wireless device may monitor (e.g., in non-DRX mode operation) one or more PDCCH candidate in control resource set q according to a periodicity of $W_{PDCCH,q}$ symbols. The symbols may be configured by one or more higher layer parameters for control resource set q. The carrier indicator field value may correspond to cif-InSchedulingCell, for example, if a wireless device is configured with a higher layer parameter (e.g., cif-InSchedulingCell). For the serving cell on which a wireless device may monitor one or more PDCCH candidate in a wireless device-specific search space, the wireless device may monitor the one or more PDCCH candidates without carrier indicator field (e.g., if the wireless device is not configured with a carrier indicator field). For the serving cell on which a wireless device may monitor one or more PDCCH candidates in a wireless device-specific search space, the wireless device may monitor the one or more PDCCH candidates with carrier indicator field (e.g., if a wireless device is configured with a carrier indicator field). A wireless device may not monitor one or more PDCCH candidates on a secondary cell, for example, if the wireless device is configured to monitor one or more PDCCH candidates with carrier indicator field corresponding to that secondary cell in another serving cell. For the serving cell on which the wireless device may monitor one or more PDCCH candidates, the wireless device may monitor the one or more PDCCH candidates at least for the same serving cell.

A wireless device may receive PDCCH and PDSCH in a DL BWP according to a configured SCS and CP length for the DL BWP. A wireless device may transmit PUCCH and/or PUSCH in an UL BWP according to a configured SCS and CP length for the UL BWP.

A wireless device may be configured, by one or more higher layer parameters, for a DL BWP from a configured DL BWP set for DL receptions. A wireless device may be configured, by one or more higher layer parameters, for an UL BWP from a configured UL BWP set for UL transmissions. A DL BWP index field value may indicate a DL BWP (such as from the configured DL BWP set) for DL receptions, for example, if the DL BWP index field is configured in a DCI format scheduling PDSCH reception to a wireless device. An UL-BWP index field value may indicate the UL BWP (such as from the configured UL BWP set) for UL transmissions, for example, if the UL-BWP index field is configured in a DCI format scheduling PUSCH transmission from a wireless device.

A wireless device may determine that the center frequency for the DL BWP is or should be the same as the center frequency for the UL BWP, such as for TDD. The wireless device may not monitor PDCCH, for example, if the wireless device performs measurements over a bandwidth that is not within the DL BWP for the wireless device.

A wireless device may identify the bandwidth and/or frequency of an initial active DL BWP, such as for an initial active DL BWP. The wireless device may identify the bandwidth and/or frequency after or in response to receiving the NR-PBCH. A bandwidth of an initial active DL BWP may be confined within the wireless device minimum bandwidth for the given frequency band. The bandwidth may be indicated in PBCH, such as for flexible DL information scheduling. Some bandwidth candidates may be predefined. A number of bits (e.g., x bits) may be used for a bandwidth indication.

A frequency location of an initial active DL BWP may be derived from the bandwidth and SS block (e.g., a center frequency of the initial active DL BWP). The edge of the SS block PRB and data PRB boundary may not be aligned. An SS block may have a frequency offset, for example, if the edge of the SS block PRB and data PRB are not aligned. Predefining the frequency location of an SS block and an initial active DL BWP may reduce the PBCH payload size such that additional bits may not be needed for an indication of a frequency location of an initial active DL BWP. The bandwidth and frequency location may be informed in RMSI, for example, for the paired UL BWP.

A base station may configure a set of BWPs for a wireless device by RRC signaling. The wireless device may transmit or receive in an active BWP from the configured BWPs in a given time instance. Activation and/or a deactivation of DL bandwidth part may be based on a timer for a wireless device. The wireless device may switch its active DL bandwidth part to a default DL bandwidth part, for example, if a timer expires. If the wireless device has not received scheduling DCI for a time period (e.g., X ms, or after expiry of a timer), the wireless device may switch to the default DL BWP.

A new timer (e.g., BWPDeactivationTimer) may be defined to deactivate the original BWP and/or switch to the default BWP. The new timer (e.g., BWPDeactivationTimer) may be started if the original BWP is activated by the activation and/or deactivation DCI. If PDCCH on the original BWP is received, a wireless device may restart the timer (e.g., BWPDeactivationTimer) associated with the original BWP. If the timer (e.g., BWPDeactivationTimer) expires, a wireless device may deactivate the original BWP, switch to the default BWP, stop the timer for the original BWP, and/or flush (or not flush) all HARQ buffers associated with the original BWP.

A base station and a wireless device may have a different understanding of the starting of the timer, for example, if the wireless device misses one or more scheduling grants. The wireless device may be triggered to switch to the default BWP, but the base station may schedule the wireless device in the previous active BWP. The base station may restrict the location of the CORESET of BWP2 to be within BWP1 (e.g., the narrow band BWP1 may be the default BWP), for example, if the default BWP is nested within other BWPs. The wireless device may receive an indication (e.g., CORESET) and switch back to BWP2, for example, if the wireless device previously mistakenly switched to the default BWP.

Restricting the location of the indication (e.g., CORESET) may not solve a miss switching problem, for example, if the default BWP and the other BWPs are not overlapped in frequency domain. The base station may maintain a timer for a wireless device. If the timer expires (e.g., if there is no data scheduled for the wireless device for a time period such as Y ms), and/or if the base station has not received feedback from the wireless device for a time period (such as Y' ms), the wireless device may switch to the default BWP. The wireless device may switch to the default BWP to send a paging signal and/or to re-schedule the wireless device in the default BWP.

A base station may not fix the default BWP to be the same as an initial active BWP. The initial active DL BWP may be the SS block bandwidth which is common to wireless devices in the cell. The traffic load may be very heavy, for example, if many wireless devices fall back to a small bandwidth for data transmission. Configuring the wireless devices with different default BWPs may help to balance the load in the system bandwidth.

There may be no initial active BWP on an SCell, for example, if the initial access is performed on the PCell. An DL BWP and/or UL BWP that is initially activated based on the SCell being activated may be configured or reconfigured by RRC signaling. The default BWP of the SCell may also be configured and/or reconfigured by RRC signaling. The default BWP may be configured or reconfigured by the RRC signaling, and/or the default BWP may be one of the configured BWPs of the wireless device, which may provide a unified design for both PCell and SCell.

The base station may configure a wireless device-specific default DL BWP other than an initial active BWP. The base station may configure the wireless device-specific default DL BWP, for example, after RRC connection, which may be performed for the purpose of load balancing. The default BWP may support connected mode operations other than operations supported by initial active BWP. Other connected mode operations may comprise, for example, fall back and/or connected mode paging. The default BWP may comprise a common search space, such as at least the search space needed for monitoring the pre-emption indications. The default DL and UL BWPs may be independently configured to the wireless device, such as for FDD.

The initial active DL BWP and/or UL BWP may be set as default DL BWP and/or UL BWP, respectively. A wireless device may return to default DL BWP and/or UL BWP. For example, if a wireless device does not receive control for a long time (e.g., based on a timer expiration or a time duration reaching a threshold), the wireless device may fall back to a default BWP (e.g., default DL BWP and/or default UL BWP).

A base station may configure a wireless device with multiple BWPs. The multiple BWPs may share at least one CORESET including a default BWP. CORESET for RMSI may be shared for all configured BWPs. The wireless device may receive control information via the common CORESET, for example, without going back to another BWP or a default BWP. The common CORESET may schedule data within only a default BWP, which may minimize the ambiguity of resource allocation, for example, if a frequency region of a default BWP may belong to all or more than one of the configured BWPs.

A semi-static pattern of BWP switching to default BWP may be performed, for example, if the configured BWP is associated with a different numerology from a default BWP. Switching to a default BWP may be performed, for example, to check RMSI at least periodically. Switching to a default BWP may be necessary particularly if BWPs use different numerologies.

Reconfiguration of a default BWP from an initial BWP may be performed, such as for RRC connected wireless devices. A default BWP may be the same as an initial BWP, such as for RRC IDLE wireless devices. Additionally or alternatively, a wireless device (e.g., RRC IDLE wireless device) may fall back to an initial BWP regardless of a default BWP. If a wireless device performs a measurement based on SS block, reconfiguration of a default BWP outside of an initial BWP may become very inefficient, for example, due to frequent measurement gaps. If a default BWP is reconfigured to outside of an initial BWP, the following conditions may be satisfied: a wireless device may be in a CONNECTED mode, and/or a wireless device may not be configured with an SS block based measurement for both serving cell and neighbor cells.

A DL BWP other than the initial active DL BWP may be configured as the default DL BWP for a wireless device. Reconfiguring the default DL BWP may be performed based on load balancing and/or different numerologies used for an active DL BWP and an initial active DL BWP. A default BWP on a PCell may be an initial active DL BWP for a transmission of RMSI. The transmission of RMSI may comprise one or more of an RMSI CORESET with a CSS, and/or a wireless device-specific search space (e.g., USS). The initial active BWP and/or default BWP may remain an active BWP for a user after a wireless device becomes RRC connected.

Downlink and uplink BWPs may be independently activated, such as for a paired spectrum. Downlink and uplink bandwidth parts may be jointly activated, such as for an unpaired spectrum. In bandwidth adaptation (e.g., where the bandwidth of the active downlink BWP may be changed), a joint activation of a new downlink BWP and a new uplink BWP may be performed (e.g., for an unpaired spectrum). A new DL/UL BWP pair may be activated such that the bandwidth of the uplink BWPs may be the same (e.g., there may not be a change of an uplink BWP).

There may be an association of DL BWP and UL BWP in RRC configuration. For example, a wireless device may not retune the center frequency of a channel bandwidth (BW) between DL and UL, such as for TDD. If the RF is shared between DL and UL (e.g., in TDD), a wireless device may not retune the RF BW for every alternating DL-to-UL and UL-to-DL switching.

Applying an association between a DL BWP and an UL BWP may enable an activation and/or deactivation command to switch both DL and UL BWPs. Such switching may comprise switching a DL BWP together with switching an UL BWP. If an association is not applied between a DL BWP and an UL BWP, separate BWP switching commands may be necessary.

A DL BWP and an UL BWP may be configured separately for the wireless device. Pairing of the DL BWP and the UL BWP may impose constraints on the configured BWPs (e.g., the paired DL BWP and UL BWP may be activated simultaneously or near simultaneously such as within a threshold time period). A base station may indicate a DL BWP and an UL BWP to a wireless device for activation, for example, in a FDD system. A base station may indicate to a wireless device a DL BWP and an UL BWP with the same center frequency for activation, for example, in a TDD system. No pairing and/or association of the DL BWP and UL BWP may be mandatory, even for TDD system, for example, if the activation and/or deactivation of the BWP for the wireless device is instructed by the base station. Pairing and/or association of the DL BWP and UL BWP may be determined by a base station.

An association between a DL carrier and an UL carrier within a serving cell may be performed by carrier association. A wireless device may not be expected to retune the center frequency of a channel BW between DL and UL, such as for a TDD system. An association between a DL BWP and an UL BWP may be required for a wireless device. An association may be performed by grouping DL BWP configurations with same center frequency as one set of DL BWPs and grouping UL BWP configurations with same center frequency as one set of UL BWPs. The set of DL BWPs may be associated with the set of UL BWPs sharing the same center frequency. There may be no association between a DL BWP and an UL BWP, for example, if the association between a DL carrier and an UL carrier within a serving cell may performed by carrier association, such as for an 1-DD serving cell.

A wireless device may identify a BWP identity from a DCI, which may simplify an indication process. The total number of bits for a BWP identity may depend on the number of bits that may be used within a scheduling DCI (and/or a switching DCI), and/or the wireless device minimum BW. The number of BWPs may be determined based on the wireless device supported minimum BW and/or the network maximum BW. The maximum number of BWPs may be determined based on the network maximum BW and/or the wireless device minimum BW. For example, if 400 MHz is the network maximum BW and 50 MHz is the wireless device minimum BW, 8 BWPs may be configured to the wireless device such that 3 bits may be required within the DCI to indicate the BWP. Such a split of the network BW (e.g., depending on the wireless device minimum BW) may be useful for creating one or more default BWPs from the network side by distributing wireless devices across the entire network BW (e.g., for load balancing purposes).

At least two DL and two UL BWPs may be supported by a wireless device for a BWP adaption. The total number of BWPs supported by a wireless device may be given by 2<number of DL/UL BWP≤floor (network maximum BW/wireless device minimum DL/UL BW), where floor(x) may be a floor function that returns the greatest integer being less than or equal to x. For example, a maximum number of configured BWPs may be four for DL and UL, respectively, or a maximum number of configured BWPs for UL may be two. Any other number of BWPs, for example, greater than or equal to 2 and less than or equal to a floor, may be supported by a wireless device.

Different sets of BWPs may be configured for different DCI formats and/or scheduling types, respectively. BWPs may be configured for non-slot-based scheduling (e.g., for larger BWPs) or for slot-based scheduling (e.g., for smaller BWPs). If different DCI formats are defined for slot-based scheduling and non-slot-based scheduling, different BWPs may be configured for different DCI formats. Different BWP configurations may provide flexibility between different scheduling types without increasing DCI overhead. A 2-bit field may be used to indicate a BWP among four BWPs for a DCI format. For example, four DL BWPs or two or four UL BWPs may be configured for each DCI format. The same or different BWPs may be configured for different DCI formats.

A required maximum number of configured BWPs (which may exclude the initial BWP) may depend on the flexibility needed for a BWP functionality. It may be sufficient to be able to configure one DL BWP and one UL BWP (or a single DL/UL BWP pair for an unpaired spectrum), which may correspond to minimal support of bandlimited devices. There may be a need to configure at least two DL BWPs and at least a single uplink BWP for a paired spectrum (or two DL/UL BWP pairs for an unpaired spectrum), such as to support bandwidth adaptation. There may be a need to configure one or more DL (or UL) BWPs that jointly cover different parts of the downlink (or uplink) carrier, such as to support dynamic load balancing between different parts of the spectrum. Two BWPs may be sufficient, for example, for dynamic load balancing. In addition to the two BWPs, two other BWPs may be needed, such as for bandwidth adaptation. A maximum number of configured BWPs may be four DL BWPs and two UL BWPs for a paired spectrum. A maximum number of configured BWPs may be four DL/UL BWP pairs for an unpaired spectrum.

A wireless device may monitor for RMSI and broadcasted OSI, which may be transmitted by a base station within a common search space (CSS) on the PCell. RACH response and paging control monitoring on the PCell may be transmitted within the CSS. A wireless device may not monitor the common search space, for example, if the wireless device is allowed to be on an active BWP configured with a wireless device-specific search space (USSS or USS).

At least one of configured DL bandwidth parts may comprise at least one CORESET with a CSS type, such as for a PCell. To monitor RMSI and broadcast OSI, the wireless device may periodically switch to the BWP containing the CSS. The wireless device may periodically switch to the BWP containing the CSS for RACH response and paging control monitoring on the PCell.

BWP switching to monitor the CSS may result in increasing overhead, for example, if the BWP switching occurs frequently. The overhead due to the CSS monitoring may depend on an overlapping in frequency between any two BWPs. In a nested BWP configuration (e.g., where one BWP may be a subset of another BWP), the same CORESET configuration may be used across the BWPs. A default BWP may comprise the CSS, and another BWP may comprise the CSS, for example, if the default BWP is a subset of another BWP. The BWPs may be partially overlapping. A CSS may be across a first BWP and a second BWP, for example, if the overlapping region is sufficient. Two non-overlapping BWP configurations may exist.

There may be one or more benefits from configuring the same CORESET containing the CSS across BWPs. For example, the RMSI and broadcast OSI monitoring may be performed without necessitating BWP switching, RACH response and paging control monitoring on the PCell may be performed without switching, and/or robustness for BWP switching may improve. A base station and a wireless device may be out-of-sync as to which BWP is currently active and the DL control channel may still work, for example, if CORESET configuration is the same across BWPs. One or more constraints on BWP configuration may be acceptable. A BWP may provide power saving, such that various configurations, including a nested configuration, may be very versatile for different applications.

Group-common search space (GCSS) may be supported (e.g., in NR). The GCSS may be used in addition to or as an alternative to CSS for certain information. A base station may configure GCSS within a BWP for a wireless device. Information such as RACH response and paging control may be transmitted on GCSS. The wireless device may monitor GCSS, for example, instead of switching to the BWP containing the CSS for such information. A base station may transmit information on GCSS, for example, for a pre-emption indication and other group-based commands on a serving cell. A wireless device may monitor the GCSS for the information (e.g., for the SCell which may not have CSS).

A CORESET may be configured without using a BWP. The CORESET may be configured based on a BWP, which may reduce signaling overhead. A first CORESET for a wireless device during an initial access may be configured based on a default BWP. A CORESET for monitoring PDCCH for RAR and paging may be configured based on a DL BWP. The CORESET for monitoring group common (GC)-PDCCH for SFI may be configured based on a DL BWP. The CORESET for monitoring GC-DCI for a pre-emption indication may be configured based on a DL BWP. A BWP index may be indicated in the CORESET configuration. A default BWP index may not be indicated in the CORESET configuration.

A contention-based random access (CBRA) RACH procedure may be supported via an initial active DL BWP and/or an initial active UL BWP, for example, if the wireless device identity is unknown to the base station. The contention-free random access (CFRA) RACH procedure may be supported via the USS configured in an active DL BWP for the wireless device. An additional CSS for RACH purposes may not need to be configured per BWP, such as for the CFRA RACH procedure supported via the USS configured in an active DL BWP for the wireless device. Idle mode paging may be supported via an initial active DL BWP. Connected mode paging may be supported via a default BWP. No additional configurations for the BWP for paging purposes may be needed for paging. A configured BWP (e.g., on a serving cell) may have the CSS configured for monitoring pre-emption indications for a pre-emption.

A group-common search space may be associated with at least one CORESET configured for the same DL BWP (e.g., for a configured DL BWP). The wireless device may or may not autonomously switch to a default BWP (e.g., where a group-common search space may be available) to monitor for a DCI, for example, depending on the monitoring periodicity of different group-common control information types. A group-common search space may be configured in the same CORESET, for example, if there is at least one CORESET configured on a DL BWP.

A center frequency of an activated DL BWP may or may not be changed. If the center frequency of the activated DL BWP and the deactivated DL BWP is not aligned, the active UL BWP may be switched implicitly (e.g., for TDD).

BWPs with different numerologies may be overlapped. Rate matching for CSI-RS and/or SRS of another BWP in the overlapped region may be performed, which may achieve dynamic resource allocation of different numerologies in a FDM and/or a TDM manner. For a CSI measurement within one BWP, if the CSI-RS and/or SRS collides with data and/or an RS in another BWP, the collision region in another BWP may be rate matched. CSI information over the two or more BWPs may be determined by a base station based on wireless device reporting. Dynamic resource allocation with different numerologies in a FDM manner may be achieved by base station scheduling.

PUCCH resources may be configured in a configured UL BWP, in a default UL BWP, and/or in both a configured UL BWP and a default UL BWP. If the PUCCH resources are configured in the default UL BWP, a wireless device may retune to the default UL BWP for transmitting an SR. The PUCCH resources may be configured per a default BWP or per a BWP other than the default BWP. The wireless device may transmit an SR in the current active BWP without retuning. If a configured SCell is activated for a wireless device, a DL BWP may be associated with an UL BWP at least for the purpose of PUCCH transmission, and/or a default DL BWP may be activated. If the wireless device is configured for UL transmission in the same serving cell, a default UL BWP may be activated.

At least one of configured DL BWPs may comprise one CORESET with common search space (CSS), for example, at least in a primary component carrier. The CSS may be needed at least for RACH response (e.g., a msg2) and/or a pre-emption indication. One or more of configured DL bandwidth parts for a PCell may comprise a CORESET with the CSS type for RMSI and/or OSI, for example, if there is no periodic gap for RACH response monitoring on the PCell. A configured DL BWP for a PCell may comprise one CORESET with the CSS type for RACH response and paging control for a system information update. A configured DL BWP for a serving cell may comprise a CORESET with the CSS type for a pre-emption indication and/or other group-based commands.

BWPs may be configured with respect to common reference point (e.g., PRB 0) on a component carrier. The BWPs may be configured using TYPE1 RA as a set of contiguous PRBs, with PRB granularity for the START and LENGTH. The minimum length may be determined by the minimum supported size of a CORESET. A CSS may be configured on a non-initial BWP, such as for RAR and paging.

To monitor common channel or group common channel for a connected wireless device (e.g., RRC CONNECTED UE), an initial DL BWP may comprise a control channel for RMSI, OSI, and/or paging. The wireless device may switch a BWP to monitor such a control channel A configured DL BWP may comprise a control channel (e.g., for a Msg2). A configured DL BWP may comprise a control channel for a SFI. A configured DL BWP may comprise a pre-emption indication and/or other group common indicators such as for power control.

A DCI may explicitly indicate activation and/or deactivation of a BWP. A DCI without data assignment may comprise an indication to activate and/or deactivate BWP. A wireless device may receive a first indication via a first DCI to activate and/or deactivate a BWP. A second DCI with a data assignment may be transmitted by the base station, for example, for a wireless device to start receiving data. The wireless device may receive the first DCI in a target CORESET within a target BWP. A base station scheduler may make conservative scheduling decisions, for example, until the base station receives CSI feedback.

A DCI without scheduling for active BWP switching may be transmitted, for example, to measure the CSI before scheduling. A DCI with scheduling for active BWP switching may comprise setting the resource allocation field to zero, such that no data may be scheduled. Other fields in the DCI may comprise one or more CSI and/or SRS request fields.

Single scheduling a DCI to trigger active BWP switching may provide dynamic BWP adaptation for wireless device power saving during active state. Wireless device power saving during active state may occur for an ON duration, and/or if an inactivity timer is running and/or if C-DRX is configured. A wireless device may consume a significant amount of power monitoring PDCCH, without decoding any grant, for example if a C-DRX is enabled. To reduce the power consumption during PDCCH monitoring, two BWPs may be configured: a narrower BWP for PDCCH monitoring, and a wider BWP for scheduled data. The wireless device may switch back-and-forth between the narrower BWP and the wider BWP, depending on the burstiness of the traffic. The wireless device may revisit a BWP that it has previously used. Combining a BWP switching indication and a scheduling grant may provide an advantage of low latency and/or reduced signaling overhead for BWP switching.

An SCell activation and/or deactivation may or may not trigger a corresponding action for its configured BWP. A dedicated BWP activation and/or deactivation DCI may impact a DCI format. A scheduling DCI with a dummy grant may be used. The dummy grant may be constructed by invalidating one or some of the fields, such as the resource allocation field. A fallback scheduling DCI format (which may contain a smaller payload) may be used, which may improve the robustness for BWP DCI signaling without incurring extra work by introducing a new DCI format.

A DCI with data assignment may comprise an indication to activate and/or deactivate a BWP along with a data assignment. A wireless device may receive a combined data allocation and BWP activation and/or deactivation message. A DCI format may comprise a field to indicate BWP activation and/or deactivation and/or a field indicating an UL grant and/or a DL grant. The wireless device may start receiving data with a single DCI, such as the DCI format described above. The DCI may indicate one or more target resources of a target BWP. A base station scheduler may have insufficient information about the CSI in the target BW and may make conservative scheduling decisions.

The DCI may be transmitted on a current active BWP, and scheduling information may be for a new BWP, for example, for the DCI with data assignment. There may be a single active BWP. There may be one DCI in a slot for scheduling the current BWP or scheduling another BWP. The same CORESET may be used for the DCI scheduling of the current BWP and the DCI scheduling of another BWP. The DCI payload size for the DCI scheduling current BWP and the scheduling DCI for BWP switching may be the same, which may reduce the number of blind decoding attempts.

In A BWP group may be configured by a base station, in which a numerology in one group may be the same, which may support using the scheduling DCI for BWP switching. The BWP switching for the BWP group may be configured, such that BIF may be present in the CORESETs for one or more BWPs in the group. Scheduling DCI for BWP switching may be configured per BWP group, in which an active BWP in the group may be switched to any other BWP in the group.

A DCI comprising a scheduling assignment and/or grant may not comprise an active-BWP indicator. A scheduling DCI may switch a wireless devices active BWP to the transmission direction for which the scheduling is valid (e.g., for a paired spectrum). A scheduling DCI may switch the wireless devices active DL/UL BWP pair regardless of the transmission direction for which the scheduling is valid (e.g., for an unpaired spectrum). A downlink scheduling assignment and/or grant with no assignment may occur, which may allow for a switching of an active BWP without scheduling downlink and/or uplink transmissions.

A timer-based activation and/or deactivation BWP may be supported. A timer for activation and/or deactivation of DL BWP may reduce signaling overhead and may allow wireless device power savings. The activation and/or deactivation of a DL BWP may be based on an inactivity timer, which may be referred to as a BWP inactive (or inactivity) timer. A wireless device may start and/or reset a timer upon reception of a DCI. The timer may expire, for example, if the wireless device is not scheduled for the duration of the timer. The wireless device may activate and/or deactivate the appropriate BWP based on the expiry of the timer. The wireless device may, for example, activate the default BWP and/or deactivate the active BWP.

A BWP inactive timer may be beneficial for power saving for a wireless device. A wireless device may reduce power, for example, by switching to a default BWP with a smaller bandwidth. A wireless device may use a BWP inactive timer, for example, for a fallback if missing a DCI based activation and/or deactivation signaling, such as by switching from one BWP to another BWP. Triggering conditions of the BWP inactive timer may follow triggering conditions for the DRX timer in LTE or any other system. An on-duration of the BWP inactive timer may be configured and/or the timer may start, for example, if a wireless device-specific PDCCH is successfully decoded indicating a new transmission during the on-duration. The timer may restart, for example, if a wireless device-specific PDCCH is successfully decoded indicating a new transmission. The timer may stop, for example, if the wireless device is scheduled to switch to the default DL BWP. The BWP inactive timer may start, for example, if the wireless device switches to a new DL BWP. The timer may restart, for example, if a wireless device-specific PDCCH is successfully decoded, wherein the wireless device-specific PDCCH may be associated with a new transmission, a retransmission, SPS activation and/or deactivation, or another purpose.

A wireless device may switch to a default BWP, for example, if the wireless device does not receive any control and/or data from the network during the running of the BWP inactive timer. The timer may be reset, for example, upon reception of any control and/or data. The timer may be triggered, for example, if wireless device receives a DCI to switch its active DL BWP from the default BWP to another BWP. The timer may be reset, for example, if a wireless device receives a DCI to schedule PDSCH(s) in the BWP other than the default BWP.

A DL BWP inactive timer may be defined separately from a UL BWP inactive timer.

Timers for the DL BWP and UL BWP may be set independently and/or jointly. For the separate timers (e.g., if there is DL data and UL timer expires), UL BWP may not be deactivated since PUCCH configuration may be affected if both DL BWP and UL BWP are activated. For the uplink, if there is UL feedback signal related to DL transmission, the timer may be reset. The UL timer may not be set if there is DL data. If there is UL data and the DL timer expires, there may be no issue if the DL BWP is deactivated since UL grant is transmitted in the default DL BWP. A BWP inactivity-timer may allow fallback to default BWP on a PCell and/or SCell.

A timer-based activation and/or deactivation of BWP may be similar to a wireless device DRX timer. There may not be a separate inactivity timer for BWP activation and/or deactivation for the wireless device DRX timer. A wireless device DRX inactivity timer may trigger BWP activation and/or deactivation. There may be separate inactivity timers for BWP activation and/or deactivation for the wireless device DRX timer. For example, the DRX timers may be defined in a MAC layer, and the BWP timer may be defined in a physical layer. A wireless device may stay in a wider BWP for as long as the inactivity timer is running, for example, if the same DRX inactivity timer is used for BWP activation and/or deactivation. The DRX inactivity timer may be set to a large value of 100-200 milliseconds for a C-DRX cycle of 320 milliseconds, which may be larger than the ON duration (e.g., 10 milliseconds). Setting the DRX inactivity timer in the above manner may provide power savings, for example, based on a narrower BWP not being achievable. To realize wireless device power saving promised by BWP switching, a new timer may be defined and it may be configured to be smaller than the DRX inactivity timer. From the point of view of DRX operation, BWP switching may allow wireless device to operate at different power levels during the active state, effectively providing intermediate operating points between the ON and OFF states.

With a DCI explicit activation and/or deactivation of BWP, a wireless device and a base station may not be synchronized with respect to which BWP is activated and/or deactivated. The base station scheduler may not have CSI information related to a target BWP for channel-sensitive scheduling. The base station may be limited to conservative scheduling for one or more first several scheduling occasions. The base station may rely on periodic or aperiodic CSI-RS and associated CQI report(s) to perform channel-sensitive scheduling. Relying on periodic or aperiodic CSI-RS and associated CQI report(s) may delay channel-sensitive scheduling and/or lead to signaling overhead, such as if aperiodic CQI is requested (e.g., by a base station). To mitigate a delay in acquiring synchronization and channel state information, a wireless device may transmit an acknowledgement upon receiving an activation and/or deactivation of a BWP. A CSI report based on the provided CSI-RS resource may be transmitted after activation of a BWP and may be used as acknowledgment of activation and/or deactivation.

A base station may provide a sounding reference signal for a target BWP after a wireless device tunes to a new BWP. The wireless device may report the CSI, which may be used as an acknowledgement by the base station to confirm that the wireless device receives an explicit DCI command and activates and/or deactivates the appropriate BWPs. For an explicit activation and/or deactivation via DCI with data assignment, a first data assignment may be carried out without a CSI for the target BWP A guard period may be defined to take RF retuning and related operations into account. A wireless device may neither transmit nor receive signals in the guard period. A base station may need to know the length of the guard period. For example, the length of the guard period may be reported to the base station as a wireless device capability. The length of the guard period may be based on the numerologies of the BWPs and the length of the slot. The length of the guard period for RF retuning may be reported as a wireless device capability. The wireless device may report the guard period as an absolute time and/or in symbols.

The base station may maintain the time domain position of guard period in alignment between the base station and the wireless device, for example, if the base station knows the length of the guard period. The guard period for RF retuning may be predefined for time pattern triggered BWP switching. The BWP switching and/or guard period may be triggered by DCI and/or a timer. For BWP switching following a time pattern, the position of the guard period may be defined. The guard period may not affect the symbols carrying CSS, for example, if the wireless device is configured to switch periodically to a default BWP for CSS monitoring.

A single DCI may switch the wireless device's active BWP from one to another within a given serving cell. The active BWP may be switched to a second BWP of the same link direction, for example an UL BWP or a DL BWP. A separate field may be used in the scheduling DCI to indicate the index of the BWP for activation such that wireless device may determine the current DL/UL BWP according to a detected DL/UL grant without requiring any other control information. The multiple scheduling DCIs transmitted in this duration may comprise the indication to the same BWP, for example, if the BWP change does not happen during a certain time duration. During the transit time wherein potential ambiguity may happen, base station may send scheduling grants in the current BWP or together in the other BWPs containing the same target BWP index, such that wireless device may obtain the target BWP index by detecting the scheduling DCI in either one of the BWPs. The duplicated scheduling DCI may be transmitted an arbitrary number (e.g., K) times. A wireless device may switch to the target BWP and start to receive or transmit (UL) in the target BWP according to the BWP indication field, for example, if the wireless device receives one of the K times transmissions.

Switching between BWPs may introduce time gaps, for example, if wireless device is unable to receive one or more messages due to re-tuning. Breaks of several time slots may severely affect the TCP ramp up as the wireless device may not be able to transmit and receive during those slots, affecting obtained RTT and data rate. A break in reception may make wireless device out of reach from network point of view reducing network interest to utilize short inactivity timer. If BWP switching takes significant time and a wireless device requires new reference symbols to update AGC, channel estimation, etc., active BWP switching may not be adopted in the wireless device. In some configurations, BWP switching may be performed where the BWP center frequency remains the same if switching between BWPs.

A frequency location of a wireless device's RF bandwidth may be indicated by a base station. The RF bandwidth of the wireless device may be smaller than the carrier bandwidth for considering the wireless device RF bandwidth capability. The supported RF bandwidth for a wireless device is usually a set of discrete values (e.g., 10 MHz, 20 MHz, 50 MHz, etc.). For energy saving purpose, the wireless device RF bandwidth may be determined as the minimum available bandwidth supporting the bandwidth of the BWP. The granularity of BWP bandwidth may be PRB level, which may be decoupled with wireless device RF bandwidth. As a result, the wireless device RF bandwidth may be larger than the BWP bandwidth. The wireless device may receive signals outside the carrier bandwidth, especially if the BWP is configured near the edge of the carrier bandwidth. Inter-system interference or the interference from an adjacent cell outside the carrier bandwidth may affect the receiving performance of the BWP. To keep the wireless device RF bandwidth in the carrier bandwidth, the frequency location of the wireless device RF bandwidth may be indicated by the base station.

A gap duration may be determined based on a measurement duration and a retuning gap. The retuning gap may vary. If a wireless device does not need to switch its center, the retuning may be relatively short, such as 20 μs. A wireless device may indicate the necessary retuning gap for a measurement configuration, for example, if the network may not know whether the wireless device needs to switch its center or not to perform measurement. The retuning gap may depend on the current active BWP that may be dynamically switched via a switching mechanism. Wireless devices may need to indicate the retuning gap dynamically.

The measurement gap may be indirectly created, for example, if the network may configure a certain measurement gap. The measurement gap may comprise the smallest retuning latency. The smallest returning latency may be determined, for example, if a small retuning gap may be utilized and/or if both measurement bandwidth and active BWP is included within the wireless device maximum RF capability and the center frequency of the current active BWP may be not changed. The wireless device may skip receiving and/or transmitting, for example, if a wireless device needs more gap than the configured.

A different measurement gap and retuning gap may be utilized for RRM and CSI. For CSI measurement, if periodic CSI measurement outside of active BWP may be configured, a wireless device may need to perform its measurement periodically per measurement configuration. For RRM, it may be up to wireless device implementation where to perform the measurement as long as it satisfies the measurement requirements. The worst case retuning latency for a measurement may be used. As the retuning latency may be different between intra-band and inter-band retuning, separate measurement gap configurations between intra-band and inter-band measurement may be considered.

A respective DCI format may comprise an explicit identifier to distinguish them, for example, for multiple DCI formats with the same DCI size of a same RNTI. The same DCI size may come from zero-padding bits in at least a wireless device-specific search space.

In BWP switching, a DCI in the current BWP may need to indicate resource allocation in the next BWP that the wireless device may be expected to switch. The resource allocation may be based on the wireless device-specific PRB indexing, which may be per BWP. A range of the PRB indices may change as the BWP changes. The DCI to be transmitted in the current BWP may be based on the PRB indexing for the current BWP. The DCI may need to indicate the RA in the new BWP, which may cause a resource conflict. To resolve the conflict without significantly increasing wireless devices blind detection overhead, the DCI size and bit fields may not change per BWP for a given DCI type.

As the range of the PRB indices may change as the BWP changes, one or more employed bits among the total bit field for RA may be dependent on the employed BWP. A wireless device may use the indicated BWP ID that the resource allocation may be intended to identify the resource allocation bit field.

The DCI size of the BWP may be based on a normal DCI detection without BWP retuning and/or on a DCI detection during the BWP retuning A DCI format may be independent of the BW of the active DL/UL BWP, which may be called as fallback DCI. At least one of DCI format for DL may be configured to have the same size for a wireless device for one or more configured DL BWPs of a serving cell. At least one of the DCI formats for UL may be configured to have the same size for a wireless device for one or more configured UL BWPs of a serving cell. A BWP-dependent DCI format may be monitored at the same time (e.g. a normal DCI) for both active DL BWP and active UL BWP. A wireless device may monitor both DCI formats at the same time. A base station may assign the fallback DCI format to avoid ambiguity during a transition period in the BWP activation and/or deactivation.

If a wireless device is configured with multiple DL or UL BWPs in a serving cell, an inactive DL and/or UL BWP may be activated by a DCI scheduling a DL assignment or UL grant in the BWP. As the wireless device may be monitoring the PDCCH on the currently active DL BWP, the DCI may comprise an indication to a target BWP that the wireless device may switch to for PDSCH reception or UL transmission. A BWP indication may be inserted in the wireless device-specific DCI format. The bit width of this field may depend on the maximum possible and/or presently configured number of DL and/or UL BWPs. The BWP indication field may be a fixed size based on the maximum number of configured BWPs.

A DCI format size may match the BW of the BWP in which the PDCCH may be received. To avoid an increase in the number of blind decodes, the wireless device may identify the RA field based on the scheduled BWP. For a transition from a small BWP to a larger BWP, the wireless device may identify the RA field as being the LSBs of the required RA field for scheduling the larger BWP.

The same DCI size for scheduling different BWPs may be defied by keeping the same size of resource allocation fields for one or more configured BWPs. A base station may be aware of a wireless device switching BWPs based on a reception of ACK/NACK from the wireless device. The base station may not be aware of a wireless device switching BWPs, for example, if the base station does not receive at least one response from the wireless device. To avoid such a mismatch between base station and wireless device, a fallback mechanism may be used. The base station may transmit the scheduling DCI for previous BWPs and for newly activated BWP since the wireless device may receive the DCI on either BWP, for example, if there is no response from the wireless device. The base station may confirm the completion of the active BWP switching, for example, after or in response to the base station receiving a response from the wireless device. The base station may not transmit multiple DCIs, for example, if the same DCI size for scheduling different BWPs may be considered and CORESET configuration may be the same for different BWPs. DCI format(s) may be configured user-specifically per cell rather than per BWP. The wireless device may start to monitor pre-configured search-space on the CORESET, for example, if a wireless device synchronizes to a new BWP.

The size of DCI format in different BWPs may vary and may change at least due to different size of RA bitmap on different BWPs. The size of DCI format configured in a cell for a wireless device may be dependent on scheduled BWPs. If the DCI formats may be configured per cell, the corresponding header size in DCI may be relatively small.

The monitored DCI format size on a search-space of a CORESET may be configurable with sufficiently fine granularity and/or the granularity may be predefined. The monitored DCI format size with sufficient granularity may be beneficial, for example, if a base station may freely set the monitoring DCI format size on the search-spaces of a CORESET. The DCI format size may be set such that it may accommodate the largest actual DCI format size variant among one or more BWPs configured in a serving cell.

For a wireless device-specific serving cell, one or more DL BWPs and one or more UL BWPs may be configured by a dedicated RRC for a wireless device. This may be done as part of the RRC connection establishment procedure for a PCell. For an SCell, this may be done via RRC configuration indicating the SCell parameters.

A default DL and/or a default UL BWP may be activated since there may be at least one DL and/or UL BWP that may be monitored by the wireless device depending on the properties of the SCell (DL only, UL only, or both), for example, if a wireless device receives an SCell activation command. The BWP may be activated upon receiving an SCell activation command. The BWP may be informed to the wireless device via the RRC configuration that configured the BWP on this serving cell. For an SCell, RRC signaling for SCell configuration/reconfiguration may be used to indicate which DL BWP and/or UL BWP may be activated if the SCell activation command is received by the wireless device. The indicated BWP may be the initially active DL and/or UL BWP on the SCell. The SCell activation command may activate DL and/or UL BWP.

For an SCell, RRC signaling for the SCell configuration/reconfiguration may be used for indicating a default DL BWP on the SCell. The default DL BWP may be used for fallback purposes. The default DL BWP may be same or different from the initially activated DL and/or UL BWP indicated to wireless device as part of the SCell configuration. A default UL BWP may be configured to a wireless device for transmitting PUCCH for SR, for example, if the PUCCH resources are not configured in every BWP for SR.

An SCell may be for DL only. For a DL only SCell, a wireless device may keep monitoring an initial DL BWP (e.g., initial active or default) until the wireless device receives SCell deactivation command. An SCell may be for UL only. For the UL only SCell, the wireless device may transmit on the indicated UL BWP, for example, if a wireless device receives a grant. The wireless device may not maintain an active UL BWP if wireless device does not receive a grant. A failure to maintain the active UL BWP due to a grant not being received may not deactivate the SCell. An SCell may be for UL and DL. For a UL and DL SCell, a wireless device may keep monitoring an initial DL BWP (e.g., initial active or default) until the wireless device receives an SCell deactivation command. The UL BWP may be used if there may be a relevant grant or an SR transmission.

A BWP deactivation may not result in a SCell deactivation. The active DL and/or UL BWPs may be considered deactivated, for example, if the wireless device receives the SCell deactivation command.

A wireless device may be expected to perform RACH procedure on an SCell during activation. Activation of UL BWP may be needed for the RACH procedure. At an SCell activation, DL only (only active DL BWP) and/or DL/UL (both DL/UL active BWP) may be configured. A wireless device may select default UL BWP based on measurement or the network configures which one in its activation.

One or more BWPs may be semi-statically configured via wireless device-specific RRC signaling. If a wireless device maintains RRC connection with a primary component carrier (CC), the BWP in a secondary CC may be configured via RRC signaling in the primary CC. One or more BWPs may be semi-statically configured to a wireless device via RRC signaling in a PCell. A DCI transmitted in an SCell may indicate a BWP among the one or more configured BWP and grant detailed resource based on the indicated BWP. For cross-CC scheduling, a DCI transmitted in a PCell may indicate a BWP among the one or more configured BWPs, and grants detailed resource based on the indicated BWP.

A DL BWP may be initially activated for configuring CORESET for monitoring the first PDCCH in the SCell, for example, if an SCell may be activated. The DL BWP may serve as a default DL BWP in the SCell. For the wireless device performing initial access via a SS block in PCell, the default DL BWP in an SCell may not be derived from SS block for initial access. The default DL BWP in an SCell may be configured by RRC signaling in the PCell.

An indication indicating which DL BWP and/or which UL BWP are active may be in the RRC signaling for SCell configuration and/or reconfiguration, for example, if an SCell is activated. The RRC signaling for SCell configuration/reconfiguration may be used for indicating which DL BWP and/or which UL BWP are initially activated if the SCell may be activated. An indication indicating which DL BWP and/or which UL BWP are active may be in the SCell activation signaling, for example, if an SCell is activated. SCell activation signaling may be used for indicating which DL BWP and/or which UL BWP are initially activated if the SCell may be activated.

For PCells and SCells, initial default BWPs for DL and UL (e.g., for RMSI reception and PRACH transmission) may be valid until at least one BWP is configured for the DL and UL via RRC wireless device-specific signaling respectively. The initial default DL/UL bandwidth parts may become invalid and new default DL/UL bandwidth parts may take effect. The SCell configuration may comprise default DL/UL bandwidth parts.

An initial BWP on a PCell may be defined by a master information block (MIB). An initial BWP and default BWP may be separately configurable for the SCell. An initial BWP may be the widest configured BWP of the SCell. A wireless device may retune to a default BWP that may be the narrow BWP. The SCell may be active and may be ready to be opened if an additional data burst arrives.

A BWP on SCell may be activated by means of cross-cell scheduling DCI. The cross-cell scheduling may be configured for a wireless device. The base station may activate a BWP on the SCell by indicating CIF and BWP in the scheduling DCI.

A wireless device and/or base station may perform synchronization tracking within an active DL BWP without a SS block. A tracking reference signal (TRS) and/or the DL BWP configuration may be configured. A DL BWP with a SS block or TRS may be configured as a reference for synchronization tracking.

SS-block based RRM measurements may be decoupled within the BWP framework. Measurement configurations for each RRM and CSI feedback may be independently configured from the BWP configurations. CSI and SRS measurements/transmissions may be performed within the BWP framework.

For a modulation coding scheme (MCS) assignment of the first one or more DL data packets after active DL BWP switching, the network may assign robust MCS to a wireless device for the first one or more DL data packets based on RRM measurement reporting. For a MCS assignment of the first one or more DL data packets after active DL BWP switching, the network may signal to a wireless device by active DL BWP switching DCI to trigger aperiodic CSI measurement/reporting to speed up link adaptation convergence. For a wireless device, periodic CSI measurement outside the active BWP in a serving cell may not supported. For a wireless device, RRM measurement outside active BWP in a serving cell may be supported. For a wireless device, RRM measurement outside configured BWPs in a serving cell may be supported. RRM measurements may be performed on a SSB and/or CSI-RS. The RRM/RLM measurements may be independent of BWPs.

A wireless device may not be configured with aperiodic CSI reports for non-active DL BWPs. The CSI measurement may be obtained after the BW opening and the wide-band CQI of the previous BWP may be used as starting point for the other BWP on the component carrier.

A wireless device may perform CSI measurements for the BWP before scheduling. Before scheduling on a new BWP, a base station may intend to find the channel quality on the potential new BWPs before scheduling the user on that BWP. The wireless device may switch to a different BWP and measure channel quality for the BWP and then transmit the CSI report. There may be no scheduling needed.

One or more scheduling request (SR) configurations may be configured for a BWP of a cell for a wireless device. A wireless device may use SR resources configured by the SR configurations in a BWP to indicate to the base station the numerology/TTI/service type of a logical channel (LCH) or logical channel group (LCG) that triggered the SR. The maximum number of SR configurations may be the maximum number of logical channels/logical channel groups.

There may be at most one active DL BWP and at most one active UL BWP at a given time for a serving cell. A BWP of a cell may be configured with a specific numerology and/or TTI. For a logical channel and/or logical channel group that triggers a SR transmission while the wireless device operates in one active BWP, the corresponding SR may remain triggered based on BWP switching.

The logical channel and/or logical channel group to SR configuration mapping may be configured and/or reconfigured based on switching of the active BWP. The RRC dedicated signaling may configure and/or reconfigure the logical channel and/or logical channel group to SR configuration mapping on the new active BWP if the active BWP is switched.

Mapping between the logical channel and/or logical channel group to SR configuration may be configured when BWP is configured. RRC may pre-configure mapping between logical channel and/or logical channel group to SR configurations for all the configured BWPs. In response to the switching of the active BWP, the wireless device may employ the RRC configured mapping relationship for the new BWP. If BWP is configured, RRC may configure the mapping between logical channel and SR configurations for the BWA mapping between a logical channel and/or logical channel group and SR configuration may be configured if a BWP is configured. The RRC may pre-configure mapping between logical channels and/or logical channel groups to SR configurations for the configured BWPs. Based on switching of the active BWP, a wireless device may use the RRC configured mapping relationship for the new BWP. A RRC may configure the mapping between logical channel and SR configurations for the BWP. The sr-ProhibitTimer and SR_COUNTER corresponding to a SR configuration may continue and the value of the sr-ProhibitTimer and the value of the SR_COUNTER may be their values before the BWP switching.

A plurality of logical channel/logical channel group to SR configuration mappings may be configured in a serving cell. A logical channel/logical channel group may be mapped to at most one SR configuration per BWP. A logical channel/logical channel group mapped onto multiple SR configurations in a serving cell may have one SR configuration active at a time, such as that of the active BWP. A plurality of logical channel/logical channel group to SR-configuration mappings may be supported in carrier aggregation (CA). A logical channel/logical channel group may be mapped to one (or more) SR configuration(s) in each of PCell and PUCCH- SCell. A logical channel/logical channel group configured to be mapped to one (or more) SR configuration(s) in each of both PCell and PUCCH-SCell may have two active SR configurations (one on PCell and one on PUCCH-SCell) at a time for CA. The SR resource is received first may be used.

A base station may configure one SR resource per BWP for the same logical channel/logical channel group. If a SR for one logical channel/logical channel group is pending, a wireless device may transmit a SR with the SR configuration in another BWP after BWP switching. The sr-ProhibitTimer and SR_COUNTER for the SR corresponding to the logical channel/logical channel group may continue based on BWP switching. The wireless device may transmit the SR in another SR configuration corresponding to the logical channel/logical channel group in another BWP after BWP switching if a SR for one logical channel/logical channel group may be pending.

If multiple SRs for logical channels/logical channel groups mapped to different SR configurations are triggered, the wireless device may transmit one SR corresponding to the highest priority logical channel/logical channel group. The wireless device may transmit multiple SRs with different SR configurations. SRs triggered at the same time (e.g., in the same NR-UNIT) by different logical channels/logical channel groups mapped to different SR configurations may be merged into a single SR corresponding to the SR triggered by the highest priority logical channel/logical channel group.

If an SR of a first SR configuration is triggered by a first logical channel/logical channel group while an SR procedure triggered by a lower priority logical channel/logical channel group may be on-going on another SR configuration, the later SR may be allowed to trigger another SR procedure on its own SR configuration independently of the other SR procedure. A wireless device may be allowed to send independently triggered SRs for logical channels/logical channel groups mapped to different SR configurations. A wireless device may be allowed to send triggered SRs for LCHs corresponding to different SR configurations independently.

The dsr-TransMax may be independently configured per SR configuration. The SR_COUNTER may be maintained for each SR configuration independently. A common SR_COUNTER may be maintained for all the SR configurations per BWP.

PUCCH resources may be configured per BWP. The PUCCH resources in the currently active BWP may be used for UCI transmission. PUCCH resources may be configured per BWP. PUCCH resources may be utilized in a BWP not currently active for UCI transmission. PUCCH resources may be configured in a default BWP and BWP switching may be necessary for PUCCH transmission. A wireless device may be allowed to send SR1 in BWP1 even though BWP1 may be no longer active. The network may reconfigure (e.g., pre-configure) the SR resources so that both SR1 and SR2 may be supported in the active BWP. An anchor BWP may be used for SR configuration. The wireless device may send SR2 as a fallback.

A logical channel/logical channel group mapped to a SR configuration in an active BWP may also be mapped to the SR configuration in another BWP to imply same or different information, such as numerology and/or TTI and priority. A MAC entity can be configured with a plurality of SR configurations within the same BWP. The plurality of the SR configurations may be on the same BWP, on different BWPs, or on different carriers. The numerology of the SR transmission may differ from the numerology that the logical channel/logical channel group that triggered the SR may be mapped to.

The PUCCH resources for transmission of the SR may be on different BWPs or different carriers for a LCH mapped to multiple SR configurations. The selection of which configured SR configuration within the active BWP to transmit one SR may be up to wireless device implementation if multiple SRs are triggered. A single BWP can support multiple SR configurations. Multiple sr-ProhibitTimers (e.g., each for one SR configuration) may be running at the same time. A drs-TransMax may be independently configured per SR configuration. A SR_COUNTER may be maintained for each SR configuration independently. A single logical channel/logical channel group may be mapped to zero or one SR configurations. A PUCCH resource configuration may be associated with a UL BWP. One or more logical channels may be mapped to none or one SR configuration per BWP in CA.

A BWP may consist of a group of contiguous PRBs in the frequency domain. The parameters for each BWP configuration may include numerology, frequency location, bandwidth size (e.g., in terms of PRBs), CORESET. CORESET may be required for each BWP configuration, such as for a single active DL bandwidth part for a given time instant. One or more BWPs may be configured for each component carrier, for example, if the wireless device is in RRC connected mode.

The configured downlink assignment may be initialized (e.g., if not active) or re-initialized (e.g., if already active) using PDCCH if a new BWP may be activated. For uplink SPS, the wireless device may have to initialize and/or re-initialize the configured uplink grant if switching from one BWP to anther BWP. If a new BWP is activated, the configured uplink grant may be initialized (e.g., if not already active) or re-initialized (e.g., if already active) using PDCCH.

For type 1 uplink data transmission without grant, there may be no L1 signaling to initialize or re-initialize the configured grant. The wireless device may not determine that the type 1 configured uplink grant may be active if the BWP may be switched, for example, even if the wireless device is already active in the previous BWP. The type 1 configured uplink grant may be re-configured using RRC dedicated signaling for switching the BWP. The type 1 configured uplink grant may be re-configured using dedicated RRC signaling if a new BWP is activated.

If SPS is configured on the resources of a BWP and the BWP is subsequently deactivated, the SPS grants or assignments may not continue. All configured downlink assignments and configured uplink grants using resources of this BWP may be cleared, for example, if a BWP is deactivated. The MAC entity may clear the configured downlink assignment or/and uplink grants after receiving activation and/or deactivation of BWP.

The units of drx-RetransmissionTimer and drx-ULRetransmissionTimer may be OFDM symbol corresponding to the numerology of the active BWP. If a wireless device is monitoring an active DL BWP for a long time without activity, the wireless device may move to a default BWP in order to save power. A BWP inactivity timer may be introduced to switch from an active BWP to the default BWP. Autonomous switching to a DL default BWP may consider both DL BWP inactivity timers and/or DRX timers, such as HARQ RTT and DRX retransmission timers. A DL BWP inactivity timer may be configured per MAC entity. A wireless device may be configured to monitor PDCCH in a default BWP, for example, if a wireless device uses a long DRX cycle.

A power headroom report (PHR) may not be triggered due to the switching of BWP. The support of multiple numerologies/BWPs may not impact PHR triggers. A PHR may be triggered upon BWP activation. A prohibit timer may start upon PHR triggering due to BWP switching. A PHR may not be triggered due to BWP switching while the prohibit timer may be running A PHR may be reported per activated and/or deactivated BWP.

Packet Data Convergence Protocol (PDCP) duplication may be in an activated state while the wireless device receives the BWP deactivation command. The PDCP duplication may not be deactivated, for example, if the BWP on which the PDCP duplication is operated on is deactivated. The PDCP entity may stop sending the data to the deactivated RLC buffer, for example, even if the PDCP duplication may not be deactivated.

RRC signaling may configure a BWP to be activated, for example, if the SCell is activated. Activation and/or deactivation MAC CE may be used to activate both the SCell and the configured BWP. A HARQ entity can serve different BWP within one carrier.

For a wireless device-specific serving cell, one or more DL BWPs and one or more UL BWPs may be configured by dedicated RRC for a wireless device. A single scheduling DCI may switch the wireless device's active BWP from one to another. An active DL BWP may be deactivated by means of timer for a wireless device to switch its active DL bandwidth part to a default DL bandwidth part. A narrower BWP may be used for DL control monitoring and a wider BWP may be used for scheduled data. Small data may be allowed in the narrower BWP without triggering BWP switching.

A base station may transmit a plurality of beams to a wireless device. A serving beam may be determined, from the plurality of beams, for the wireless communications between the base station and the wireless device. One or more candidate beams may also be determined, from the plurality of beams, for providing the wireless communications if a beam failure (e.g., any wireless or communication resource failure) event occurs, for example, such that the serving beam becomes unable to provide the desired communications. One or more candidate beams may be determined by a wireless device and/or by a base station. By determining and configuring a candidate beam, the wireless device and base station may continue wireless communications if the serving beam experiences a beam failure event.

Single beam and multi-beam operations may be supported, for example, in a NR (New Radio) system. In a multi-beam example, a base station (e.g., gNB) may perform a downlink beam sweep to provide coverage for downlink Synchronization Signals (SSs) and common control channels. Wireless devices may perform uplink beam sweeps to access a cell. For a single beam, a base station may configure time-repetition transmission within one SS block. This time-repetition may comprise, for example, one or more of a primary synchronization signal (PSS), a secondary synchronization signal (SSS), or a physical broadcast channel (PBCH). These signals may be in a wide beam. In a multi-beam example, a base station may configure one or more of these signals and physical channels, such as in an SS block, in multiple beams. A wireless device may identify, for example, from an SS block, an OFDM symbol index, a slot index in a radio frame, and a radio frame number from an SS block.

Figure 15:
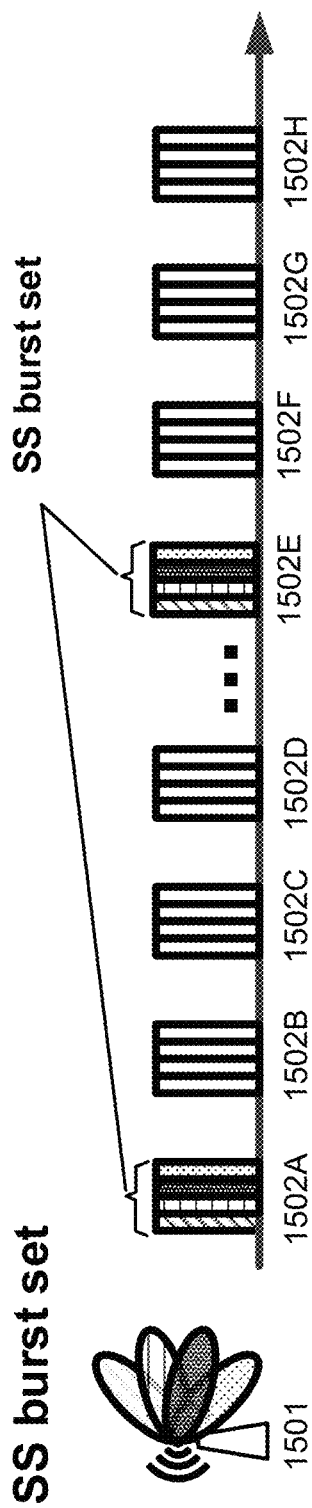
FIG. 15 shows an example diagram of a configuration of a synchronization signal (SS) Burst Set.

In an RRC_INACTIVE state or in an RRC_IDLE state, a wireless device may assume that SS blocks form an SS burst and an SS burst set. An SS burst set may have a given periodicity. SS blocks may be transmitted together in multiple beams (e.g., in multiple beam examples) to form an SS burst. One or more SS blocks may be transmitted via one beam. If multiple SS bursts are transmitted with multiple beams, these SS bursts together may form an SS burst set, such as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

A wireless device may detect one or more of PSS, SSS, or PBCH signals for cell selection, cell reselection, and/or initial access procedures. The PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise system information block type 2 (SIB2). SIB2 may carry one or more physical random access channel (PRACH) configurations. A base station (e.g., a gNB in NR) may have one or more RACH configurations which may include a PRACH preamble pool, time and/or frequency radio resources, and other power related parameters. A wireless device may select a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure.

Figure 16:
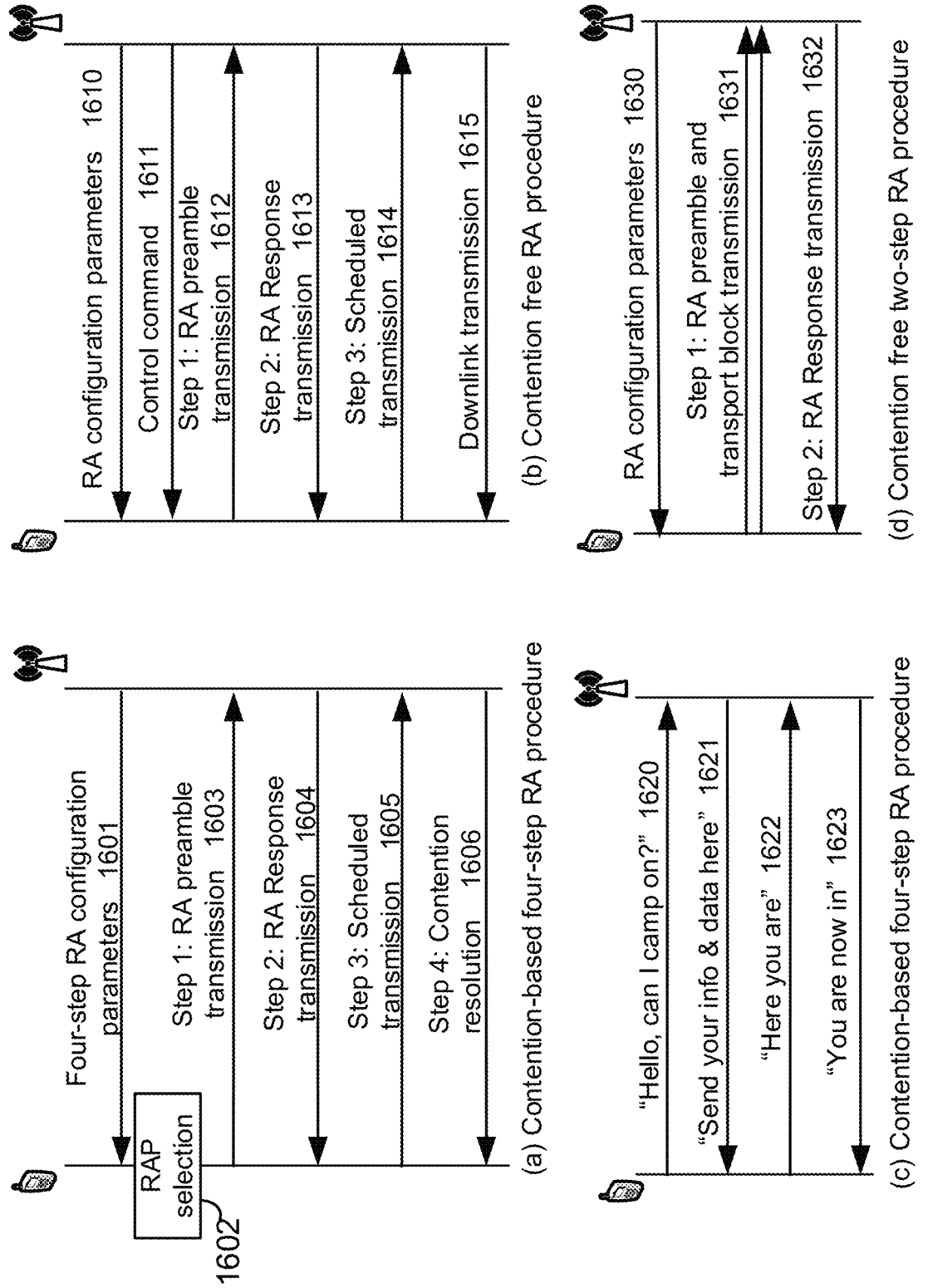
FIG. 16 shows example diagrams of Random Access (RA) procedures.

FIG. 16 shows examples of (a) a contention-based four-step RA procedure, (b) a contention free three-step RA procedure, (c) descriptions of a contention-based four-step RA procedure, and (d) a contention free two-step RA procedure. A four-step RA procedure may comprise a RAP transmission in a first step, an RAR transmission in a second step, a scheduled transmission of one or more transport blocks (TBs) in a third step, and contention resolution in a fourth step.

In step 1601, a base station may transmit four-step RA configuration parameters to a wireless device (e.g., a UE). The base station may generate and transmit RA configuration parameters periodically, e.g., based on a timer. The base station may broadcast RA configuration parameters in one or more messages. The wireless device may perform a RAP selection process at step 1602, e.g., after receiving the four-step RA configuration parameters. In a contention-based RA procedure, such as shown in part (a) of FIG. 16, the RA configuration parameters may comprise a root sequence that may be used by the wireless device to generate a RAP. The RAP may be randomly selected by the wireless device, among various RAP candidates generated by the root sequence, during the RAP selection process. The wireless device may perform the RAP selection using one or more RAP selections procedures, such as described herein.

In a first step of the RA procedure, at step 1603, a wireless device may transmit a RAP, e.g., using a configured RA preamble format with a transmission (Tx) beam. A random access channel (RACH) resource may be defined as a time-frequency resource to transmit a RAP. Broadcast system information may indicate whether wireless device should transmit one preamble, or multiple or repeated preambles, within a subset of RACH resources.

A base station may configure an association between a downlink (DL) signal and/or channel, and a subset of RACH resources and/or a subset of RAP indices, for determining the DL transmission in the second step. Based on the DL measurement and the corresponding association, a wireless device may select the subset of RACH resources and/or the subset of RAP indices. Two RAP groups may be informed by broadcast system information and one may be optional. If a base station configures the two groups in the four-step RA procedure, a wireless device may use determine which group from which the wireless device selects an RAP, for example, based on the pathloss and/or a size of the message to be transmitted by the wireless device in the third step. A base station may use a group type to which a RAP belongs as an indication of the message size in the third step and the radio conditions at a wireless device. A base station may broadcast the RAP grouping information along with one or more thresholds on system information.

In the second step of the four-step RA procedure, at step 1604, a base station may transmit a random access response (RAR) to the wireless device. The base station may transmit the RAR in response to an RAP that the wireless device may transmit. A wireless device may monitor the PDCCH carrying a DCI, to detect RARs transmitted on a PDSCH in an RA response window. The DCI may be CRC-scrambled by the RA-RNTI (Random Access-Radio Network Temporary Identifier). The RA-RNTI may be used on the PDCCH if Random Access Response messages are transmitted. The RA-RNTI may unambiguously identify which time-frequency resource is used by the MAC entity to transmit the Random Access preamble. The RA response window may start at a subframe that contains the end of an RAP transmission, plus three subframes. The RA response window may have the length indicated by ra-ResponseWindowSize. A wireless device may determine the RA-RNTI associated with the PRACH in which the wireless device transmits an RAP by the following operation:

$$RA\text{-}RNTI = 1 + t\_id + 10 * f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$). Different types of wireless devices, e.g., narrow band-Internet of Things (NB-IoT), bandwidth limited (BL)-UE, and/or UE-Extended Coverage (UE-EC), may use different formulas or operations for determining RA-RNTI. A base station may configure an association between a DL signal or channel, a subset of RACH resources, and/or a subset of RAP indexes. Such an association may be for determining the DL transmission in the second step of the RA procedure, at step 1604 of FIG. 16. Based on the DL measurement and the corresponding association, a wireless device may select the subset of RACH resources and/or the subset of RAP indices. FIG. 18 shows contents of a MAC RAR. For example, FIG. 18A shows the contents of a MAC RAR of a wireless device, FIG. 18B shows the contents of a MAC RAR of a MTC wireless device, and FIG. 18C shows the contents of MAC RAR of a NB-IoT wireless device.

In the third step of the four-step RA procedure (e.g., step 1605 in FIG. 16), a wireless device may adjust an UL time alignment by using the TA value corresponding to the TA command in the received RAR in the second step (e.g., step 1604 in FIG. 16). A wireless device may transmit one or more TBs to a base station using the UL resources assigned in the UL grant in the received RAR. One or more TBs that a wireless device may transmit in the third step (e.g., step 1605 in FIG. 16) may comprise RRC signaling, such as an RRC connection request, an RRC connection Re-establishment request, or an RRC connection resume request. The one or more TBs may also comprise a wireless device identity, e.g., which may be used as part of the contention-resolution mechanism in the fourth step (e.g., step 1606 in FIG. 16).

The fourth step in the four-step RA procedure (e.g., step 1606 in FIG. 16) may comprise a DL message for contention resolution. Based on the second step (e.g., step 1604 in FIG. 16), one or more wireless devices may perform simultaneous RA attempts selecting the same RAP in the first step (e.g., step 1603 in FIG. 16), and/or receive the same RAR with the same TC-RNTI in the second step (e.g., step 1604 in FIG. 16). The contention resolution in the fourth step may be to ensure that a wireless device does not incorrectly use another wireless device identity. The contention resolution mechanism may be based on either a C-RNTI on a PDCCH, or a wireless device Contention Resolution Identity on a DL-SCH, e.g., depending on whether or not a wireless device has a C-RNTI. If a wireless device has a C-RNTI, e.g., if the wireless device detects the C-RNTI on the PDCCH, the wireless device may determine the success of RA procedure. If the wireless device does not have a C-RNTI (e.g., if a C-RNTI is not pre-assigned), the wireless device may monitor a DL-SCH associated with a TC-RNTI, e.g., that a base station may transmit in an RAR of the second step. In the fourth step (e.g., step 1606 in FIG. 16), the wireless device may compare the identity in the data transmitted by the base station on the DL-SCH with the identity that the wireless device transmits in the third step (e.g., step 1605 in FIG. 16). If the wireless determines that two identities are the same or satisfy a threshold similarity, the wireless device may determine that the RA procedure is successful. If the wireless device determines that the RA is successful, the wireless device may promote the TC-RNTI to the C-RNTI. A TC-RNTI may be an identifier initially assigned to a wireless device when the wireless device first attempts to access a base station. A TC-RNTI may be used for a wireless device in an idle state. After access is allowed by the base station, a C-RNTI may be used for indicating the wireless device. A C-RNTI may be used for a wireless device in an inactive or an active state.

The fourth step in the four-step RA procedure (e.g., step 1606 in FIG. 16) may allow HARQ retransmission. A wireless device may start a mac-ContentionResolutionTimer when the wireless device transmits one or more TBs to a base station in the third step (e.g., step 1605 in FIG. 16). The wireless may restart the mac-ContentionResolutionTimer at each HARQ retransmission. When a wireless device receives data on the DL resources identified by C-RNTI or TC-RNTI in the fourth step (e.g., step 1606 in FIG. 16), the wireless device may stop the mac-ContentionResolutionTimer. If the wireless device does not detect the contention resolution identity that matches the identity transmitted by the wireless device in the third step (e.g., step 1605 in FIG. 16), the wireless device may determine that the RA procedure has failed and the wireless device may discard the TC-RNTI. Additionally or alternatively, if the mac-ContentionResolutionTimer expires, the wireless device may determine that the RA procedure has failed and the wireless device may discard the TC-RNTI. If the wireless device determines that the contention resolution has failed, the wireless device may flush the HARQ buffer used for transmission of the MAC PDU and the wireless device may restart the four-step RA procedure from the first step (e.g., step 1603 in FIG. 16). The wireless device may delay subsequent RAP transmission, e.g., by a backoff time. The backoff time may be randomly selected, e.g., according to a uniform distribution between 0 and the backoff parameter value corresponding to the BI in the MAC PDU for RAR.

In a four-step RA procedure, the usage of the first two steps may be, for example, to obtain an UL time alignment for a wireless device and/or to obtain an uplink grant. The third and fourth steps may be used to setup RRC connections, and/or resolve contention from different wireless devices.

Part (b) of FIG. 16 shows a three-step contention free RA procedure. A base station may transmit RA configuration parameters to a wireless device (e.g., a UE), in step 1610. In a contention-free RA procedure, such as shown in part (b) of FIG. 16, the configuration parameters may indicate to the wireless device what preamble to send to the base station and when to send the preamble. The base station may also transmit a control command to the wireless device at step 1611. The control command may comprise, e.g., downlink control information. In a first step of the RA procedure, the wireless device may transmit a random access preamble transmission to the base station at step 1612. The RAP transmission may be based on the RA configuration parameters and the control command. In a second step of the RA procedure, the base station may transmit to the wireless device a random access response at step 1613. In a third step of the RA procedure, the wireless device may transmit scheduled transmissions at step 1614. The scheduled transmissions may be based on the RAR. The contention free RA procedure may end with the third step. Thereafter, the base station may transmit a downlink transmission to the wireless device at step 1615. This downlink transmission may comprise, e.g., an acknowledgement (ACK) indication, a non-acknowledgement (NACK) indication, data, or other information.

Contention-free RA procedures such as described above may have reduced latency compared with contention-based RA procedures. Contention-based RA procedures may involve collisions, such as when more than one wireless device is attempting to communicate with the same base station at the same time.

Part (c) of FIG. 16 shows an example of common language descriptions that may facilitate an understanding of some of the messaging involved in the contention-based four-step RA procedure described above regarding part (a) of FIG. 16. In step 1 of the RA procedure, a wireless device may send a communication to a base station similar to a request such as, "Hello, can I camp on?" (step 1620). If the base station can accommodate the wireless device request, the base station may respond to the wireless device with a message similar to an instruction such as "Send your info & data here" (step 1621). Based on the base station's response, the wireless device may send a message similar to a response such as "Here you are" (step 1622). Based on the information received by the base station, the base station may respond with a message similar to a grant such as "You are now in" (step 1623).

Part (d) of FIG. 16 shows an example of a two-step contention free random access procedure of a wireless device. At step 1630, the wireless device may receive RA configuration parameters from a base station (e.g., from a handover source base station, and/or from a handover target base station via the handover source base station). The RA configuration parameters may comprise one or more parameters indicating a type of a random access process. The type of the random access process may indicate a two-step random access process. At step 1631, the wireless device may transmit an RA preamble and one or more transport blocks as a first step of the procedure, e.g., overlapping in time with each other. In response to the RA preamble and/or the one or more transport blocks, at step 1632, the wireless device may receive an RA response from a base station (e.g., a handover target base station).

Figure 17:
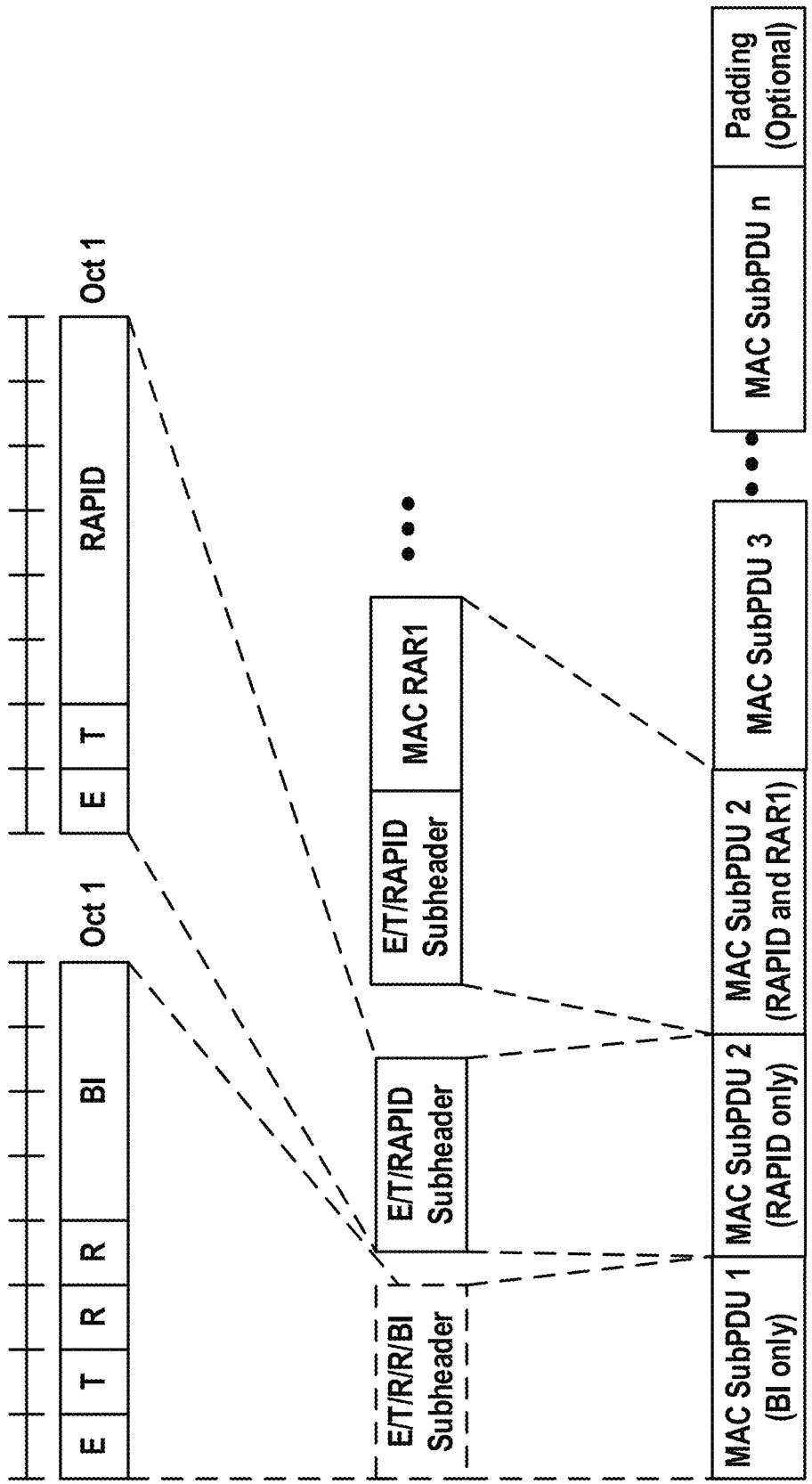
FIG. 17 shows an example diagram of a media access control (MAC) packet data unit (PDU) comprising a MAC header and MAC random access responses (RARs).

FIG. 17 shows an example of a MAC PDU comprising a MAC header and MAC RARs. A four-step RA procedure may use the arrangement shown in FIG. 17. A two-step RA procedure may also use the arrangement shown in FIG. 17. Additionally or alternatively, a two-step RA procedure may use a variation of the arrangement shown in FIG. 17, e.g., with additional or fewer fields, and/or with longer or shorter fields. If an RAR comprises a RAPID corresponding to a RAP that a wireless device transmits, the wireless device may process the data in the RAR. The data in the RAR may comprise, e.g., one or more of a timing advance (TA) command, a UL grant, and/or a Temporary C-RNTI (TC-RNTI). The MAC header may comprise subheaders, such as an E/T/R/R/BI subheader (described further below) and up to n number of E/T/RAPID subheaders (described further below). The E/T/R/R/BI subheader may comprise an octet of bits comprising 1 bit each of E, T, R, and R, and four bits of BI. Each of n E/T/RAPID subheaders may comprise an octet comprising 1 bit each of E and T, and 6 bits of an RAPID. The E/T/R/R/BI subheader may comprise a MAC SubPDU (e.g., MAC SubPDU 1 or MAC SubPDU 2). The MAC SubPDU may be for a BI, a RAPID, and/or an RAR.

Figure 19:
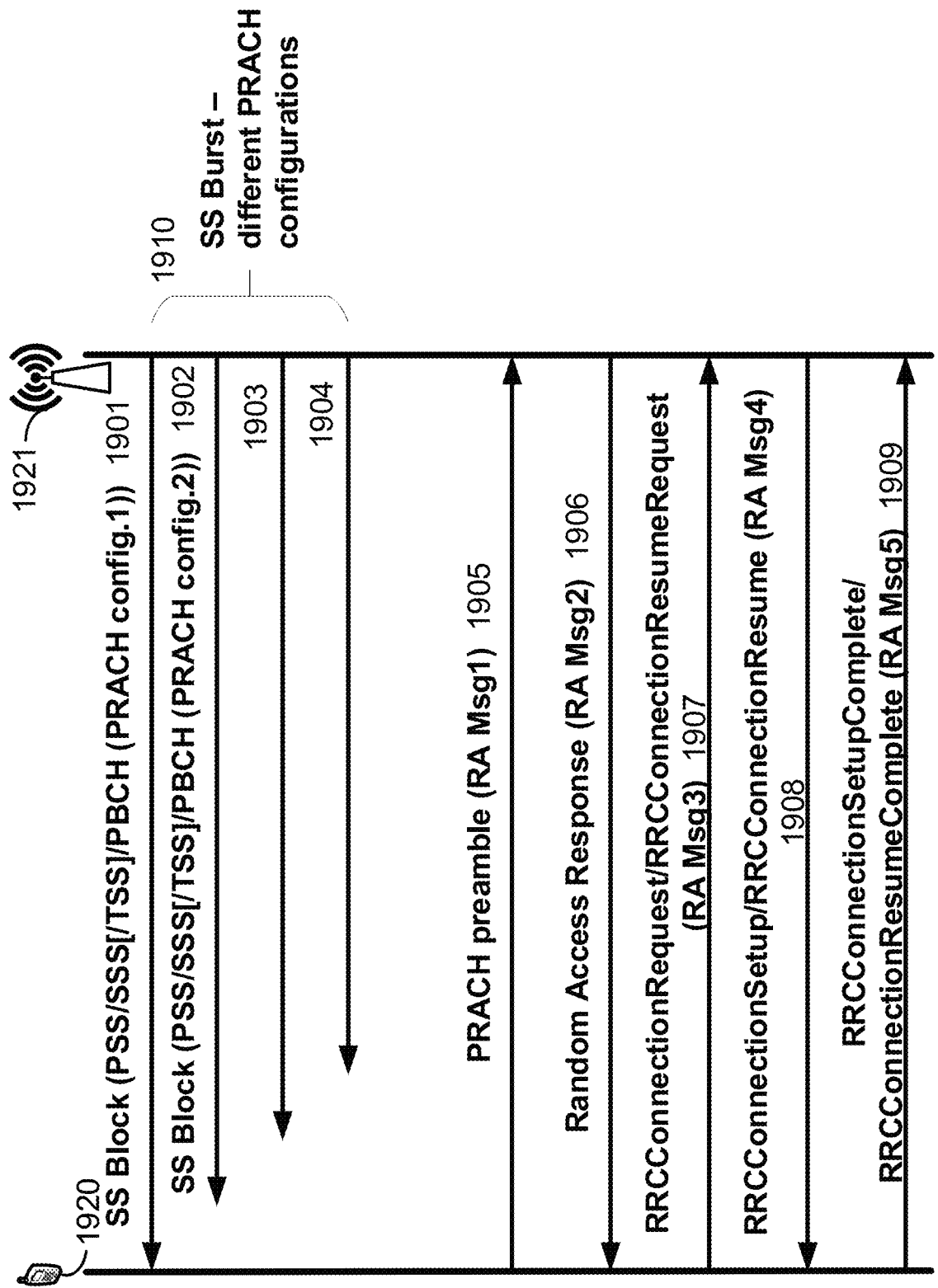
FIG. 19 shows an example diagram of random access procedure in a multiple-beam system.

PSS, SSS, and/or PBCH may be repeated, for example, for multiple beams for a cell, to support cell selection, reselection, and/or initial access procedures. A RACH process is shown in FIG. 19. For an SS burst, the associated PBCH, or a PDSCH (e.g., indicated by a PPDCCH in common search space), scheduling system information (e.g., a SIB2), may be broadcasted to multiple wireless devices. The system information (e.g., a SIB2) may carry a PRACH configuration for a beam. A base station may have a RACH configuration for a beam, which may include PRACH preamble pool, time and/or frequency radio resources, and/or other power related parameters.

A wireless device may use a PRACH preamble selected from a RACH configuration to initiate a contention-based RACH procedure or a contention-free RACH procedure. The wireless device may perform a 4-step RACH procedure, which may be a contention-based or contention-free RACH procedure. The wireless device may select a beam associated with an SS block that may have the best receiving signal quality. The wireless device may successfully detect a cell identifier that may be associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1921 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, for example, after or in response to receiving one or more SS blocks or SS bursts. The preamble may comprise a PRACH preamble, and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, for example, after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1921 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, for example, after or in response to receiving the RAR. The base station 1921 may send to the wireless device 1920 an RRCConnectionSetup and/or RRCConnectionResume message, which may be referred to as RA Msg4, at step 1908, for example, after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, for example, after or in response to receiving the RRCConnectionSetup and/or RRCConnectionResume. An RRC connection may be established between the wireless device 1920 and the base station 1921, and the random access procedure may end, for example, after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection, and associated with the RSRP value of the beam. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, for example, via common RRC signaling. Additionally or alternatively, a CSI-RS resource may be configured in a wireless device-specific way, for example, via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent (SP) transmission, a base station may transmit the configured CSI-RS resource within a configured period. A base station may transmit one or more SP CSI-RS with a configured periodicity, with a limited or unlimited duration. A base station may configure different CSI-RS resources in different terms for different purposes. Different terms may include, for example, cell-specific, device-specific, periodic, aperiodic, multi-shot, or other terms. Different purposes may include, for example, beam management, CQI reporting, or other purposes.

Figure 20:
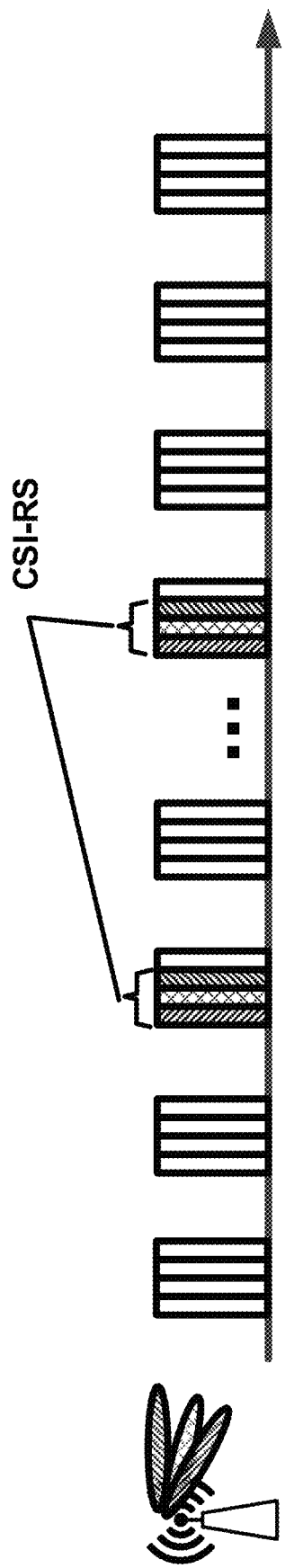
FIG. 20 shows an example diagram of a channel state information-reference signal (CSI-RS) transmission in a multi-beam system.

FIG. 20 shows an example of transmitting CSI-RSs periodically for a beam. A base station 20701 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
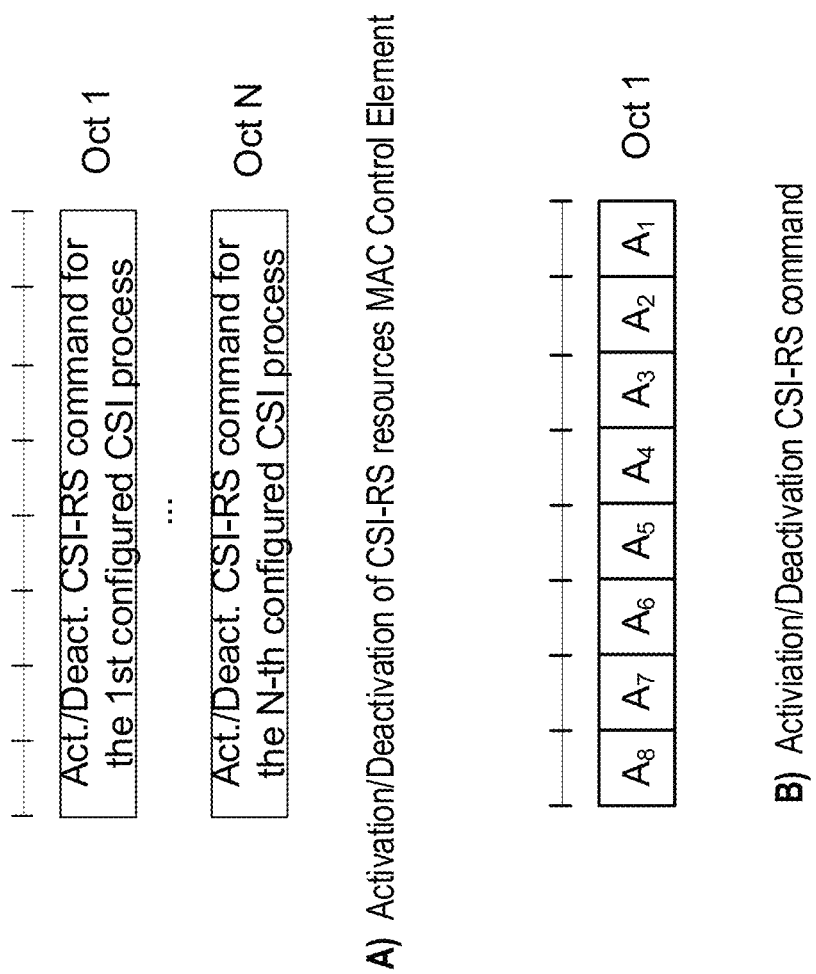
FIG. 21 shows an example diagram of activation/Deactivation of a CSI-RS resources MAC Control Element and a CSI-RS command.

FIG. 21 part "A" shows an example of an activation/deactivation CSI-RS resources MAC control element. The activation/deactivation CSI-RS resources MAC control element may be identified by a MAC subheader with LCID. The activation/deactivation CSI-RS resources MAC control element may have a variable size that may be based on the number of CSI processes configured with csi-RS-NZP-Activation by RRC (N). The N number of octets, shown in FIG. 21 part "A," each of which may comprise a number of A fields (e.g., A1 to Ai, described below), may be included in ascending order of a CSI process ID, such as the CSI-ProcessId.

FIG. 21 part "B" shows an example of an activation/deactivation CSI-RS command that may activate and/or deactivate CSI-RS resources for a CSI process. For example, for a wireless device that is configured with transmission mode 9, N equals 1. Transmission mode 9 may be a transmission mode in which a base station may transmit data packets with up to 8 layers, for example, if configured with multiple antennas. A wireless device may receive the data packets based on multiple DMRSs (e.g., up to 8 DMRSs (or DMRS ports)). The activation/deactivation CSI-RS resources MAC control element may apply to the serving cell on which the wireless device may receive the activation/deactivation of CSI-RS resources MAC control element.

Activation/deactivation CSI-RS resources MAC control elements may comprise an octet of fields, shown as fields A1 to A8, that may indicate the activation/deactivation status of the CSI-RS resources configured by upper layers for the CSI process. A1 may correspond to the first entry in a list of CSI-RS, which may be specified by csi-RS-ConfigNZP-ApList configured by upper layers. A2 may correspond to the second entry in the list of CSI-RS, and each of A3 through A8 may correspond to the third through eighth entry, respectively, in the list of CSI-RS. The Ai field may be set to "1" to indicate that the $i^{th}$ entry in the list of CSI-RS, which may be specified by csi-RS-ConfigNZP-ApList, shall be activated. The Ai field may be set to "0" to indicate that the $i^{th}$ entry in the list shall be deactivated. For each CSI process, the number of Ai fields (e.g., i=1, 2, . . . , 8) which are set to "1" may be equal to the value of a higher-layer parameter, such as activatedResources.

A wireless device may be triggered with aperiodic CSI reporting, for example, after receiving a RRC for CSI-RS configuration and a MAC layer signaling for CSI-RS activation. The aperiodic CSI reporting may be associated with the CSI-RS resources indicated in a DCI, for example, with DCI format 0C. A CSI request field in DCI format 0C may indicate for which CSI process and/or CSI-RS resource the CSI reporting is configured, such as shown in FIG. 22.

Figure 23:
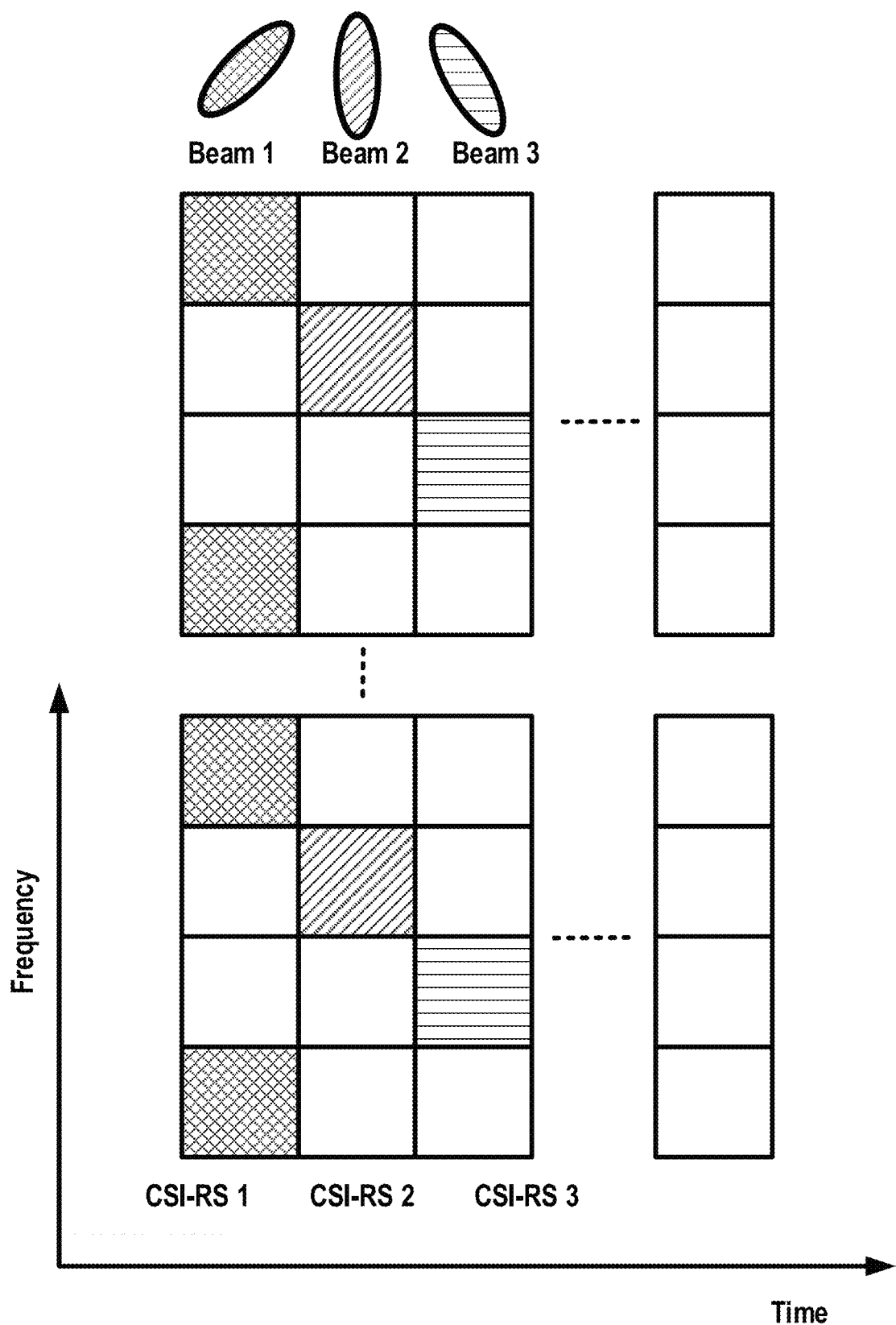
FIG. 23 shows an example diagram of a CSI-RS mapping in time and frequency domains.

As shown in FIG. 23, a CSI-RS may be mapped in time and frequency domains. Each square shown in FIG. 23 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

CSI-RS may be configured using common parameters, for example, when a plurality of wireless devices receive the same CSI-RS signal. CSI-RS may be configured using wireless device dedicated parameters, for example, when a CSI-RS is configured for a specific wireless device. CSI-RSs may be included in RRC signaling. A wireless device may be configured, for example, depending on different MIMO beamforming types (e.g., CLASS A or CLASS B), with one or more CSI-RS resource configurations per CSI process. A wireless device may be configured using at least RRC signaling.

FIG. 23 shows three beams that may be configured for a wireless device, for example, in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

A wireless device may perform downlink beam management using a wireless device-specific configured CSI-RS. In a beam management procedure, a wireless device may monitor a channel quality of a beam pair link. The beam pair link may comprise a transmitting beam from a base station (e.g., a gNB in NR) and a receiving beam by the wireless device (e.g., a UE). If multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, for example, one or more beam identifications, RSRP, PMI, CQI, and/or RI, of a subset of configured beams.

A base station and/or a wireless device may perform a downlink L1/L2 beam management procedure. One or more downlink L1/L2 beam management procedures may be performed within one or multiple transmission and receiving points (TRPs) FIG. 24 shows examples of three beam management procedures, P1, P2, and P3. Procedure P1 may be used to enable a wireless device measurement on different transmit (Tx) beams of a TRP (or multiple TRPs), for example, to support a selection of Tx beams and/or wireless device receive (Rx) beam(s) (shown as shaded ovals in the top row and bottom row, respectively, of P1). Beamforming at a TRP (or multiple TRPs) may include, for example, an intra-TRP and/or inter-TRP Tx beam sweep from a set of different beams (shown, in the top rows of P1 and P2, as unshaded ovals rotated in a counter-clockwise direction indicated by the dashed arrow). Beamforming at a wireless device 2401, may include, for example, a wireless device Rx beam sweep from a set of different beams (shown, in the bottom rows of P1 and P3, as unshaded ovals rotated in a clockwise direction indicated by the dashed arrow). Procedure P2 may be used to enable a wireless device measurement on different Tx beams of a TRP (or multiple TRPs) (shown, in the top row of P2, as unshaded ovals rotated in a counter-clockwise direction indicated by the dashed arrow), for example, which may change inter-TRP and/or intra-TRP Tx beam(s). Procedure P2 may be performed, for example, on a smaller set of beams for beam refinement than in procedure P1. P2 may be a particular example of P1. Procedure P3 may be used to enable a wireless device measurement on the same Tx beam (shown as shaded oval in P3), for example, to change a wireless device Rx beam if the wireless device 2401 uses beamforming.

Based on a wireless device's beam management report, a base station may transmit, to the wireless device, a signal indicating that one or more beam pair links are the one or more serving beams. The base station may transmit PDCCH and/or PDSCH for the wireless device using the one or more serving beams.

A wireless device 2401 (e.g., a UE) and/or a base station 2402 (e.g., a gNB) may trigger a beam failure recovery mechanism. The wireless device 2401 may trigger a beam failure recovery (BFR) request transmission, for example, if a beam failure event occurs. A beam failure event may include, for example, a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2401 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2402 may indicate whether an RS resource, for example, that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2401, and the channel characteristics from a transmission via a control channel to the wireless device, are similar or the same under a configured criterion.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, for example, via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, for example, after or in response to receiving the beam failure recovery request. A beam recovery mechanism may be, for example, an L1 scheme, or a higher layer scheme.

A base station may transmit one or more messages comprising, for example, configuration parameters for an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A base station may send a confirmation message to a wireless device, for example, after or in response to the base station receiving one or multiple BFR requests. The confirmation message may comprise the CRI associated with the candidate beam the wireless may indicate in the one or multiple BFR requests. The confirmation message may comprise an L1 control information.

LTE-Advanced introduced Carrier Aggregation (CA) in Release-10. In Release-10 CA, the Primary Cell (PCell) is always activated. In addition to the PCell, a base station may transmit one or more RRC message comprising configuration parameters for one or more secondary cells. In 3GPP LTE/LTE-A specification, there are many RRC messages used for Scell configuration/reconfiguration. For example, the base station may transmit a RRCconnectionReconfiguration message for parameters configuration of one or more secondary cells for a wireless device, wherein the parameters may comprise at least: cell ID, antenna configuration, CSI-RS configuration, SRS configuration, PRACH configuration, etc.

The one or more SCells configured in the RRC message can be activated or deactivated by at least one MAC Control Element (MAC CE). The SCell activation/deactivation processes were introduced to achieve battery power savings. After an SCell is deactivated, the wireless device may stop receiving downlink signals and stop transmission on the SCell. In LTE-A specification, the default state of an SCell is deactivated if the SCell has been configured/added. Additional activation procedure employing MAC CE Activation Command may be needed to activate the SCell. SCells may be deactivated either by an activation/deactivation MAC CE or by the sCellDeactivationTimer. The wireless device and base station maintain one sCellDeactivationTimer per SCell with a common value across SCells. A base station maintains the activation/deactivation status of an SCell for a wireless device. The same initial timer value may apply to each instance of the sCellDeactivationTimer and it is configured by RRC. sCellDeactivationTimer is included in Mac-MainConfig dedicated parameter in an RRC message. The configured SCells may be initially deactivated upon addition and after a handover.

Figure 25A:
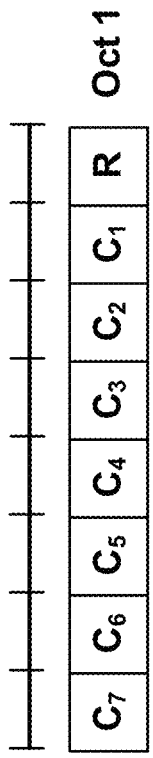
FIG. 25A and FIG. 25B show example diagrams of activation/deactivation MAC control elements.
Figure 25B:
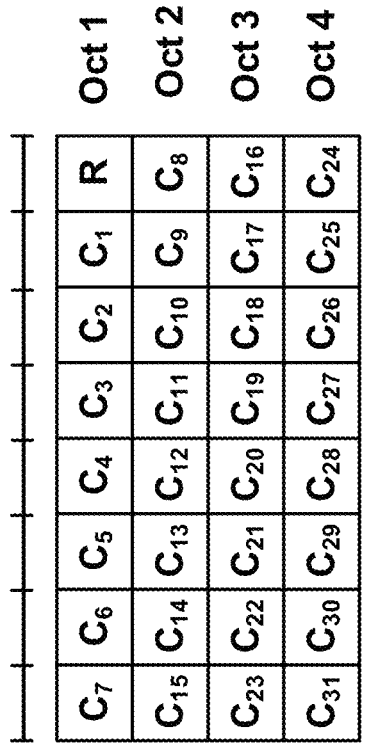

The activation/deactivation MAC control element may be used in a variety of ways. The activation/deactivation MAC control element may be identified by a MAC PDU subheader, for example, with a pre-assigned LCID. The activation/deactivation MAC CE may have a fixed size, such as a single octet comprising seven C-fields and one R-field as shown in FIG. 25A and FIG. 27B. The activation/deactivation MAC control element may comprise field indicating by Ci. If there is an SCell configured with SCellIndex i, Ci may indicate the activation/deactivation status of the SCell with SCellIndex i, else the MAC entity may ignore the Ci field. The Ci field may be set to a value of "1" to indicate that the SCell with SCellIndex i may be activated. The Ci field may be set to a value of "0" to indicate that the SCell with SCellIndex i may be deactivated. The field R may correspond to a reserved bit, which may be set to a value of "0". If a wireless device is configured with a larger number of carriers (e.g., more than 5 or 7 carriers), the activation/deactivation MAC CE may comprise more than one byte, which may comprise a longer bitmap such as shown in FIG. 25B.

Deactivation timer management processes may be performed. For example, if a PDCCH on the activated SCell indicates an uplink grant or a downlink assignment; or if a PDCCH on a serving cell scheduling the activated SCell indicates an uplink grant or a downlink assignment for the activated SCell: the wireless device may restart an sCellDeactivationTimer associated with the SCell. A MAC entity may (e.g., for each TTI and for each configured SCell) perform certain functions related to activation and/or deactivation of one or more SCells. If the MAC entity receives an activation/deactivation MAC CE activating the SCell in a TTI, the MAC entity may: activate the SCell; start or restart the sCellDeactivationTimer associated with the SCell; and/or trigger PHR. If the MAC entity receives an activation/deactivation MAC CE deactivating the SCell in a TTI, or if the sCellDeactivationTimer associated with the activated SCell expires in the TTI, the MAC entity may: deactivate the SCell; stop the sCellDeactivationTimer associated with the SCell; and/or flush all HARQ buffers associated with the SCell.

If a wireless device activates the SCell, the wireless device may perform SCell operations including: SRS transmissions on the SCell; CQI, PMI, rank indicator (RI), and/or precoding type indicator (PTI) reporting for the SCell; PDCCH monitoring on the SCell; and/or PDCCH monitoring for the SCell. If the SCell is deactivated, a wireless device may perform the following actions: not transmit SRSs on the SCell; not report CQI, PMI, RI, and/or PTI for the SCell; not transmit on an UL-SCH on the SCell; not transmit on a RACH on the SCell; not monitor the PDCCH on the SCell; not monitor the PDCCH for the SCell. For an SCell that is self-scheduled (e.g., by a PDCCH transmitted on the SCell), the wireless device may not monitor the PDCCH on the SCell if the SCell is deactivated. For an SCell that is is cross-carrier scheduled by a serving cell (e.g., a cell other than the SCell), the wireless device may not monitor the PDCCH for the SCell if the SCell is deactivated. If an SCell is deactivated, the ongoing random access procedure on the SCell, if any, may be aborted.

If a wireless device receives a MAC activation command for a secondary cell in subframe n, the corresponding actions in the MAC layer may be applied no later than a minimum time period (e.g., such as indicated in 3GPP TS 36.133) and no earlier than a maximum time period (e.g., subframe n+8), except for the following: the actions related to CSI reporting and the actions related to the sCellDeactivationTimer associated with the secondary cell, which may be applied in the maximum time period (e.g., subframe n+8). If a wireless device receives a MAC deactivation command for a secondary cell or the sCellDeactivationTimer associated with the secondary cell expires in subframe n, the corresponding actions in the MAC layer may apply no later than the minimum time period (e.g., such as indicated in 3GPP TS 36.133), except for the actions related to CSI reporting which may be applied in the maximum time period (e.g., subframe n+8).

Figure 26:
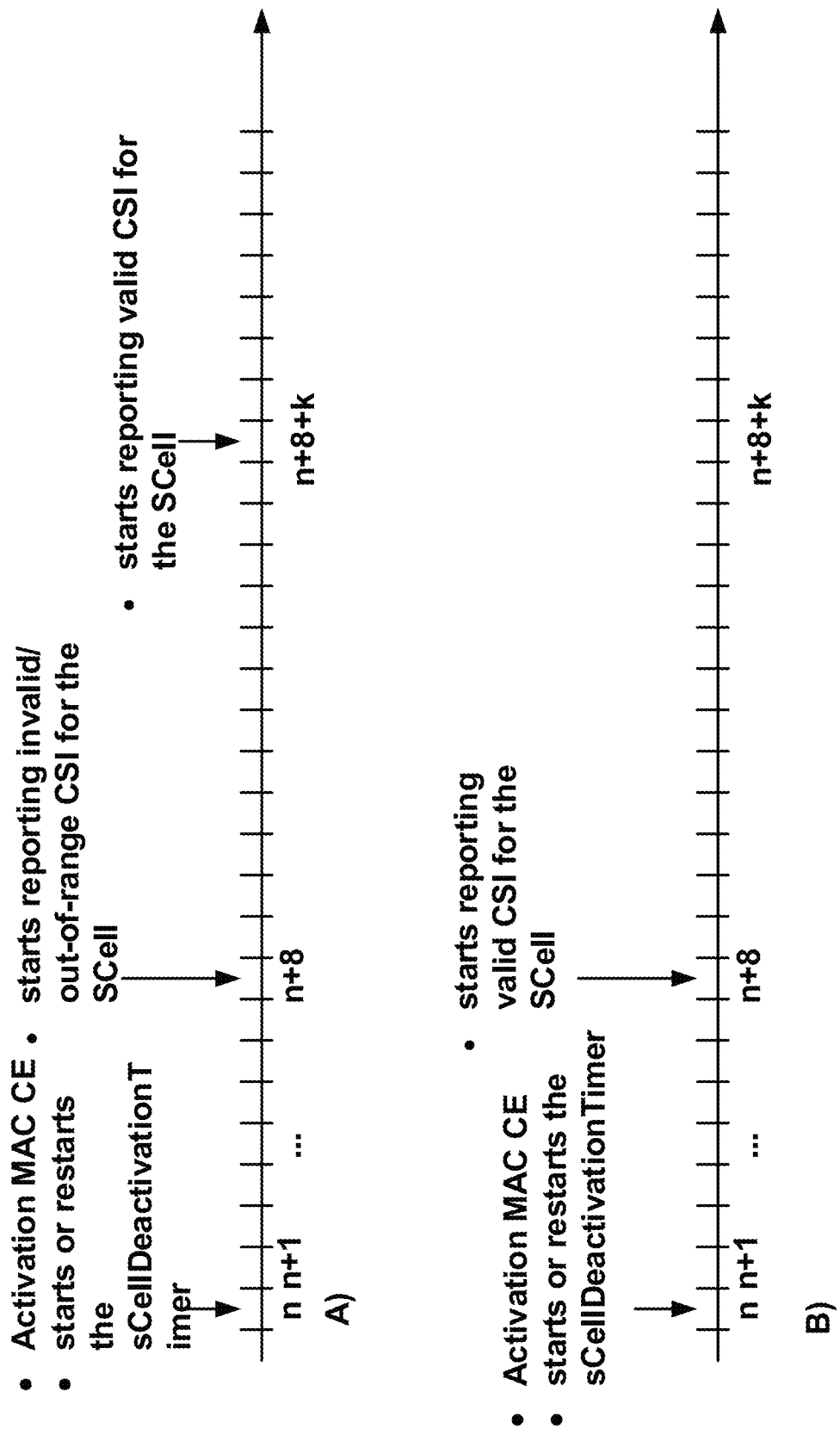
FIG. 26 shows an example diagram of a sCellDeactivationTimer starting and CSI reporting for an SCell.

If a wireless device receives a MAC activation command for a secondary cell in subframe n, the actions related to CSI reporting and the actions related to the sCellDeactivationTimer associated with the secondary cell, may be applied in subframe n+8. If a wireless device receives a MAC deactivation command for a secondary cell or other deactivation conditions are met (e.g., the sCellDeactivationTimer associated with the secondary cell expires) in subframe n, the actions related to CSI reporting may be applied in subframe n+8. FIG. 26 shows an example timeline for a wireless device receiving a MAC activation command. The wireless device may start or restart the sCellDeactivationTimer in the $n^{th}$ subframe, if the wireless device receives a MAC activation command in the $n^{th}$ subframe, such as shown in parts "(a)" and "(b)" of FIG. 26. The wireless device may start reporting invalid (e.g., as shown in part "(a)") or valid (e.g., as shown in part "(b)") CSI for the SCell at the $(n+8)^{th}$ subframe, if the wireless device receives a MAC activation command in the $n^{th}$ subframe. A wireless device (e.g., having slow activation) may report an invalid CSI (e.g., out-of-range CSI) at the (n+8)th subframe, such as shown in part "(a)" of FIG. 26. The wireless device may start reporting a valid CSI for the SCell as a later subframe, such as subframe n+8+k, as shown in part "(a)". A wireless device (e.g., having a quick activation) may report a valid CSI at the (n+8)th subframe, such as shown in part "(b)" of FIG. 26.

If a wireless device receives a MAC activation command for an SCell in subframe n, the wireless device may start reporting CQI, PMI, RI, and/or PTI for the SCell at subframe n+8, and/or the wireless device may start or restart the sCellDeactivationTimer associated with the SCell at subframe n+8. The sCellDeactivationTimer may be maintained in both the base station and the wireless device, wherein both wireless device and base station may stop, start, and/or restart this timer in the same TTI. Without such maintaining of the timer, the sCellDeactivationTimer in the wireless device may not be in-sync with the corresponding sCellDeactivationTimer in the base station. The base station may start monitoring and/or receiving CSI (e.g., CQI, PMI, RI, and/or PTI) according to a predefined timing in the same TTI and/or after wireless device starts transmitting the CSI. If the CSI timings in wireless device and base station are not coordinated, for example, based on a common standard or air interface signaling, the network operation may result in inefficient operations and/or errors.

A base station may transmit, via a PDCCH, a DCI for scheduling decision and power-control commands. The DCI may comprise one or more of: downlink scheduling assignments, uplink scheduling grants, or power-control commands. The downlink scheduling assignments may comprise one or more of: PDSCH resource indication, transport format, HARQ information, control information related to multiple antenna schemes, or a command for power control of the PUCCH used for transmission of ACK/NACK based on or in response to downlink scheduling assignments. The uplink scheduling grants may comprise one or more of: PUSCH resource indication, transport format, HARQ related information, or a power control command of the PUSCH.

Different types of control information may correspond to different DCI message sizes. Supporting spatial multiplexing with noncontiguous allocation of RBs in the frequency domain may require a larger scheduling message in comparison with an uplink grant that may allow only frequency-contiguous allocation. The DCI may be categorized into different DCI formats (e.g., such as in an LTE system), where a format may correspond to a certain message size and/or usage. Table 2 below provides a summary of example DCI formats, including the size for an example of a 20 MHz FDD operation with two Tx antennas at the base station 2602 and no carrier aggregation.

A wireless device may monitor one or more PDCCH to detect one or more DCI with one or more DCI formats. The one or more PDCCH may be transmitted in common search space or wireless device-specific search space. The wireless device may monitor PDCCH with only a limited set of DCI format, for example, to save power consumption. The wireless device may not be required to detect a DCI with DCI format 6, which may be used for an eMTC wireless device. The wireless device may consume more power based on the number of DCI formats to be detected. The more DCI formats to be detected, the more power may be consumed by the wireless device.

The one or more PDCCH candidates that a wireless device monitors may be defined in terms of PDCCH wireless device-specific search spaces. A PDCCH wireless device-specific search space at CCE aggregation level L E {1, 2, 4, 8} may be defined by a set of PDCCH candidates for CCE aggregation level L. For a DCI format, a wireless device may be configured per serving cell by one or more higher layer parameters a number of PDCCH candidates per CCE aggregation level L.

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
| Downlink | 1C | 31 | Special purpose compact assignment |
|  | 1A | 45 | Contiguous allocation only |
|  | 1B | 46 | Codebook-based beamforming using CRS |

-continued

|  | DCI format | Example size (Bits) | Usage |
|---|---|---|---|
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
| Special | 3, 3A | 45 | Power control commands |
|  | 5 |  | Sidelink operation |
|  | 6-2 |  | Paging/direct indication for eMTC devices |

Information in the DCI formats that may be used for downlink scheduling may be organized into different groups. One or more fields of the DCI formats may comprise one or more of: resource information, such as a carrier indicator (e.g., 0 or 3 bits) and/or a RB allocation; a HARQ process number; an MCS, new data indicator (NDI), and/or RV (e.g., for the first TB and/or for the second TB); MIMO related information such as PMI, precoding information, a transport block swap flag, a power offset between PDSCH and a reference signal, a reference-signal scrambling sequence, a number of layers, and/or a number of antenna ports for a transmission; PDSCH resource-element mapping and/or QCI; downlink assignment index (DAI); a transmit power control (TPC) for PUCCH; a SRS request (e.g., 1 bit), that may comprise an indication of or trigger for a one-shot SRS transmission; an ACK and/or NACK offset; a DCI format indication, for example, which may be used to differentiate between DCI format 1A and DCI format 0 or other formats that may have the same message size; and/or padding (e.g., if necessary).

Information in the DCI formats that may be used for uplink scheduling may be organized into different groups. One or more fields of the DCI formats may comprise one or more of: resource information, such as a carrier indicator, resource allocation type, and/or a RB allocation; an MCS and/or NDI (e.g., for the first TB and/or for the second TB); a phase rotation of the uplink demodulation reference signal (DMRS); precoding information; a CSI request, a request for an aperiodic CSI report; a SRS request (e.g., 2 bits), that may comprise an indication of or a trigger for an aperiodic SRS transmission that may use one of up to three preconfigured settings; an uplink index/DAI; a TPC for PUSCH; a DCI format indication, for example, which may be used to differentiate between DCI format 1A and DCI format 0; and/or padding (e.g., if necessary).

A base station may perform CRC scrambling on a DCI, for example, before transmitting the DCI via a PDCCH. The base station may perform CRC scrambling, for example, by bit-wise addition (or, e.g., modulo-2 addition or exclusive OR (XOR) operation) of multiple bits of at least one wireless device identifier (e.g., C-RNTI, TC-RNTI, SI-RNTI, RA-RNTI, and the like) with the CRC bits of the DCI. The wireless device may check the CRC bits of the DCI, if detecting the DCI. The wireless device may receive the DCI if the CRC is scrambled by a sequence of bits that is the same as (or indicates a match with) the at least one wireless device identifier.

A base station may transmit one or more PDCCH in different control resource sets, for example, which may support wide bandwidth operation. The base station may transmit one or more RRC message comprising configuration parameters for one or more control resource sets. At least one of the one or more control resource sets may comprise one or more of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and/or a REG bundle size, such as for interleaved CCE-to-REG mapping (e.g., CORESET_REG_bundle). A wireless device may monitor PDCCH to detect a DCI on a subset of control resource sets (e.g., if control resource sets are configured). Such monitoring may reduce power consumption by the wireless.

A base station may transmit one or more messages comprising configuration parameters for one or more active bandwidth parts (BWPs). The one or more active BWPs may have different numerologies. The base station may transmit, to a wireless device, control information for cross-BWP scheduling.

Figure 27:
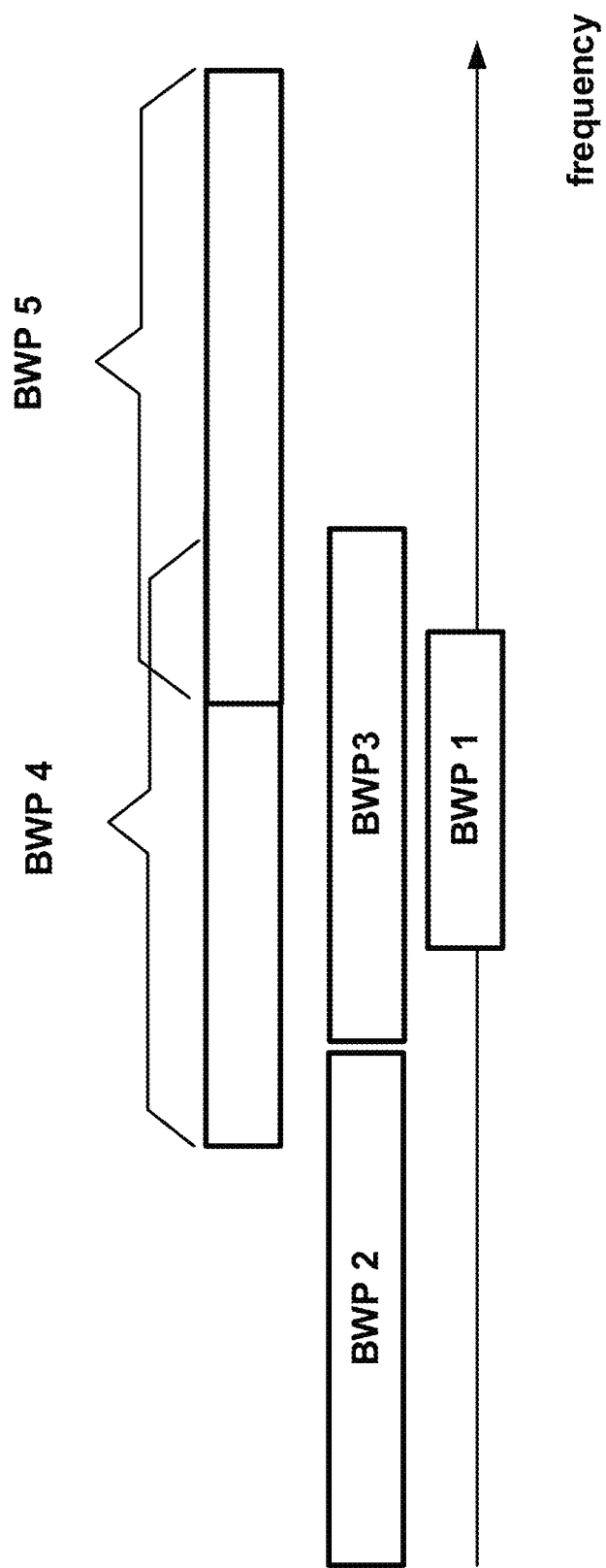
FIG. 27 shows an example diagram of multiple Bandwidth Parts (BWPs) configuration in a frequency domain.

FIG. 27 shows an example of multiple BWP configurations. One or more BWPs may overlap with one or more other BWPs in a frequency domain. For example, BWP 1 may overlap BWP 3, both of which may overlap BWP 4 and BWP 5; BWP 2 may overlap BWP 4; and/or BWP 4 may overlap BWP 5. One or more BWPs may have a same central frequency with one or more other BWPs. For example, BWP 1 may have a same central frequency as BWP 3.

A base station may transmit one or more messages comprising configuration parameters for one or more DL BWPs and/or one or more UL BWPs for a cell. The one or more BWPs may comprise at least one BWP as the active DL BWP or the active UL BWP, and/or zero or one BWP as the default DL BWP or the default UL BWP. For a PCell, the active DL BWP may be the DL BWP on which the wireless device may monitor one or more PDCCH and/or receive PDSCH. The active UL BWP may be the UL BWP on which the wireless device may transmit an uplink signal. For an SCell, the active DL BWP may be the DL BWP on which the wireless device may monitor one or more PDCCH and receive PDSCH when the SCell is activated, for example, by receiving an activation/deactivation MAC CE. The active UL BWP may be the UL BWP on which the wireless device may transmit PRACH and/or PUCCH (e.g., if configured) and/or PUSCH if the SCell is activated, for example, by receiving an activation/deactivation MAC CE.

Configuration of multiple BWPs may be used to reduce a wireless device power consumption. A wireless device configured to use an active BWP and a default BWP may switch to the default BWP, for example, if there is no activity on the active BWP. A default BWP may be configured to use a narrow bandwidth, and/or an active BWP may be configured to use a wide bandwidth. If there is no signal transmitting on or receiving from an active BWP, the wireless device may switch the BWP to the default BWP, which may reduce power consumption.

Switching a BWP may be triggered by a DCI and/or a timer. If a wireless device receives a DCI indicating DL BWP switching from an active BWP to a new BWP, the wireless device may monitor PDCCH and/or receive PDSCH on the new BWP, for example, after or in response to receiving the DCI. If the wireless device receives a DCI indicating UL BWP switching from an active BWP to a new BWP, the wireless device may transmit PUCCH (e.g., if configured) and/or PUSCH on the new BWP, for example, after or in response to receiving the DCI.

A base station may transmit, to a wireless device, one or more RRC messages comprising a BWP inactive timer. The wireless device may start the timer, for example, if it switches its active DL BWP to a DL BWP other than the default DL BWP. The wireless device may restart the timer to the initial value, for example, if it successfully decodes a DCI to schedule PDSCH(s) in its active DL BWP. The wireless device may switch its active DL BWP to the default DL BWP, for example, if the BWP timer expires.

Figure 28:
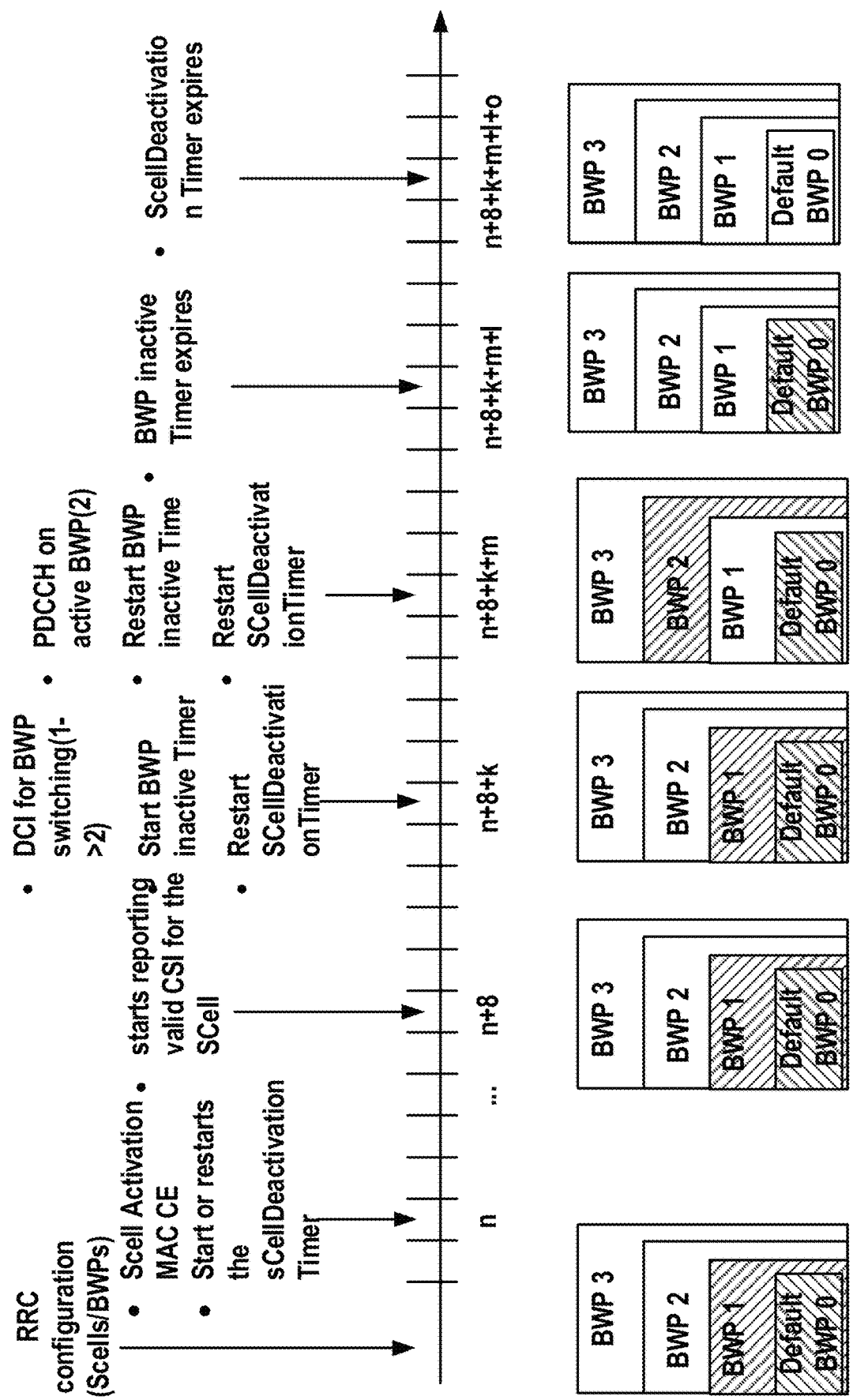
FIG. 28 shows an example diagram of BWP inactivity timer and a sCellDeactivationTimer relation for an activated SCell.

FIG. 28 shows an example of BWP switching associated with a BWP inactive timer. A wireless device may receive one or more RRC messages comprising parameters for an SCell and one or more BWP configuration associated with the SCell. Among the one or more BWPs, at least one BWP may be configured as the first active BWP (e.g., BWP 1), and/or one BWP may be configured as the default BWP (e.g., BWP 0). The wireless device may receive a MAC CE to activate the SCell at the $n^{th}$ subframe. The wireless device may start or restart the sCellDeactivationTimer at the $n^{th}$ subframe, and may start action related to CSI reporting for the SCell, or for the initial active BWP of the SCell, at the $(n+8)^{th}$ subframe. The wireless device may start the BWP inactive timer and/or restart the sCellDeactivationTimer (e.g., if the wireless device receives a DCI indicating switching a BWP from BWP 1 to BWP 2), at the $(n+8+k)^{th}$ subframe. If the wireless device receives a PDCCH indicating a DL scheduling on BWP 2, for example, at the $(n+8+k+m)^{th}$ subframe, the wireless device may restart the BWP inactive timer and/or the wireless device may restart the sCellDeactivationTimer. The wireless device may switch back to the default BWP (e.g., BWP 0) if the BWP inactive timer expires, for example, at the $(n+8+k+m+1)^{th}$ subframe. The wireless device may deactivate the SCell if the sCellDeactivationTimer expires, for example, at the $(n+8+k+m+1+o)^{th}$ subframe.

The BWP inactive timer may be applied in a PCell. A base station may transmit one or more RRC messages comprising a BWP inactive timer to a wireless device. The wireless device may start the timer if the wireless devices switches its active DL BWP to a DL BWP other than the default DL BWP. The wireless device may restart the timer to the initial value if it successfully decodes a DCI to schedule PDSCH(s) in its active DL BWP. The wireless device may switch its active DL BWP to the default DL BWP if the BWP timer expires.

The BWP inactive timer may be used to reduce wireless device power consumption, for example, if the wireless device is configured with multiple cells and at least one cell has a wide bandwidth. For example, the wireless device may transmit on or receive from a narrow-bandwidth BWP on the PCell or SCell if there is no activity on an active BWP. The wireless device may deactivate the SCell, which may be triggered by sCellDeactivationTimer expiring, if there is no activity on the SCell.

CSI reporting and/or semi-persistent (SP) CSI reporting may be activated and/or deactivated by a MAC CE. The MAC CE may comprise a BWP identifier which may reduce activation time delay that may otherwise occur for BWP switching. The MAC CE comprising a BWP identifier may enable a base station flexibility in transmitting the MAC. The MAC CE comprising a BWP identifier may reduce downlink data scheduling delay. The MAC CE comprising a BWP identifier may increase spectrum efficiency of downlink data transmission. If activation of CSI reporting is transmitted after activation of a cell, the activation may be slow. For example, a MAC CE may not be transmitted in a time urgent manner, which may result in a delayed CSI report activation. Activation of BWPs, however, may be required to be relatively quick. For example, BWP activation and/or BWP switching may be based on physical layer switching. BWPs may be used for time-sensitive communications. A base station may determine a CSI reporting delay above a threshold may be unacceptable for scheduling on a BWP. By indicating a BWP in a MAC CE prior to BWP activation and/or BWP switching, CSI reporting activation delay may be reduced. A base station may transmit, to a wireless device, a MAC CE on a first BWP to activate one or more CSI resources on a second BWP indicated by the BWP identifier.

A base station may transmit, to a wireless device, one or more RRC messages comprising configuration parameters for a cell. The cell may comprise a PCell, an SCell (e.g., an SCell of a plurality of SCells). The configuration parameters may comprise one or more BWPs comprising at least a first BWP, and/or one or more CSI report configurations comprising at least a first CSI report configuration. The one or more CSI report configurations may be associated with a semi-persistent CSI reporting on a physical uplink control channel (PUCCH). The at least a first BWP may be associated with one or more of: a first parameter for a frequency location, a second parameter for a bandwidth, a third parameter for a subcarrier spacing, and/or a fourth parameter for a cyclic prefix. A value associated with the second parameter for a bandwidth may be less than a value associated with a bandwidth of the cell.

The base station may transmit, to the wireless device, a first MAC CE comprising: a BWP identifier field indicating the first BWP; and a channel state information (CSI) report configuration activation/deactivation field indicating activation of the first CSI report configuration. The activation/deactivation field may comprise an activation command and/or a deactivation command Additionally or alternatively, the MAC CE may comprise a BWP identifier field indicating the first BWP; a semi-persistent (SP) CSI reference signal (CSI-RS) resource set; and/or an indicator indicating activation of the SP CSI-RS resource set. The BWP identifier may comprise any number of bits, such as, for example, 1, 2, 3, or 4 bits. The MAC CE may comprise a fixed and/or predetermined length. The at least a first CSI report configuration may be associated with one or more of: a report configuration type indicator (e.g., indicating a periodic, semi-persistent, or aperiodic report configuration); reference signal resource configuration parameters; report quantity parameters; frequency domain configuration parameters; and/or time domain configuration parameters. The one or more CSI reports may be based on: one or more reference signal resources indicated by the one or more reference signal resource parameters; and/or one or more frequency configuration parameters indicated by the one or more report frequency domain configuration parameters. The one or more CSI reports may comprise at least one of the one or more report quantities indicated by the one or more report quantity parameters.

The wireless device may receive the one or more RRC messages. The wireless device may receive the first MAC CE. The wireless device may activate the first CSI report configuration for the first BWP, for example, after or in response to receiving the first MAC CE. The wireless device may activate the first CSI report configuration via a BWP, for example, including via a BWP for the CSI reporting or via any other BWP. Additionally or alternatively, the wireless device may activate the SP CSI-RS resource set for the first BWP, for example, after or in response to receiving the first MAC CE. The wireless device may activate the SP CSI-RS resource set via a BWP, for example, including via a BWP for the SP CSI-RS resource set or via any other BWP. The wireless device may activate SP CSI reporting via a physical uplink control channel (PUCCH). The wireless device may transmit, to the base station, one or more CSI reports based on the first CSI report configuration. Additionally or alternatively, the wireless device may transmit, to the base station, one or more CSI reports based on the SP CSI-RS resource set. The wireless device may transmit the one or more CSI reports via an uplink control channel (e.g., a physical uplink control channel) and/or via a physical uplink shared channel. The uplink control channel and/or the physical uplink shared channel may be associated with the first CSI report configuration. The wireless device may transmit the one or more CSI reports with periodic, semi-persistent, or aperiodic transmission indicated by the report configuration type indicator. The wireless device may transmit, via an uplink control channel, the one or more CSI reports with semi-persistent transmission based on or in response to the report configuration type indicator indicating semi-persistent transmission. The wireless device may transmit, via a physical uplink shared channel, the one or more CSI reports with aperiodic transmission based on or in response to the report configuration type indicator indicating aperiodic transmission. The one or more CSI reports may comprise one or more of: a first parameter associated with a channel quality indicator; a second parameter associated with a precoding matrix index; a third parameter associated with a rank indicator; and/or a fourth parameter associated with a layer 1 reference signal received power.

The base station may transmit, to the wireless device, a second MAC CE comprising a second BWP identifier field indicating the first BWP; and a CSI report configuration activation/deactivation field indicating a deactivation of the first CSI report configuration. Additionally or alternatively, the base station may transmit, to the wireless device, a second MAC CE comprising a second BWP identifier field indicating the first BWP; an SP CSI-RS resource set; and an indicator indicating a deactivation of the SP CSI-RS resource set. The wireless device may receive the second MAC CE. The wireless device may deactivate the first CSI report configuration for the first BWP, for example, after or in response to receiving the second MAC CE. The wireless device may deactivate the first CSI report configuration via a BWP, for example, including via a BWP for the deactivation of the first CSI report configuration or via any other BWP. Additionally or alternatively, the wireless device may deactivate the SP CSI-RS resource set for the first BWP, for example, after or in response to receiving the second MAC CE. The wireless device may deactivate the SP CSI-RS resource set via a BWP, for example, including via a BWP for the deactivation of the SP CSI-RS resource set or via any other BWP. The wireless device may stop the transmission of the one or more CSI reports, for example, after or in response to the deactivating.

A base station may transmit one or more RRC message comprising one or more CSI configuration parameters. The one or more CSI parameters may comprise one or more: CSI-RS resource setting; CSI reporting settings and/or CSI measurement setting. A CSI-RS resource setting may comprise one or more CSI-RS resource sets. A CSI-RS resource set may be provided for a periodic CSI-RS, (P CSI-RS)

and/or a semi-persistent (SP) CSI-RS. A base station may transmit one or more P CSI-RS and/or SP CSI-RS with a configured periodicity in a time domain. The base station may transmit the one or more SP CSI-RS with a limited transmission duration that may be configured by the base station. The base station may transmit the one or more SP CSI-RS for the wireless device, for example, prior to or until the base station deactivates the one or more SP CSI-RS. The base station may deactivate and/or stop transmission of the one or more SP CSI-RS, for example, by transmitting a SP CSI-RS deactivation MAC CE and/or DCI.

A CSI-RS resource set may comprise one or more of: CSI-RS type (e.g., periodic, aperiodic, semi-persistent); CSI-RS resources (e.g., comprising at a CSI-RS resource configuration identity and/or a number of CSI-RS ports); CSI RS configuration (e.g., a symbol and/or RE locations in a subframe); CSI RS subframe configuration (e.g., subframe location, offset, and/or periodicity in a radio frame); CSI-RS power parameter; CSI-RS sequence parameter; CDM type parameter; frequency density; transmission comb; and/or QCL parameters.

One or more CSI-RS resources may be transmitted periodically, using aperiodic transmission, using a multi-shot transmission, or using a semi-persistent transmission. In a periodic transmission, the configured CSI-RS resource may be transmitted using a configured periodicity in a time domain. In an aperiodic transmission, the configured CSI-RS resource may be transmitted, for example, in a dedicated time slot or subframe. In a multi-shot transmission or semi-persistent transmission, the configured CSI-RS resource may be transmitted within a configured period.

One or more CSI reporting settings may comprise one or more of: a report configuration identifier; a report type; reported CSI parameter(s); CSI type (e.g., a type I or a type II); codebook configuration; time-domain behavior; frequency granularity for CQI and/or PMI; and/or measurement restriction configurations. The report type may indicate a time domain behavior of the report (e.g., aperiodic, semi-persistent, or periodic). The one or more CSI reporting settings may comprise one or more of: a periodicity parameter; a duration parameter; and/or an offset (e.g., in unit of slots and/or subframes), for example, if the report type in a CSI reporting setting is a periodic report or a semi-persistent report. The periodicity parameter may indicate the periodicity of a CSI report. The duration parameter may indicate a duration of CSI report transmission. The offset parameter may indicate a value of a timing offset of a CSI report.

An SP CSI report may comprise multiple CSI reporting settings. An SP CSI report may comprise one CSI resource set for an SP CSI-RS. A CSI measurement setting may comprise one or more links comprising one or more link parameters. A link parameter may comprise one or more of: a CSI reporting setting indication, a CSI-RS resource setting indication, and/or measurement parameters. A base station may trigger a CSI reporting, for example, by transmitting am RRC message, a MAC CE, and/or a DCI, such as shown in FIG. 30.

A wireless device may transmit one or more SP-CSI reporting. The one or more SP-CSI reporting may be transmitted with a transmission periodicity. The one or more SP-CSI reporting may be triggered by the wireless device receiving a MAC CE, and/or DCI. The MAC CE or the DCI may indicate an SP-CSI reporting on one or more periodic (P) CSI-RS resources. The MAC CE or the DCI may indicate an SP-CSI reporting on one or more SP CSI-RS resources.

Figure 29:
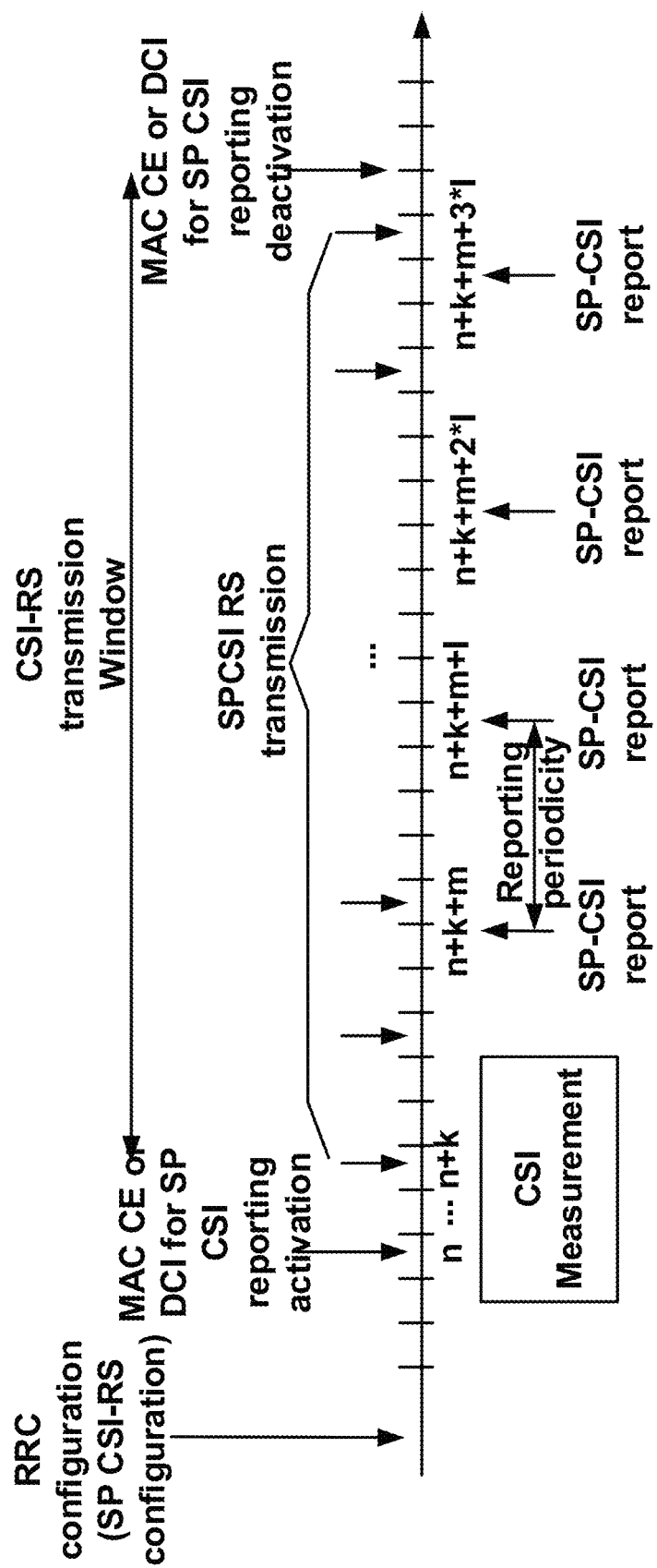
FIG. 29 shows an example diagram of semi-persistent (SP) CSI configuration with a CSI activation MAC control element (CE) or DCI and a CSI deactivation MAC CE or DCI.

FIG. 29 shows an example of SP-CSI reporting. A base station may transmit, to a wireless device, one or RRC messages comprising configuration parameters. The configuration parameters may comprise, for example, one or more SP-CSI RS configurations. The base station may transmit, to the wireless device (e.g., at subframe n) a MAC CE and/or a DCI. The MAC CE and/or the DCI may comprise an indication of an SP CSI reporting activation. The wireless device may perform CSI measurement, for example, at subframe n+k. The base station may start transmitting (e.g., at the start of a CSI-RS transmission window) one or more SP CSI-RS at subframe n+k, for example, if the base station transmits at subframe n a MAC CE and/or DCI to trigger an SP CSI reporting. The value k may be zero, or an integer greater than zero. The value k may be configured in an RRC message and/or the value k may be predefined as a fixed value. The wireless device may transmit (e.g., during an SP-CSI RS transmission period) SP CSI reporting at subframe n+k+m, n+k+m+l, and/or n+k+m+2*1, n+k+m+3*1, etc., for example, with a periodicity of 1 subframes. The wireless device may stop transmitting SP CSI reporting, for example, after or in response to receiving a MAC CE and/or DCI for deactivating SP CSI reporting (e.g., which may end a CSI-RS transmission window). The value "m" may be configured with a RRC and/or may be predefined as a fixed value (e.g., zero or a value greater than zero).

A wireless device may be configured to monitor a downlink channel (e.g., NR-PDCCH) via one or more beam pair links (BPLs). The number of the one or more BPLs may be determined at least based on wireless device capability. This may increase robustness against BPL blocking. A base station may transmit one or more messages indicating (and/or causing) a wireless device to monitor a downlink channel (e.g., NR-PDCCH) on different BPLs in different symbols (e.g., NR-PDCCH OFDM symbols).

A base station may transmit (e.g., via higher layer signaling and/or a MAC CE) parameters indicating at least one wireless device receive beam (Rx beam) setting for monitoring a downlink channel (e.g., NR-PDCCH) on multiple BPLs. The base station may transmit an indication of spatial QCL assumption between an DL RS antenna port(s) (e.g., cell-specific CSI-RS, wireless device-specific CSI-RS, SS block, or PBCH with or without DM-RSs of PBCH), and DL RS antenna port(s) for demodulation of a DL control channel. Signaling for a beam indication for a downlink channel (e.g., NR-PDCCH) may comprise MAC CE signaling, RRC signaling, DCI signaling, or a combination thereof.

For reception of a unicast DL data channel, a base station may transmit one or more of a MAC CE, an RRC message, and/or DCI indicating spatial QCL parameters between DL RS antenna port(s) and DM-RS antenna port(s) of DL data channel. The base station may transmit DCI (e.g., downlink grants) comprising one or more parameters indicating the RS antenna port(s). The one or more parameters may indicate the RS antenna port(s) that are QCL-ed with DM-RS antenna port(s). A different set of DM-RS antenna port(s) for the DL data channel may be indicated as QCL with a different set of RS antenna port(s).

A wireless device may measure and/or determine a quality of one or more BPLs using one or more reference signals (RSs). One or more SS blocks, one or more CSI-RSs, and/or one or more DM-RSs may be used to measure and/or determine a quality of a BPL. A base station may configure a wireless device with one or more RS resources, used for measuring BPL quality, QCLed (Quasi-Co-Located) with DM-RSs (demodulation reference signal) of a control channel. The one or more RS resources and the DM-RSs of the control channel may be semi-statically QCLed by the base station.

A wireless device may detect a beam failure, for example, if the quality of all BPLs associated with one or more serving control channels falls below a threshold (e.g., in comparison with a threshold, and/or time-out of an associated timer). The threshold may be semi-statically configured by the base station and/or may be predefined. The quality of BPL may be defined as hypothetical downlink channel BLER (e.g., PDCCH BLER). A wireless device may be configured with single or multiple BPLs to monitor the wireless device-specific downlink channel (e.g., PDCCH). A beam failure may be detected, for example, if the quality of beam associated with a single BPL downlink channel (e.g., PDCCH) falls below the threshold. A beam failure may be detected, for example, if the quality of the beams associated with the multiple BPL downlink channel (e.g., PDCCH) falls below the threshold. The wireless device may measure and/or determine the hypothetical BLER of one or more CSI-RS resources and/or SS blocks that are configured as the spatial QCL reference for each wireless device-specific downlink channel (e.g., PDCCH) and compare the BLER of one or more CSI-RS resources and/or SS blocks with the corresponding hypothetical BLER threshold. The wireless device may detect a beam failure of the downlink channel (e.g., PDCCH), for example, if the BLER is higher than the threshold.

Figure 30A:
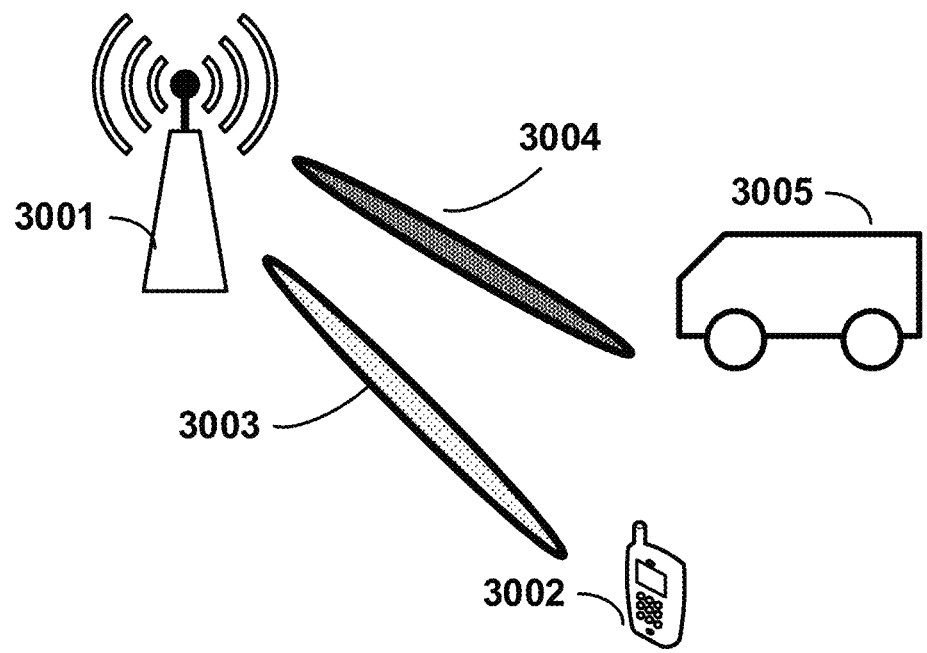
FIG. 30A shows an example of a beam failure event.

FIG. 30A shows an example of a beam failure event involving a single TRP. A single TRP such as at a base station 3001 may send, to a wireless device 3002 (e.g., a UE), a first beam 3003 and a second beam 3004. A beam failure event may occur if, for example, a serving beam, such as the second beam 3004, is blocked by a moving vehicle 3005 or other obstruction (e.g., building, tree, land, or any object) and configured beams (e.g., the first beam 3003 and the second beam 3004), including the serving beam, are received from the single TRP. The wireless device 3002 may trigger a mechanism to recover from beam failure if a beam failure occurs.

Figure 30B:
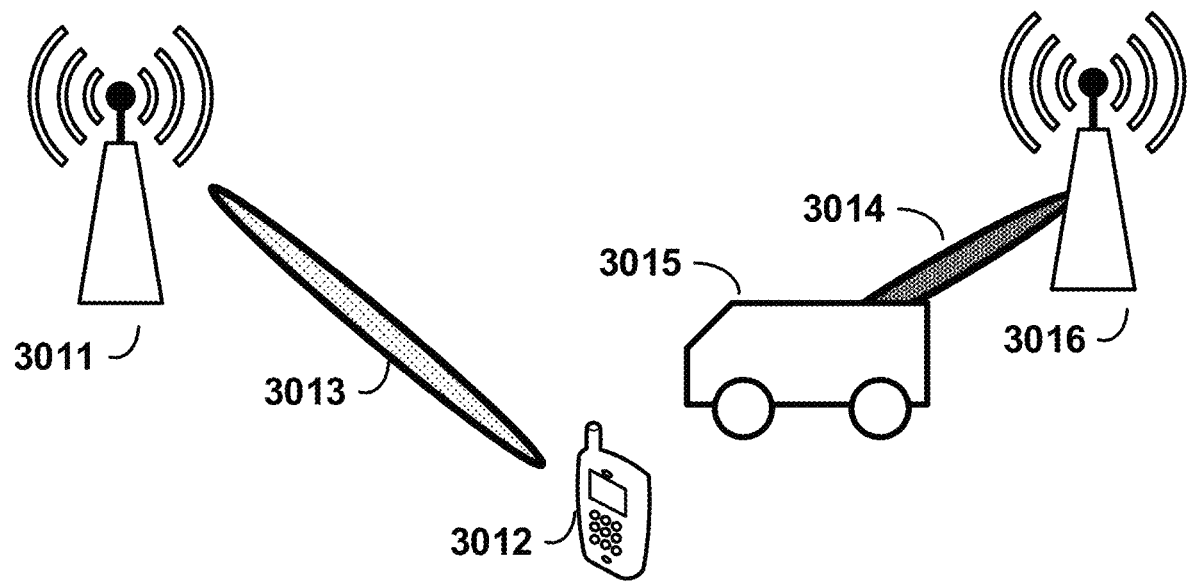
FIG. 30B shows an example of a beam failure event.

FIG. 30B shows an example of a beam failure event involving multiple TRPs. Multiple TRPs, such as at a first base station 3011 and at a second base station 3016, may send, to a wireless device 3012 (e.g., a UE), a first beam 3013 (e.g., from the first base station 3011) and a second beam 3014 (e.g., from the second base station 3016). A beam failure event may occur if and/or when, e.g., a serving beam, such as the second beam 3014, is blocked by a moving vehicle 3015 or other obstruction (e.g., building, tree, land, or any object) and configured beams (e.g., the first beam 3013 and the second beam 3014) are received from multiple TRPs. The wireless device 3012 may trigger a mechanism to recover from beam failure if any/or when a beam failure occurs.

Figure 31:
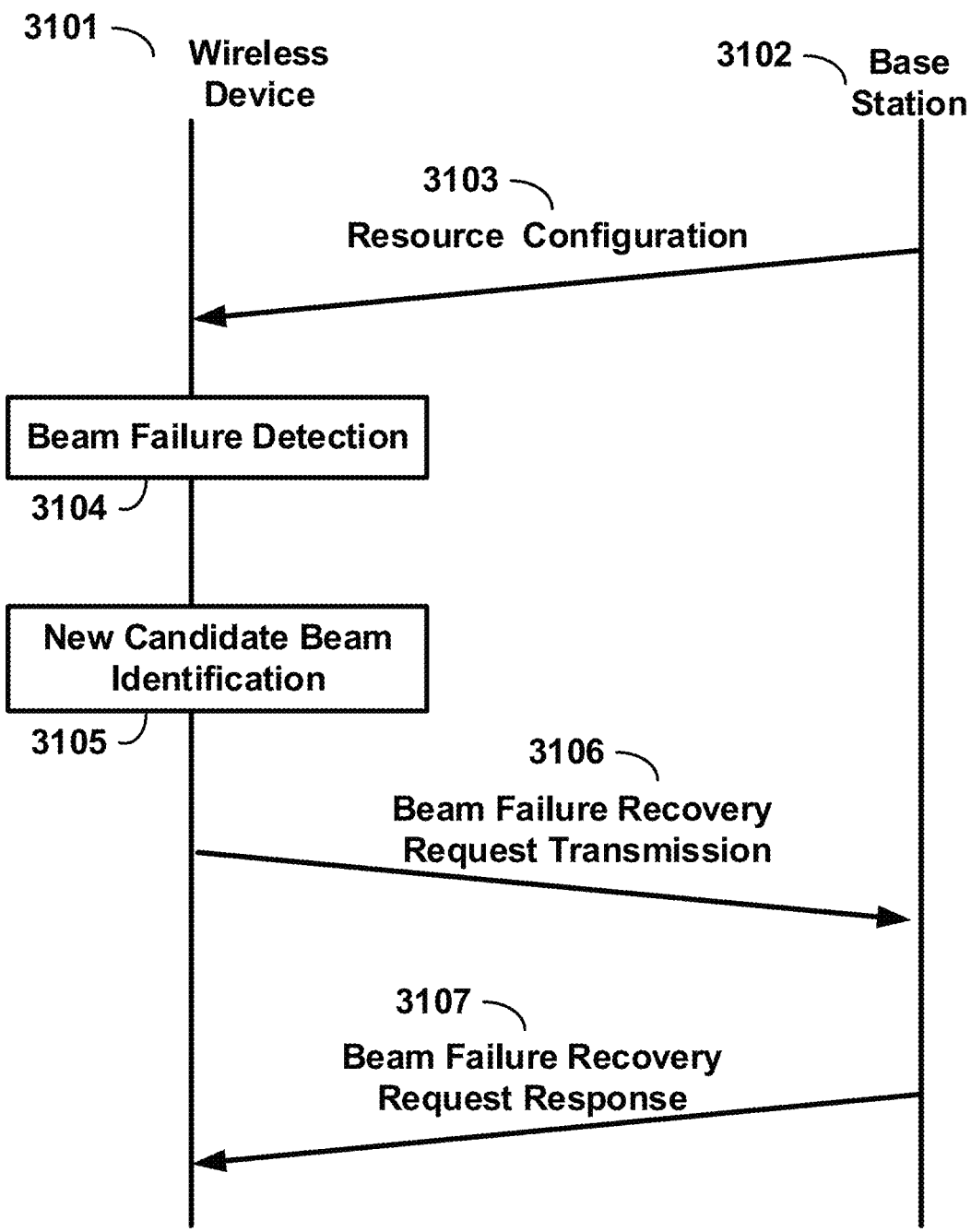
FIG. 31 shows an example of a downlink beam failure recovery procedure.

FIG. 31 shows an example of a downlink beam failure recovery procedure comprising at least one of: a beam failure detection 3104, a new candidate beam identification 3105, a beam failure recovery request transmission 3106, and/or a beam failure recovery request response 3107.

A wireless device 3101 (e.g., a UE) may receive, from a base station 3102, one or more resource configuration parameters at step 3101. The wireless device 3101 may determine a new candidate beam to transmit a beam failure recovery request to notify a network, for example, after or in response to a beam failure detection. The wireless device 3101 may identify, based on a beam failure detection 3104 and/or a resource configuration 3103, at least one candidate beam to send a beam failure recovery request transmission 3106 to the base station 3102. The wireless device 3101 may select an RS (e.g., the RS may be associated with a SSB or CSI-RS) as the at least one candidate beam, for example, if the RSRP of the RS is higher than a threshold. The wireless device 3101 may select a new beam identification RS (e.g., SSB only, CSI only, or SSB+CSI-RS) as a new candidate beam, for example, if the RSRP of the new beam identification RS is higher than a threshold. The wireless device 3101 may trigger and/or send a beam failure recovery (BFR) request 3106, for example, if the measurement quality of all serving beams associated with control channels fails, and/or falls below a first threshold, and the wireless device 3101 identifies a new candidate serving beam. The RSRP of the new candidate serving beam is higher than a second threshold.

The wireless device 3101 may send a beam failure recovery (BFR) request 3106 via an uplink channel or signal (e.g., BFR-PUCCH and/or BFR-PRACH). The uplink channel or signal (e.g., BFR-PRACH) may be one or more radio resources FDM-ed/CDM-ed with PRACH. The base station 3102 may detect that there is a beam failure event for the wireless device 3101, for example, by monitoring the downlink physical channel and/or signal. The base station 3102 may transmit one or more messages comprising configuration parameters of an uplink physical channel and/or signal for beam failure recovery request transmission. The uplink physical channel and/or signal may be based on one or more of: a non-contention based PRACH (e.g., BFR-PRACH) (e.g., which may use a resource orthogonal to resources of other PRACH transmissions); a PUCCH (e.g., BFR-PUCCH); and/or a contention-based PRACH resource. Combinations of these candidate channels and/or signals may be configured by the base station 3102. Contention-based PRACH may serve as a supplement to a contention-free RACH procedure. The base station 3102 may send, for example, based on receiving the beam failure recovery request 3106, one or more DCIs to indicate a successful reception of the beam failure recovery request 3106. The one or more DCIs may comprise one or more fields indicating at least one of a UL grant, a TPC command, and/or one or more beam indices. The base station 3102 may semi-statically configure the wireless device 3101 with one or more parameters indicating the resource configurations of BFR-PUCCH and/or BFR-PRACH. A contention-based PRACH may serve as supplement to a contention-free RACH procedure. The wireless device 3101 may fall back to contention-based PRACH (e.g., if the wireless device 3101 is not configured with any resources for beam failure recovery) to re-establish connection on the serving cell. The UL active beam may be sufficient, whereas DL active beams may have poor qualities (e.g., without beam correspondence). The wireless device 3101 may send the beam failure recovery request 3106 via a BFR-PUCCH. The beam failure request transmission, which may be PUCCH-based, may be a message carried by PUCCH and/or indicated by the new identified beam.

A BFR-PRACH may use a resource orthogonal to resources of other PRACH transmissions (e.g., for initial access). There may be a direct association between the CSI-RS or SS block resources and dedicated BFR-PRACH resources. These associations may be indicated by RRC parameters from a serving base station (e.g., the base station 3102), for example, if a wireless device joins a network. With a mapping between BFR-PRACH resource (e.g., preamble sequence and/or time-frequency resources) and corresponding new beam index in the RRC parameter list, the information about identifying a wireless device (e.g., the wireless device 3101) or new transmit beam (Tx beam) may be carried by the beam failure recovery request (e.g., the beam failure recovery request 3106) implicitly by the BFR-PRACH resource.

Figure 32:
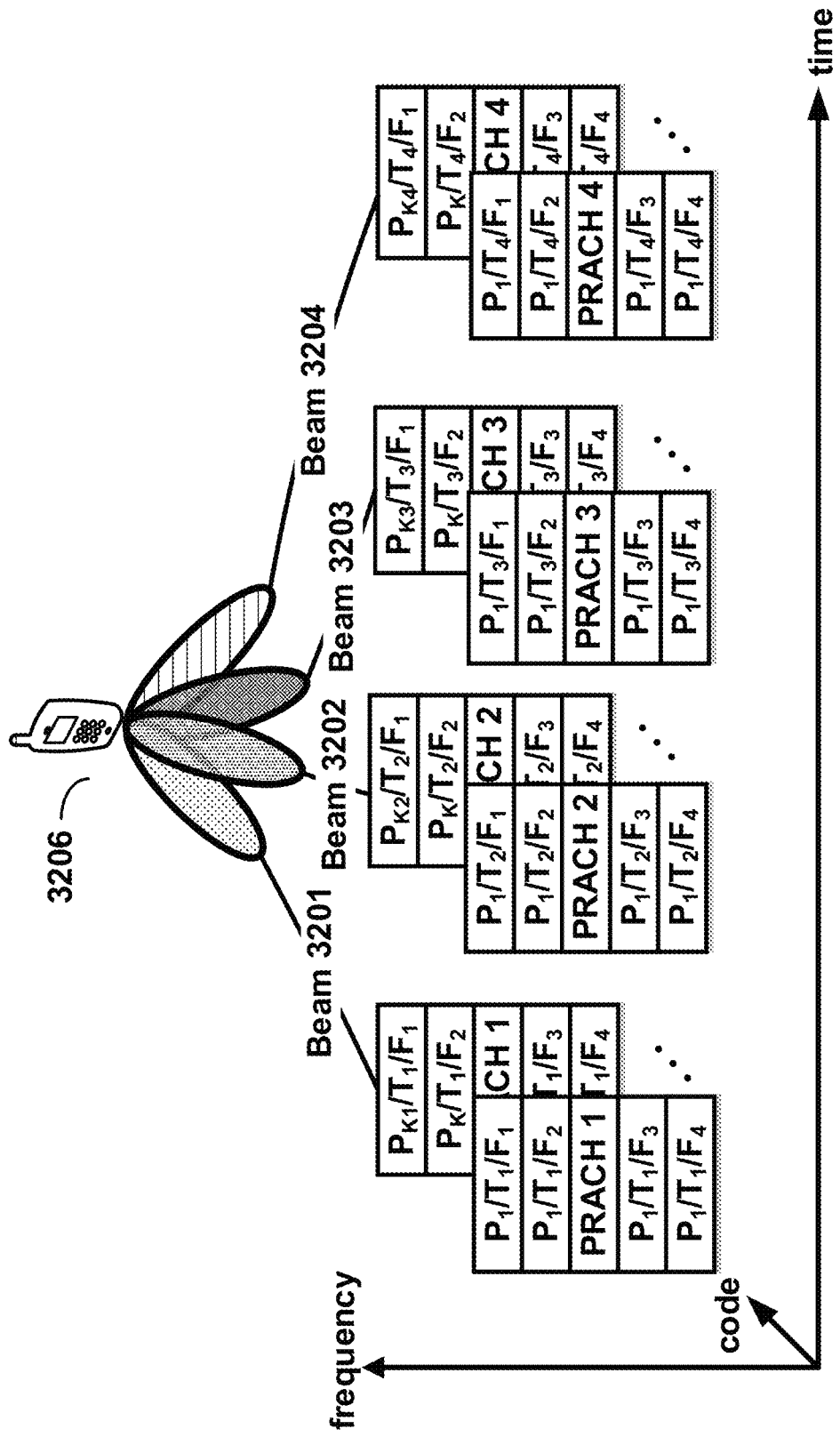
FIG. 32 shows an example of sending a beam failure recovery request.

FIG. 32 shows an example of BFR-PRACH opportunities to send a beam failure recovery request. The beam failure recovery request may be sent in time, frequency, and/or sequence domain. The beam failure recovery request may correspond to different beam indexes associated with the CSI-RS or SS blocks. Each BFR-PRACH opportunity may be an opportunity in time, frequency, and/or sequence domain for a wireless device 3206 (e.g., a UE) to send a preamble sequence to trigger beam failure recovery. The RACH resources in the n-th BFR-PRACH time opportunity, $T_n$, n=1 ... 4, spanning different frequency indexes $F_k$, k=1 ... 4, and different cyclic shifts, $P_l$, l=1 ... $K_n$, hold a beam correspondence relationship with beam "n" (e.g., one of a beam 3201, a beam 3202, a beam 3203, or a beam 3204). A BFR-PRACH resource may differentiate from another BFR-PRACH resource in the choice of either PRACH time opportunity, frequency index, cyclic shift, and/or a combination of them. A BFR-PRACH resource may be, for example, FDM-ed (e.g., using different frequencies) or CDM-ed (e.g., using different cyclic shifts) with existing PRACH resources such as initial access.

The wireless device 3206 may trigger beam failure recovery mechanism and select a dedicated BFR-PRACH resource associated with the identified new beam to send a wireless device-specific preamble (e.g., based on the wireless device 2106 identifying a new candidate beam by measuring multiple CSI-RSs and/or SS blocks). The wireless device 3206 may send a BFR-PRACH preamble (e.g., if the wireless device detects the beam 3202 in FIG. 32 as a new identified beam) on a RACH resource FDM-ed and/or CDM-ed with the second normal PRACH resource (e.g., "PRACH 2" on the $P_1/T_2/F_4$ or $P_K/T_2/F_2$ resource). A base station may monitor all BFR-PRACH resources for potential beam failure recovery request transmissions. The base station may determine and/or infer (e.g., based on receiving a valid device-specific preamble for a specific BFR-PRACH resource) a wireless device identity for a wireless device associated with the preamble (e.g., wireless device 3206) and the desired beam index for the wireless device 3206. The base station may determine and/or interpret the beam 3202 as the desired beam index from the wireless device 3206 (e.g., if a device-specific preamble is received on a BFR-PRACH during $T_2$ in FIG. 32).

The wireless device 3206 may receive a response from the base station (e.g., after the wireless device 3206 has sent a beam failure recovery request). The previous active beams associated with the failed control channels may suffer from poor quality (e.g., it may be difficult to monitor a base station response on those failed beams). The wireless device 3206 may report a new candidate beam with a good RSRP level (e.g., above a threshold such as −3 db, −5db, or −8db) in the beam failure recovery request. The wireless device 3206 may monitor the base station response on a RRC configured dedicated CORESET associated with the newly identified beam. The dedicated CORESET is addressed to C-RNTI (e.g., device-specific) and is spatial QCL-ed with DL RS of the wireless device-identified candidate beam reported in the beam failure recovery request transmission. The dedicated CORESET may be used by the network for control channel transmission before and/or after beam failure occurs. The wireless device 3206 may declare the beam failure recovery request is received by the base station correctly and the wireless device 3206 may stop the beam failure recovery request transmission (e.g., based on the UE3206 detecting a valid wireless device-specific DCI in that dedicated CORESET). The time window to monitor the base station response may be determined by a fixed time offset (e.g., a 4 slot offset that may be RRC configurable starting from a fixed time offset).

The wireless device 3206 may not receive a response from the base station for various reasons. The base station may fail to receive a beam failure recovery request transmission due to incorrect beam selection as a new beam candidate. The base station may fail to receive a beam failure recovery request transmission due to a lack of enough wireless device transmission power. The beam failure recovery request transmission may not reach the base station, and/or the base station may not be aware of the failed serving beam(s). The base station response may not reach the wireless device 3206 because of an incorrect downlink beam for the control channel transmission, or for various other wireless communications issues. A retransmission mechanism for beam recovery request may have the advantage of promoting robust operation. The wireless device 3206 may send an indicator to a high layer and/or a MAC layer (e.g., based on the wireless device 3206 receiving a response with then response time window), which may trigger the retransmission of the beam failure recovery request. The indicator may be carried in the next available channel (PUCCH or non-contention based PRACH). To avoid excessive retransmissions, a maximum retransmission number N for the beam recovery request may be configured by the network, and/or may be limited by the number of dedicated uplink beam failure recovery resources. The wireless device 3206 may declare beam failure recovery mechanism as unsuccessful and/or the wireless device 3206 may stop resending (e.g., based on a number of beam failure recovery request retransmissions reaching a maximum number and/or a timer expiring). The wireless device 3206 may refrain from performing a beam recovery procedure, send an indication to higher layers, and/or may wait for RLF declaration of higher layers.

A wireless device (e.g., a UE) with multiple serving beams configured for access to a base station may experience beam failure on only a subset of the serving beams. Beam failure recovery using a beam that is not a serving beam (e.g., a candidate beam that is not a serving beam) may be inefficient (e.g., it may require a new congestion and/or add traffic to a beam in use for other devices). The wireless device may use operational serving beams (e.g., serving beams not of the subset that failed) to indicate the subset of failed beams and/or perform beam failure recovery. This may have the advantage of enabling the wireless device to recover from failed beams and/or avoid having to establish a new connection using a candidate beam if and/or when established serving beams are available.

Figure 33:
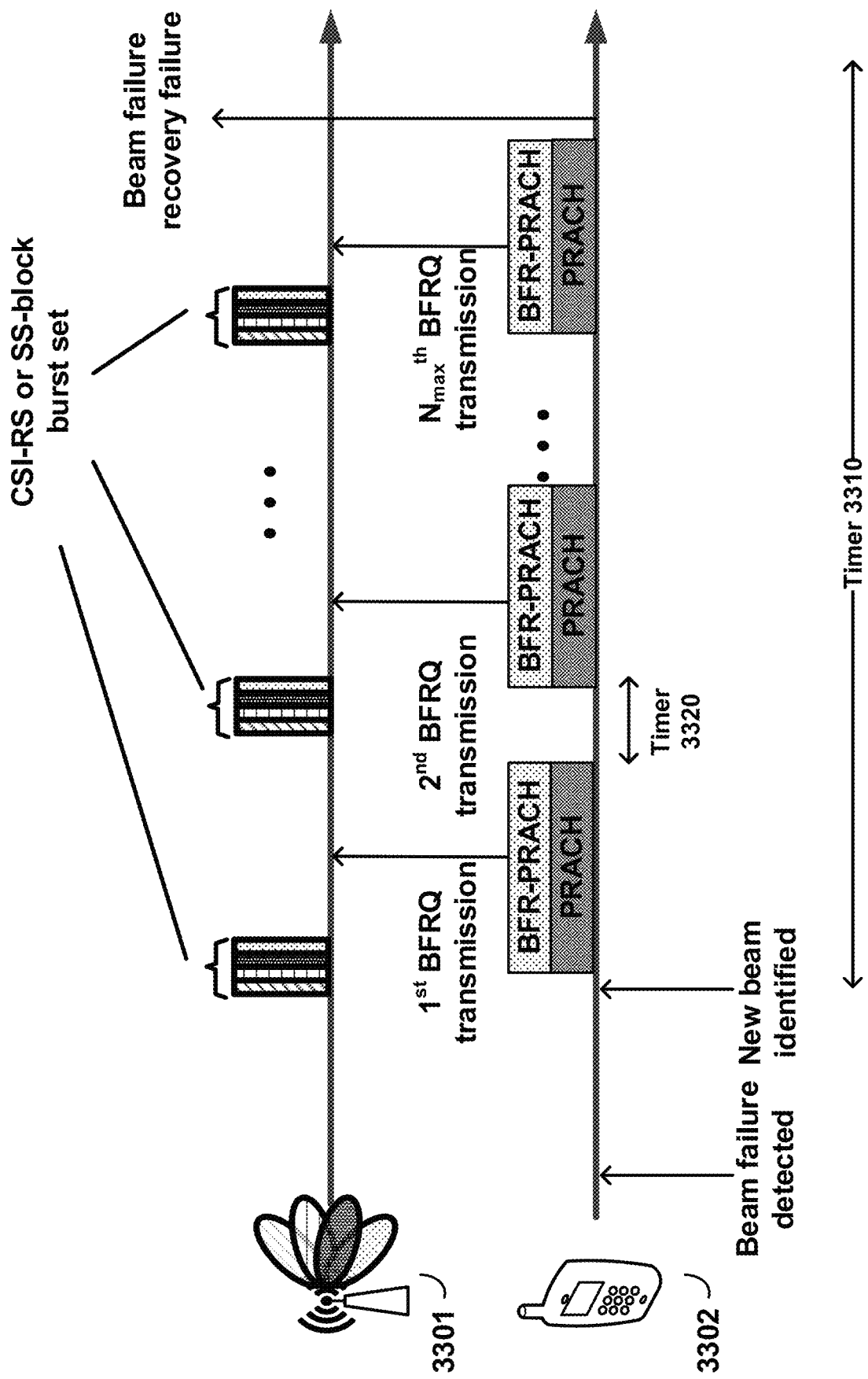
FIG. 33 shows an example of a wireless device configured for beam failure recovery.

FIG. 33 shows an example of a wireless device 3302 configured for beam failure recovery. One or more parameters may comprise a maximum number of transmission $N_{max}$, a timer 3310 for stopping a beam failure recovery procedure, and a timer 3320 (e.g., for a base station response window). The wireless device 3302 may detect a beam failure and identify a new beam. The wireless device 3301 may send a first beam failure recovery request (BFRQ) transmission (e.g., comprising a BRF-PRACH and a PRACH). The wireless device 3302 may re-send (e.g., in a second BFRQ transmission) the beam recovery request (e.g., based on the wireless device 3302 failing to receive a beam recovery response message from a base station 3301 within the bounds of the timer 3320 and/or after the transmission of a first beam recovery request). The wireless device 3302 may stop the beam failure recovery procedure and/or send an indication of beam failure recovery failure to higher layers (e.g., if the number of sending beam recovery request is $N_{max}$ and/or the timer 3310 expires). The timer 3310 may start after or in response to one or more of: the beam failure detection, new candidate beam identification, and/or the first beam failure recovery transmission.

The wireless device 3302 may detect a full beam failure, for example, if all configured multi-beam serving control channels fail. The wireless device 3302 may detect a partial beam failure wireless device, for example, if the wireless device 3302 does not detect a beam failure on one or more (e.g., some or all) configured multi-beam. The partial beam failure may occur, for example, if the wireless device 3302 detects a beam failure on one or more serving beams, but at least one serving beam has a RSRP higher than a threshold (and/or has a BLER lower than a threshold, which may be different from the threshold for RSRP). The wireless device 3302 may start a partial beam failure recovery procedure, for example, if the wireless device 3302 detects the partial beam failure.

The partial beam failure may be detected by the wireless device 3302, for example, by monitoring and/or measuring at least one BLER of a CSI-RS and/or a SS block. A partial beam failure recovery procedure may be initiated by the wireless device 3302 (e.g., based on detecting the partial beam failure). A base station 3301 may send one or more messages comprising parameters of one or more physical layer resources for a full and/or a partial beam failure recovery procedure. The one or more physical layer resources and/or configuration parameters may comprise at least one of: DL RS resources to monitor the quality of PDCCH; DL RS resources to identify candidate new beams for the PDCCH; one or more UL channels to report a full and/or a partial beam failure; and/or one or more DL channels to response to the wireless device 3302 on beam recovery.

The one or more physical layer resources and/or the configuration parameters may be common for full beam failure recovery and partial beam failure recovery procedures. The one or more physical layer resources and/or the configuration parameters used to send a full beam failure recovery request and a partial beam failure recovery request may be different.

One or more UL resources for reporting a partial beam failure recovery (e.g., for a partial beam failure recovery procedure initiated by the wireless device 3302) may be semi-statically and/or dynamically configured by the base station 3301. The failed beam information may be sent, to the base station 3301, for example, via explicit signaling or implicit signaling. The explicit signaling may be sent via PUCCH and/or via PUSCH. The explicit signaling may comprise at least one field indicating a failed beam index and/or a RS ID related to the failed beam. Control data and/or UL-SCH data (e.g., sent via PUSCH or via PUCCH) may have a field indicating the failed beam index and/or the RS ID. The implicit signaling may indicate a failed beam index and/or a RS ID related to the failed beam by the wireless device 3302 sending at least one preamble via one or more BFR-PRACHs. The at least one preamble and/or the at least one BFR-PRACH may be associated with the failed beam index or related RS ID. The base station 3301 may semi-statically and/or dynamically configure the wireless device 3302 with at least one association between the failed beam index, the RS ID, a preamble, and/or a BFR-PRACH.

The wireless device 3302 may send the partial beam failure recovery request via the PUCCH. At least one serving beam configured for PUCCH transmission, among a plurality of serving beams configured for the PUCH transmission, may not fail. The wireless device 3302 may send a partial beam failure recovery request via the at least one serving beam that has not failed.

The PUCCH may be scheduled periodically. The PUCCH may not be available at a time that the wireless device 3302 may detect the partial beam failure. The PUCCH may be scheduled per one or more beams. The wireless device 3302 may wait (e.g., after detecting a failure) until (e.g., after) the PUCCH associated with at least one beam of the wireless device is available. Waiting until the PUCCH is available may cause a latency problem.

The wireless device 3302 may report the failed beam index and/or the RS ID (e.g., related to the failed beam) via the PUCCH. The base station 3301 may need to differentiate (e.g., based on receiving the partial beam failure recovery request) between the regular PUCCH reporting and the partial beam failure recovery request transmission. Differentiating may utilize a new format and/or may occupy additional PUCCH resources, which may cause increased overhead.

The wireless device 3302 may send at least one preamble via at least one BFR-PRACH (e.g., if the wireless device 3302 detects a full beam failure). The at least one preamble and/or at least one BFR-PRACH may be associated with at least one candidate beam (e.g., at least one candidate beam identified by the wireless device 3302 as a new serving beam). The wireless device 3302 may choose not to use a first preamble and/or a first BFR-PRACH associated with one or more serving beams.

The wireless device 3302 may use the first preamble and/or the first BFR-PRACH to send a partial beam failure recovery request. The base station 3301 may determine which beams are configured for PUCCH transmissions (e.g., serving beam for PUCCH transmissions). The base station 3301 may detect a full beam failure recovery request (e.g., based on receiving the request via the at least one preamble and/or at least one BFR-PRACH). The base station 3301 may detect a partial beam failure recovery request (e.g., based on receiving the request via the first one preamble and/or first one BFR-PRACH).

Figure 34:
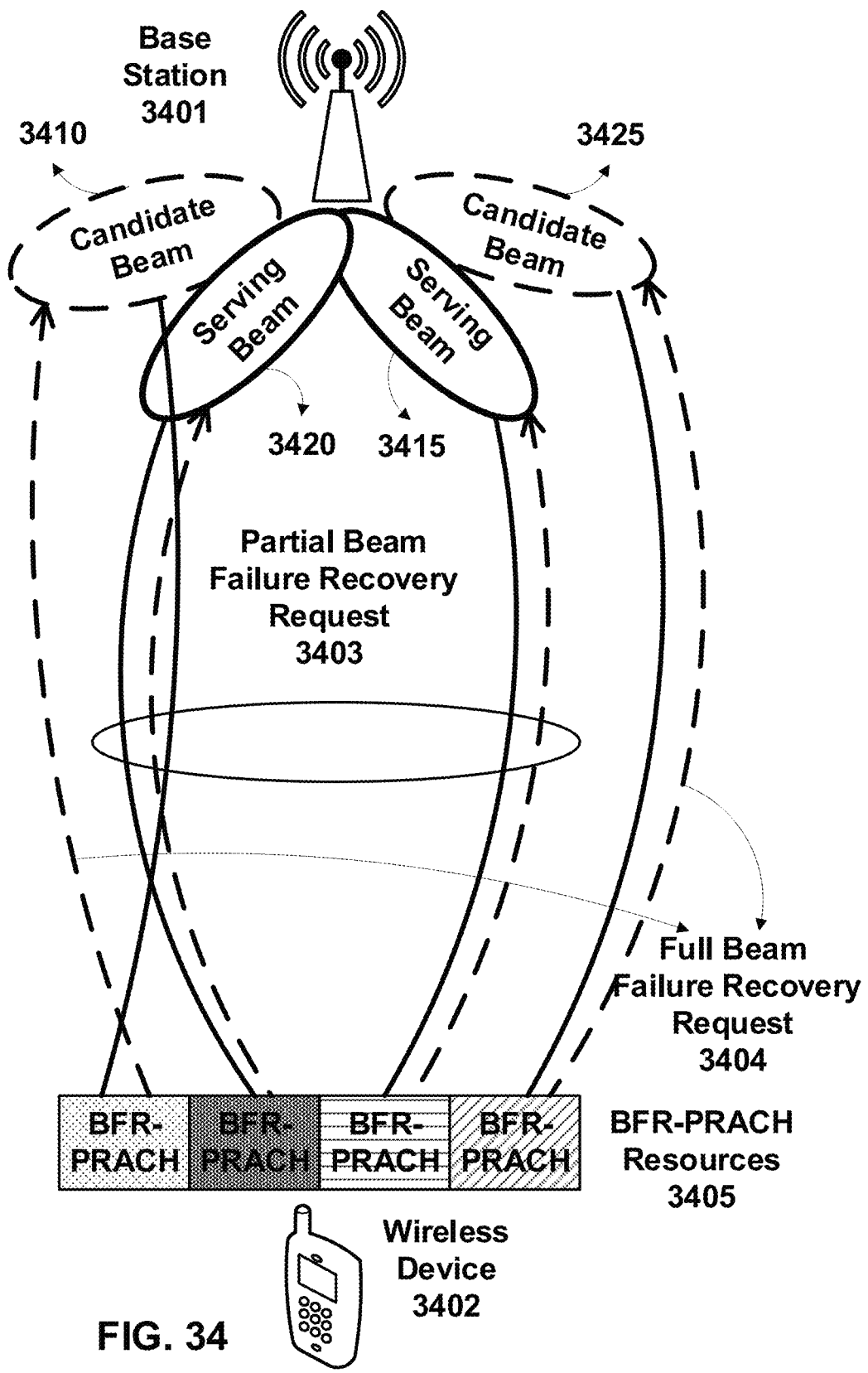
FIG. 34 shows an example of full and partial beam failure recovery request transmissions.

FIG. 34 shows an example of full and partial beam failure recovery request transmissions via BFR-PRACH resources 3405 associated with the candidate beams (e.g., a candidate beam 3410 and/or a candidate beam 3425) and/or serving beams (e.g., serving beam 3420 and/or serving beam 3415).

The PUCCH assigned for the partial beam failure recovery request 3403 may not be available and/or may not be scheduled frequently. At least one of the BFR-PRACH resources 3405 may be scheduled before PUCCH (e.g., if a wireless device 3402 detects a partial beam failure). The wireless device 3402 (e.g., a UE) may send the partial beam failure recovery request 3403 via at least one of the BFR-PRACH resources 3405, which may reduce latency. The wireless device 3402 may selectively choose a PUCCH and/or at least one of the BFR-PRACH resources 3405. The wireless device 3402 may send the partial beam failure recovery request 3403 via PUCCH (e.g., if a transmission window for a PUCCH is available earlier than a transmission window for the at least one of the BFR-PRACH resources 3405). The wireless device 3402 may send the partial beam failure recovery request via the at least one of the BFR-PRACH resources 3405 (e.g., if a transmission occasion of the at least one of the BFR-PRACH resources 3405 is available earlier than a transmission occasion of PUCCH).

The base station 3401 may not expect to receive a full beam failure recovery request 3404 via the at least one of the BFR-PRACH resources 3405 allocated at least one serving beam (e.g., the serving beam 3420 and/or the serving beam 3415). The at least one of the BFR-PRACH resources 3405 corresponding to the at least one serving beam may not be utilized. The base station 3401 may configure (e.g., semi-statically) the wireless device 3402 with the at least one of the BFR-PRACH resources 3405 (which may be dedicated) and/or at least one preamble for the full beam failure recover request procedure (which may be dedicated). Certain radio resources may go unutilized (e.g., may be wasted). Using the at least one of the BFR-PRACH resources 3405 and/or preamble for the partial beam failure recovery procedure may increase a DL resource utilization and/or a UL resource utilization. The wireless device 3402 may indicate the partial beam failure recovery request 3403 (e.g., if the base station 3401 receives, from the wireless device 3402, a dedicated PRACH preamble via the at least one of the BFR-PRACH resources 3405 associated with the one or more serving beams). A full beam failure recovery request 3404 may be indicated by the base station 3401 receiving a dedicated PRACH preamble on the non-serving beam.

The partial beam failure recovery request via the at least one of the BFR-PRACH resources 3405 may indicate a failure of at least one beam (e.g., the serving beam 3420 and/or the serving beam 3415). The base station 3401 may initiate (e.g., based on receiving the partial beam failure recovery request 3402) the partial beam failure recovery procedure (e.g., one of P1, P2, P3, U1, U2, and/or U3 with SS block and/or CSI-RS) on the at least one serving beam. The base station 3401 may send one or more aperiodic CSI-RS for the wireless device 3402 to use in identifying at least one new candidate beam. The base station 3401 may or may not reconfigure a TCI state if or after the full and/or partial beam failure recovery procedure is complete.

The base station 3401 may send, to the wireless device 3402, at least one message comprising at least one of following: first parameters indicating configuration of one or more reference signals (CSI-RS and/or SS blocks) associated with a plurality of serving beams (e.g., the serving beam 3420 and/or the serving beam 3415), wherein the plurality of serving beams may be associated with sending downlink channel (e.g., PDCCH); second parameters indicating the at least one of the resources (e.g., BFR-PRACH resources 3405) for the partial beam failure recovery request 3403; and/or third parameters indicating one or more associations between at least one reference signal and/or the at least one of the resources (e.g., BFR-PRACH resources 3405). The wireless device 3402 may detect a partial beam failure (e.g., on the at least one first reference signal) based on a first threshold. The wireless device 3402 may select (e.g., based on detection the partial beam failure) a second reference signal different from the at least one reference signal. The second reference signal may be selected based on a selection (e.g., a random selection) from reference signals of the at least one reference signal. The second reference signal may send (e.g., via a first RACH resource associated with the second reference signal) a first preamble indicating the partial beam failure.

Figure 35:
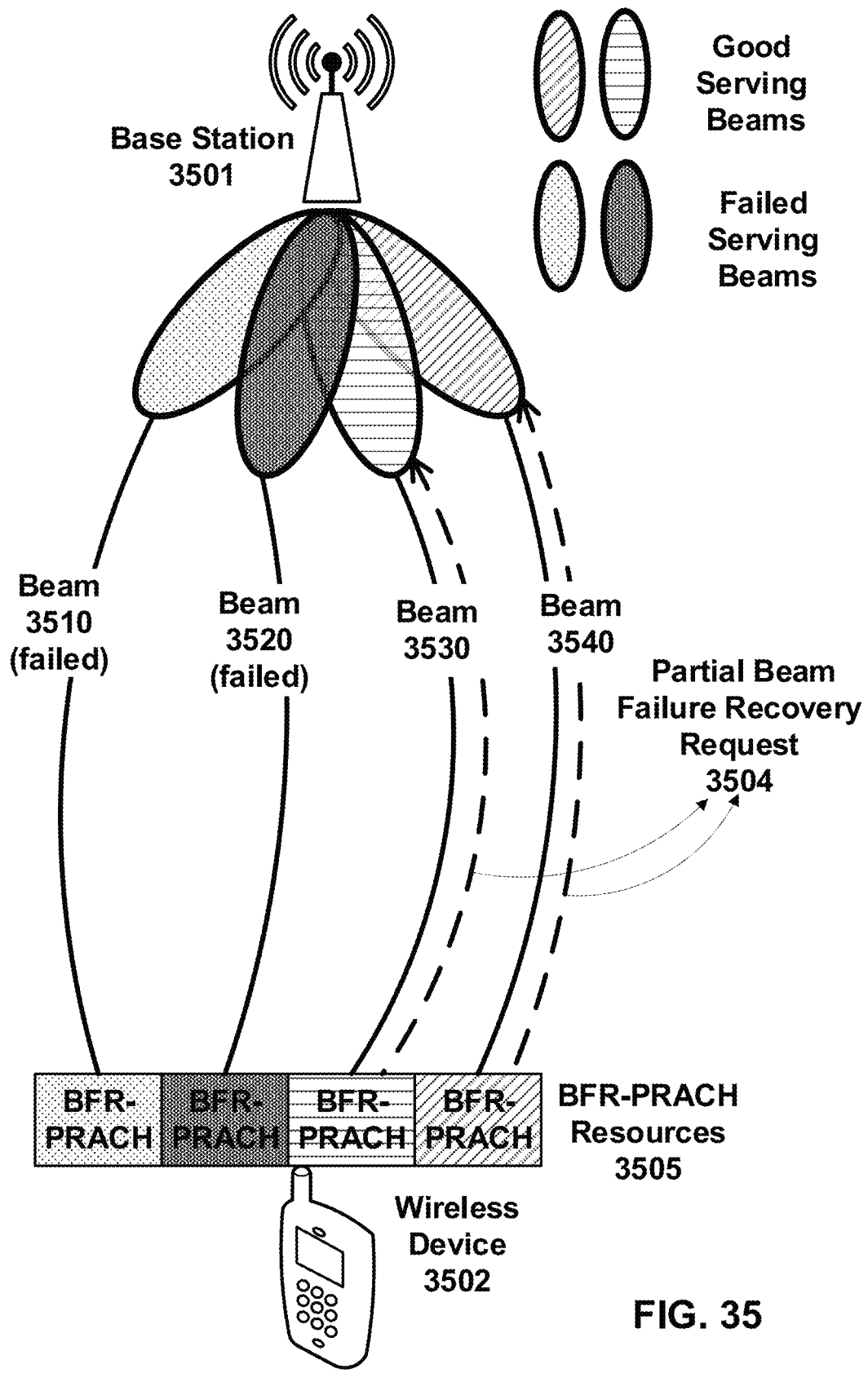
FIG. 35 shows an example of a partial beam failure recovery with operational beams.

FIG. 35 shows an example of a partial beam failure recovery. A wireless device 3502 (e.g., a UE) may be configured with at least one downlink channel (e.g., PDCCH) transmission via at least one BPL (e.g., a beam 3510, a beam 3520, a beam 3530, and/or a beam 3540, which may be four serving beams configured for the at least one downlink channel transmission). The wireless device 3502 may detect a beam failure (e.g., on the beam 3510 and/or the beam 3520). The beam failure may be detected based on detecting a quality (e.g., a quality of RSRP and/or BLER) of the beam 3510 and/or the beam 3520 falling below a threshold. The beam failure may be due to a wireless device rotation, a movement, and/or a blockage of the wireless device 3502. After and/or during the beam failure a quality (e.g., a quality of RSRP and/or BLER) of the beam 3530 and/or the beam 3540 may be above the threshold. The beam 3530 and/or the beam 3540 may be use for transmission (e.g., PDCCH transmission). At least one preamble and/or at least one resource (e.g., BFR-PRACH resource, which may be one of the BFR-PRACH resources 3505) configured for beams not associated with the partial beam failure (e.g., the beam 3530 and/or the beam 3540) may be used for indicating the partial beam failure. The wireless device 3502 may select (e.g., based on detecting the partial beam failure) the at least one preamble and/or the at least one BFR-PRACH resource associated with the beam 3530 and/or the beam 3540 to indicate the failure on the beam 3510 and/or the beam 3520 to a base station 3501. The selection may be random. The wireless device 3502 may randomly select one of the preambles and or the at least one BFR-PRACH resource associated with the beam 3530 and/or the beam 3540. The wireless device 3502 may select the one of the preambles and/or the at least one BFR-PRACH resource associated with the beam 3530 and/or the beam 3540, for example, based on a signal strength and/or BLER. The base station 3501 may determine, based on detecting a partial beam failure recovery request 3504, that at least one failure on a beam other than the beam 3530 and/or beam 3540 is detected at the wireless device 3502.

Figure 36:
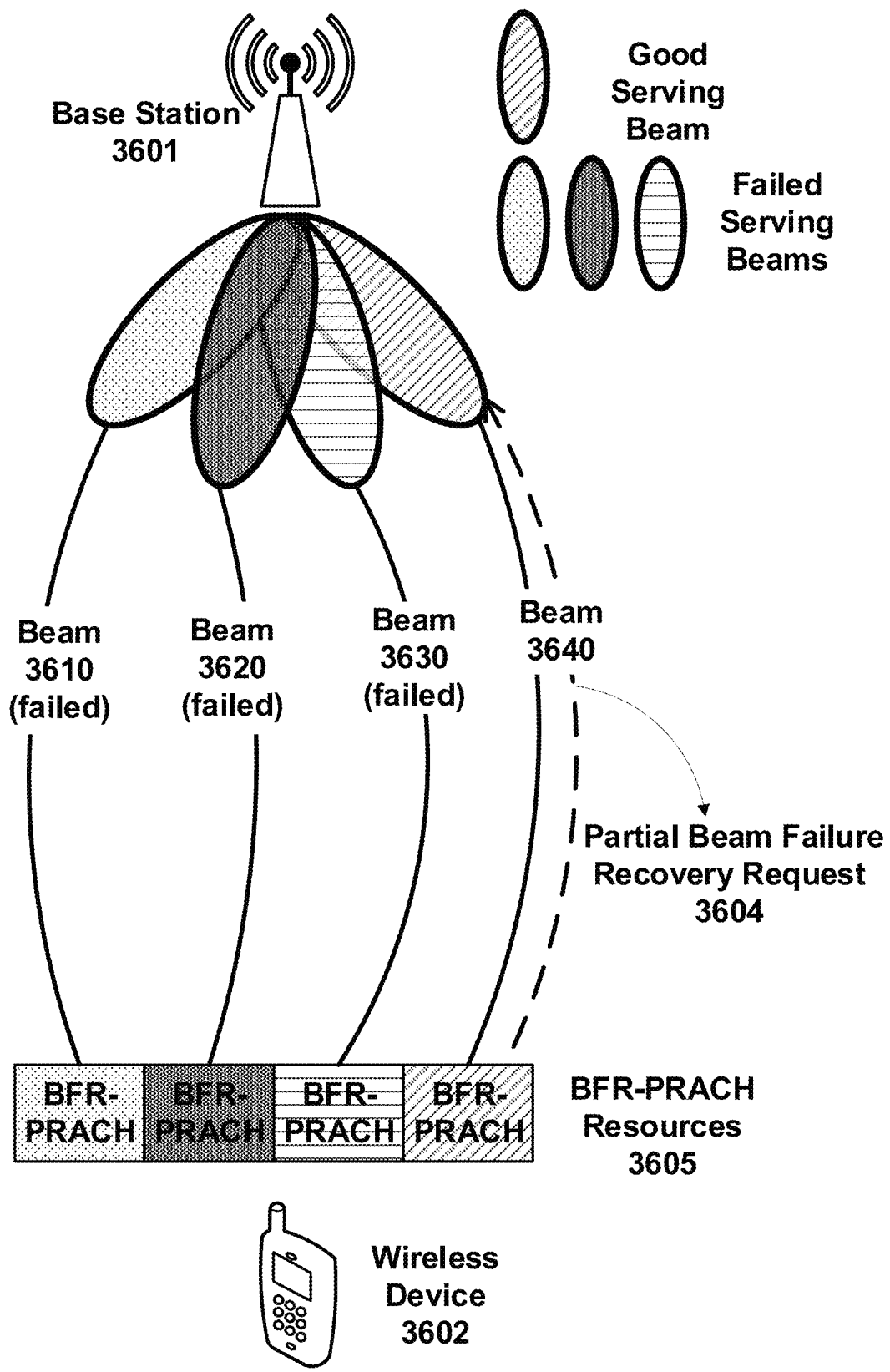
FIG. 36 shows an example of a partial beam failure recovery with an operational beam.

FIG. 36 shows an example of a partial beam failure recovery. A wireless device 3602 (e.g., a UE) may be configured with at least one BPL (e.g., a beam 3610, a beam 3620, a beam 3630, and/or a beam 3640) to monitor a PDCCH associated with the wireless device 3602. The wireless device 3602 may detect a partial beam failure on a plurality of the beam 3610, the beam 3620, and/or the beam 3630, wherein the quality of the failed beams may be below a threshold and the quality of the beam 3640 may be above the threshold. The wireless device 3602 may indicate the partial beam failure (e.g., based on detecting the partial beam failure) by sending a first preamble via a first RACH resource (which may be of the BFR-PRACH resources 3605) associated with the beam 3640. The first preamble may be sent in a partial beam failure recovery request 3604. The base station 3601 may detect (e.g., based on receiving the first preamble of the first RACH resource associated with the beam 3640) the failure on the beam 3610, the beam 3620, and/or the beam 3630.

A selection of at least one preamble and/or at least one BFR-PRACH resource (which may be of the BFR-PRACH resources 3605) may be predefined or semi-statically configured, for example, by the base station 3601. A mapping may associate the at least one preamble and/or the at least one BFR-PRACH resource with at least one failed beam and/or with at least one beam selected as a new candidate beam.

Figure 37:
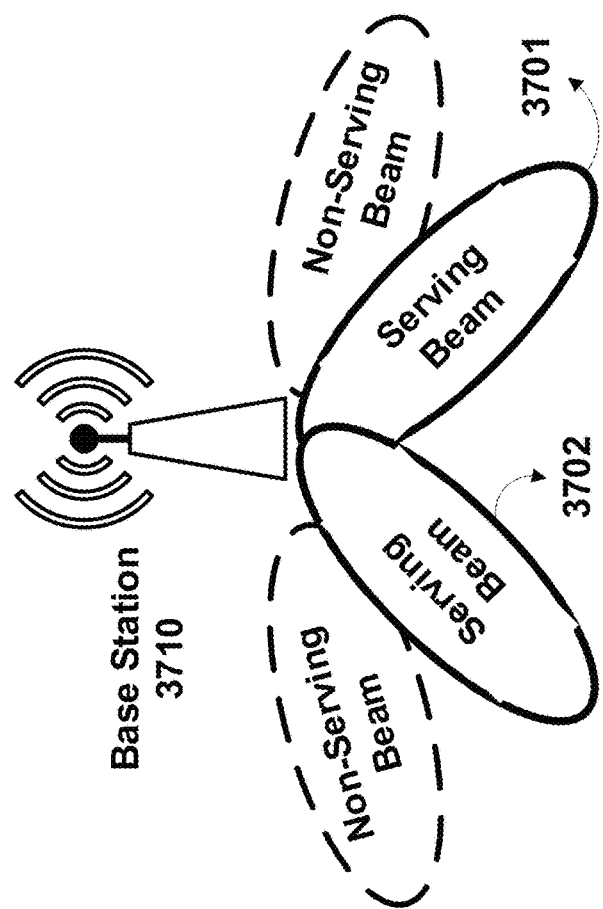
FIG. 37 shows an example of a partial beam failure selection scheme.

FIG. 37 shows an example of a partial beam failure. A wireless device (e.g., a UE) may be configured with at least two serving beams, for example, a serving beam 3701 and a serving beam 3702. A base station 3710 may configure the wireless device with at least two preambles (e.g., $P_1$ and $P_2$)

and at least two BFR-PRACH resource sets (e.g., $T_1/F_1$ and $T_2/F_2$) for a partial beam failure recovery request. There may be one or more example selection schemes (scenarios, rules, and/or tables) to select one of preambles and BFR-PRACHs. Preambles and/or BFR-PRACH resources may be configured (e.g., semi-statically) and/or preconfigured (or predefined) to indicate a failure of a beam. FIG. 37 may show four example selection schemes. In a selection scheme 3711, the wireless device may send the preamble $P_1$ via BFR-PRACH $T_1$ and $F_1$ to indicate a partial beam failure if the serving beam 3701 has failed. In the selection scheme 3711, the wireless device may send the preamble $P_2$ via BFR-PRACH $T_2$ and $F_2$ to indicate a partial beam failure if the serving beam 3702 has failed. In an example selection scheme 3712, the wireless device may send the preamble $P_2$ via BFR-PRACH $T_1$ and $F_1$ to indicate a partial beam failure if the serving beam 3701 has failed. In a selection scheme 3712, the wireless device may send the preamble $P_1$ via BFR-PRACH $T_2$ and $F_2$ to indicate a partial beam failure if the serving beam 3702 has failed. In a selection scheme 3713, the wireless device may send the preamble $P_2$ via BFR-PRACH $T_2$ and $F_2$ to indicate a partial beam failure if the serving beam 3701 has failed. In the selection scheme 3713, the wireless device may send the preamble $P_1$ via BFR-PRACH $T_1$ and $F_1$ to indicate a partial beam failure if the serving beam 3702 has failed. In a selection scheme 3714, the wireless device may send the preamble $P_1$ via BFR-PRACH $T_2$ and $F_2$ to indicate a partial beam failure if the serving beam 3701 has failed. In the selection scheme 3714, the wireless device may send the preamble $P_2$ via BFR-PRACH $T_1$ and $F_1$ to indicate a partial beam failure if the serving beam 3702 has failed.

FIG. 38 and FIG. 39 show examples of a partial beam failure. A wireless device (e.g., a UE) may be configured with three serving beams. A base station 3810 may configure the wireless device with at least three preambles (e.g., $P_1$, $P_2$, and $P_3$) and at least three BFR-PRACH resource sets (e.g., $T_1/F_1$, $T_2/F_2$, and $T_3/F_3$) for a partial beam failure recovery request. There may be one or more example selection schemes (scenarios, rules, and/or tables) to select one of preambles and BFR-PRACHs. Preambles and/or BFR-PRACH resources may be configured (e.g., semi-statically) and/or preconfigured (or predefined) to indicate a failure of a beam.

FIG. 38 shows two example selection schemes. In a selection scheme 3811, the wireless device may send the preamble $P_3$ via BFR-PRACH $T_1$ and $F_1$ to indicate a partial beam failure if a serving beam 3803 has failed. In the selection scheme 3811, the wireless device may send the preamble $P_2$ via BFR-PRACH $T_1$ and $F_1$ to indicate a partial beam failure if a serving beam 3802 has failed. In the selection scheme 3811, the wireless device may send the preamble $P_1$ via BFR-PRACH $T_2$ and $F_2$ to indicate a partial beam failure if a serving beam 3801 has failed. In the selection scheme 3811, the wireless device may send the preamble $P_3$ via BFR-PRACH $T_3$ and $F_3$ to indicate a partial beam failure if the serving beam 3801 and the serving beam 3802 have failed. In the selection scheme 3811, the wireless device may send the preamble $P_2$ via BFR-PRACH $T_2$ and $F_2$ to indicate a partial beam failure if the serving beam 3801 and the serving beam 3803 have failed. In the selection scheme 3811, the wireless device may send the preamble $P_1$ via BFR-PRACH $T_1$ and $F^1$ to indicate a partial beam failure if the serving beam 3802 and the serving beam 3803 have failed.

In a selection scheme 3812, the wireless device may send the preamble $P_3$ via BFR-PRACH $T_2$ and $F_2$ to indicate a partial beam failure if the serving beam 3803 has failed. In the selection scheme 3812, the wireless device may send the preamble $P_2$ via BFR-PRACH $T_3$ and $F_3$ to indicate a partial beam failure if the serving beam 3802 has failed. In the example selection scheme 3812, the wireless device may send the preamble $P_1$ via BFR-PRACH $T_3$ and $F_3$ to indicate a partial beam failure if the serving beam 3801 has failed. In the selection scheme 3812, the wireless device may send the preamble $P_3$ via BFR-PRACH $T_3$ and $F_3$ to indicate a partial beam failure if the serving beam 3801 and the serving beam 3802 have failed. In the selection scheme 3812, the wireless device may send the preamble $P_2$ via BFR-PRACH $T_2$ and $F_2$ to indicate a partial beam failure if the serving beam 3801 and the serving beam 3803 have failed. In the selection scheme 3812, the wireless device may send the preamble $P_1$ via BFR-PRACH $T_1$ and $F_1$ to indicate a partial beam failure if the serving beam 3802 and the serving beam 3803 have failed.

The base station 3810 may send, to a wireless device, one or more messages comprising at least one of: first parameters indicating configuration of one or more reference signals (CSI-RS and/or SS blocks) associated with a plurality of serving beams (e.g., the serving beam 3801, the serving beam 3802, and/or the serving beam 3803), wherein the plurality of serving beams may be associated with sending PDCCH; second parameters indicating one or more RACH resources for a beam failure recovery request; and/or third parameters indicating one or more associations between at least one of the one or more reference signals and at least one of the one or more RACH resources. The wireless device may detect a partial beam failure based on a first threshold, on at least one first reference signal of a plurality of reference signals associated with the plurality of serving beams. The wireless device may select, based on detecting the partial beam failure, a second reference signal having a highest received signal strength among the plurality of reference signals associated with the serving beams and is different from the at least one reference signal. The wireless device may send, via a first RACH resource associated with the second reference signal, a first preamble indicating the partial beam failure.

FIG. 39 shows two example election schemes. In as selection scheme 3911, the wireless device may send the preamble $P_1$ via BFR-PRACH $T_3$ and $F_3$ to indicate a partial beam failure if a serving beam 3903 has failed. In the selection scheme 3911, the wireless device may send the preamble $P_1$ via BFR-PRACH $T_2$ and $F_2$ to indicate a partial beam failure if a serving beam 3902 has failed. In the selection scheme 3911, the wireless device may send the preamble $P_2$ via BFR-PRACH $T_1$ and $F_1$ to indicate a partial beam failure if a serving beam 3901 has failed. In the selection scheme 3911, the wireless device may send the preamble $P_3$ via BFR-PRACH $T_1$ and $F_1$ to indicate a partial beam failure if the serving beam 3901 and the serving beam 3902 have failed. In the selection scheme 3911, the wireless device may send the preamble $P_2$ via BFR-PRACH $T_1$ and $F_1$ to indicate a partial beam failure if the serving beam 3901 and the serving beam 3903 have failed. In the selection scheme 3911, the wireless device may send the preamble $P_1$ via BFR-PRACH $T_{2\ and\ F2}$ to indicate a partial beam failure if the serving beam 3902 and the serving beam 3903 have failed.

In a selection scheme 3912, the wireless device may send the preamble $P_2$ via BFR-PRACH $T_3$ and $F_3$ to indicate a partial beam failure if the serving beam 3903 has failed. In the selection scheme 3912, the wireless device may send the preamble $P_3$ via BFR-PRACH $T_2$ and $F_2$ to indicate a partial beam failure if the serving beam 3902 has failed. In the selection scheme 3912, the wireless device may send the preamble $P_3$ via BFR-PRACH $T^1$ and $F^1$ to indicate a partial beam failure if the serving beam 3901 has failed. In the selection scheme 3912, the wireless device may send the preamble $P_3$ via BFR-PRACH $T_2$ and $F_2$ to indicate a partial beam failure if the serving beam 3901 and the serving beam 3902 have failed. In the selection scheme 3912, the wireless device may send the preamble $P_2$ via BFR-PRACH $T_3$ and $F_3$ to indicate a partial beam failure if the serving beam 3901 and the serving beam 3903 have failed. In the selection scheme 3912, the wireless device may send the preamble $P_1$ via BFR-PRACH $T_3$ and $F_3$ to indicate a partial beam failure if the serving beam 3902 and the serving beam 3903 have failed.

The base station 3910 may send, to a wireless device (e.g., to a UE), at least one message comprising at least one of: first parameters indicating configuration of one or more reference signals (CSI-RS and/or SS blocks) associated with a plurality of serving beams (e.g., the serving beam 3901, the serving beam 3902, and/or the serving beam 3903), wherein the plurality of serving beams may be associated with sending PDCCH; second parameters indicating one or more RACH resources for a beam failure recovery request; and/or third parameters indicating one or more associations between at least one of the one or more reference signals and at least one of the one or more RACH resources. The wireless device 3910 may detect a partial beam failure based on a first threshold, on at least one first reference signal of a plurality of reference signals associated with the plurality of serving beams. The wireless device 3910 may select, based on detecting the partial beam failure, a second reference signal having a highest received signal strength among the plurality of reference signals associated with the serving beams and is different from the at least one reference signal. The wireless device 3910 may send, via a first RACH resource associated with the second reference signal, a first preamble indicating the partial beam failure.

Figure 40:
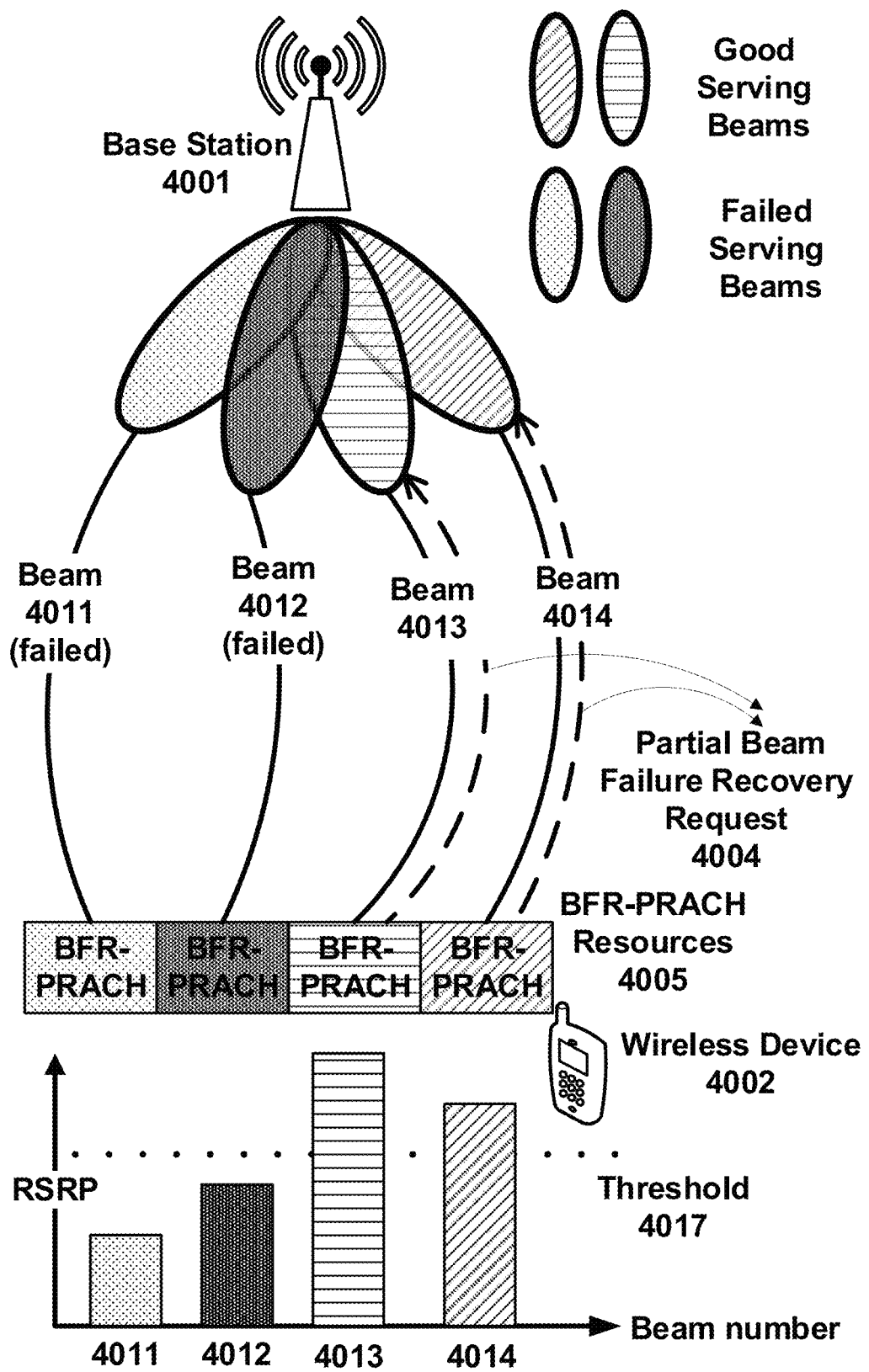
FIG. 40 shows an example of a partial beam failure recovery with a threshold.

FIG. 40 shows an example of a partial beam failure recovery. A wireless device 4002 (e.g., a UE) may be configured with at least one PDCCH transmission via at least one BPL (e.g., a beam 4011, a beam 4012, a beam 4013, and/or a beam 4014, which may be four serving beams configured for the at least one PDCCH transmission). The wireless device 4002 may detect a beam failure (e.g., on the beam 4011 and/or the beam 4012). The beam failure may be detected based on detecting a quality (e.g., a quality of RSRP and/or BLER) of the beam 4011 and/or the beam 4012 falling below a threshold 4017. The beam failure may be due to a rotation, a movement, and/or a blockage of the wireless device 4002. After and/or during the beam failure a quality (e.g., a quality of RSRP and/or BLER) of the beam 4013 and the beam 4014 may be above the threshold. The beam 4013 and/or the beam 4014 may be used for downlink channel (e.g., PDCCH) transmission. The preamble and/or BFR-PRACH (which may be one of the BFR-PRACH resources 4005) configured for beams not associated with the partial beam failure (e.g., the beam 4013 and/or the beam 4014) may be used for indicating the partial beam failure. The wireless device 4002 may select (e.g., based on detecting the partial beam failure) at least one preamble and/or at least one BFR-PRACH resource (which may be of the BFR-PRACH resources 4005) associated with the beam 4013 and/or the beam 4014 to indicate the failure on the beam 4011 and/or the beam 4012 to a base station 4001. The wireless device 4002 may select the at least one preamble and/or the at least one BFR-PRACH resource associated with the beam 4013 and/or the beam 4014 based on a signal strength and/or BLER. The wireless device 4002 may select the at least one of the preambles and/or the at least one BFR-PRACH resource associated with beam 4013, which may have the highest RSRP. The base station 4001 may identify, based on detecting the partial beam failure recovery request 440, that at least one failure on a beam other than beam 4013 is detected at the wireless device 4002.

The base station 4001 may send, to the wireless device 4002, at least one message comprising at least one of: first parameters indicating configuration of one or more reference signals (CSI-RS and/or SS blocks) associated with a plurality of serving beams (e.g., the beam 4011, the beam 4012, the beam 2013, and/or the beam 4014), wherein the plurality of serving beams may be associated with sending PDCCH; second parameters indicating one or more RACH resources for a beam failure recovery request; and/or third parameters indicating one or more associations between at least one of the one or more reference signals and at least one of the one or more RACH resources. The wireless device 4010 may detect a partial beam failure based on a first threshold (e.g., threshold 4017), on at least one first reference signal of a plurality of reference signals associated with the plurality of serving beams. The wireless device 4010 may select, based on detecting the partial beam failure, a second reference signal based on a random selection from among the plurality of reference signals associated with the serving beams. The wireless device 4002 may send, via a first RACH resource associated with the second reference signal, a first preamble indicating the partial beam failure.

Figure 41:
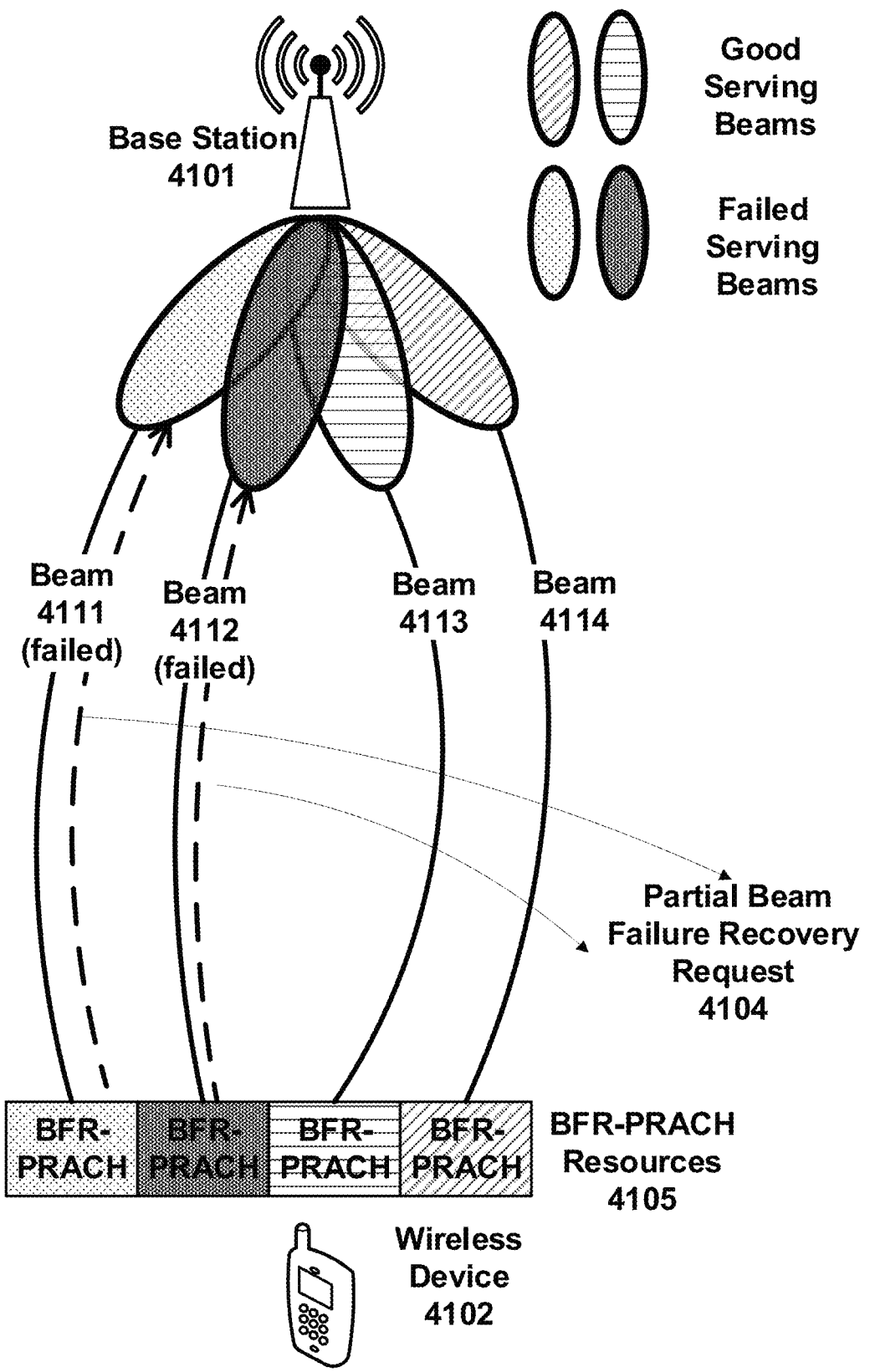
FIG. 41 shows an example of a partial beam failure recovery on failed beams.

FIG. 41 shows an example of a partial beam failure recovery. A wireless device 4102 (e.g., a UE) may be configured with at least one PDCCH transmission via four BPLs (e.g., a beam 4111, a beam 4112, a beam 4113, and/or a beam 4114, which may be four serving beams configured for the at least one PDCCH transmission). The wireless device 4102 may detect a beam failure (e.g., on the beam 4111 and/or the beam 4112). The beam failure may be detected based on detecting a quality (e.g., a quality of RSRP and/or BLER) of the beam 4111 and/or the beam 4112 falling below a threshold. The beam failure may be due to a rotation, a movement, or a blockage of the wireless device 4102. Following and/or during the beam failure a quality (e.g., a quality of RSRP and/or BLER) of the beam 4113 and the beam 4114 may be above the threshold. The beam 4113 and/or the beam 4114 may be employed for PDCCH transmission. The preamble and/or BFR-PRACH (which may be one of the BFR-PRACH resources 4105) configured for beams associated with the partial beam failure (e.g., the beam 4111 and/or the beam 4112) may be employed for indicating the partial beam failure. The wireless device 4102 may select (e.g., based on detecting the partial beam failure) one or more the preambles and/or at least one BFR-PRACH resource (which may be of the BFR-PRACH resources 4105) associated with the beam 4111 and/or the beam 4112 to indicate the failure on the beam 4111 and/or the beam 4112 to a base station 4101. The selection may be random. The wireless device 4102 may randomly select one of the preambles and or the at least one BFR-PRACH resource associated with the beam 4111 and/or the beam 4112. The wireless device 4102 may select the one of the preambles and/or the at least one BFR-PRACH resource associated with the beam 4111 and/or the beam 4112 based on a signal strength and/or BLER. The base station 4101 may identify, based on detecting a partial beam failure recovery request 4104, that at least one failure on the beam 4111 and/or beam 4111 is detected at the wireless device 4102.

The base station 4101 may send, to the wireless device 4102, at least one message comprising at least one of: first parameters indicating configuration of one or more reference signals (CSI-RS and/or SS blocks) associated with a plurality of serving beams (e.g., the beam 4111, the beam 4112, the beam 4113, and/or the beam 4114), wherein the plurality of serving beams may be associated with sending PDCCH; second parameters indicating one or more RACH resources for beam failure recovery request; and/or third parameters indicating one or more associations between at least one of the one or more reference signals and at least one of the one or more RACH resources. The wireless device 4101 may detect a partial beam failure based on a first threshold, on at least one first reference signal of a plurality of reference signals associated with the plurality of serving beams. The wireless device 4102 may select, based on detecting the partial beam failure, a second reference signal having a highest received signal strength from among the plurality of reference signals. The wireless device 4102 may send, via a first RACH resource associated with the second reference signal, a first preamble indicating the partial beam failure.

Figure 42:
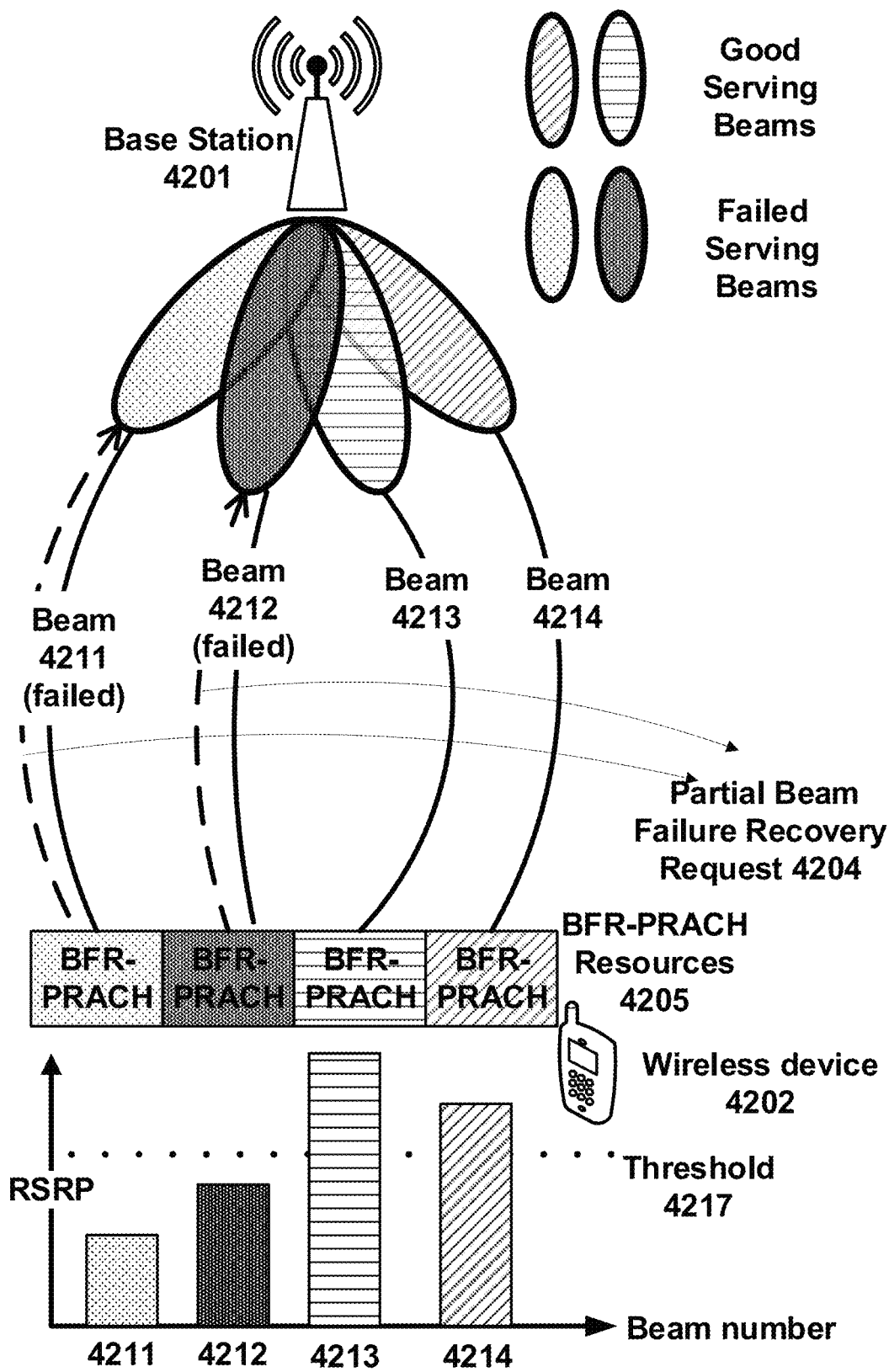
FIG. 42 shows an example of a partial beam failure recovery on failed beams with a threshold.

FIG. 42 shows an example of a partial beam failure recovery. A wireless device 4202 (e.g., a UE) may be configured with at least one PDCCH transmission via four BPLs (a beam 4211, a beam 4212, a beam 4213, and/or a beam 4214, which may be four serving beams configured for the at least one PDCCH transmission). The wireless device 4202 may detect a beam failure (e.g., on the beam 4211 and the beam 4212). The beam failure may be detected based on detecting a quality (e.g., a quality of RSRP and/or BLER) of the beam 4211 and/or the beam 4212 falling below a threshold 4217. The beam failure may be due to a wireless device rotation, movement, and/or blockage of the wireless device 4202. After and/or during the beam failure a quality (e.g., a quality of RSRP and/or BLER) of the beam 4213 and/or the beam 4214 may be above the threshold 4217. The beam 4213 and the beam 4214 may be employed for PDCCH transmission. At least one preamble and/or at least one BFR-PRACH resource (which may be one of the BFR-PRACH resources 4205) configured for beams associated with the partial beam failure (e.g., the beam 4211 and/or the beam 4212) may be employed for indicating the partial beam failure. The wireless device 4202 (e.g., based on detecting the partial beam failure) may select the at least one preamble and/or the at least one BFR-PRACH resource associated with beam 4211 and/or beam 4212 to indicate the failure on beam 4211 and/or beam 4212 to the base station 4201. The wireless device 4202 may select the at least one preamble and/or the at least one BFR-PRACH resource associated with beam 4211 and/or beam 4212 based on a signal strength and/or BLER. The wireless device 4202 may select the at least one preamble and/or the at least one BFR-PRACH resource associated with beam 4212, which may have the highest RSRP among the beams associated with the partial beam failure. The base station 4201 may identify, based on detecting the partial beam failure recovery request 4204, that at least one failure on beam 4212 is detected at the wireless device 4202.

Figure 43:
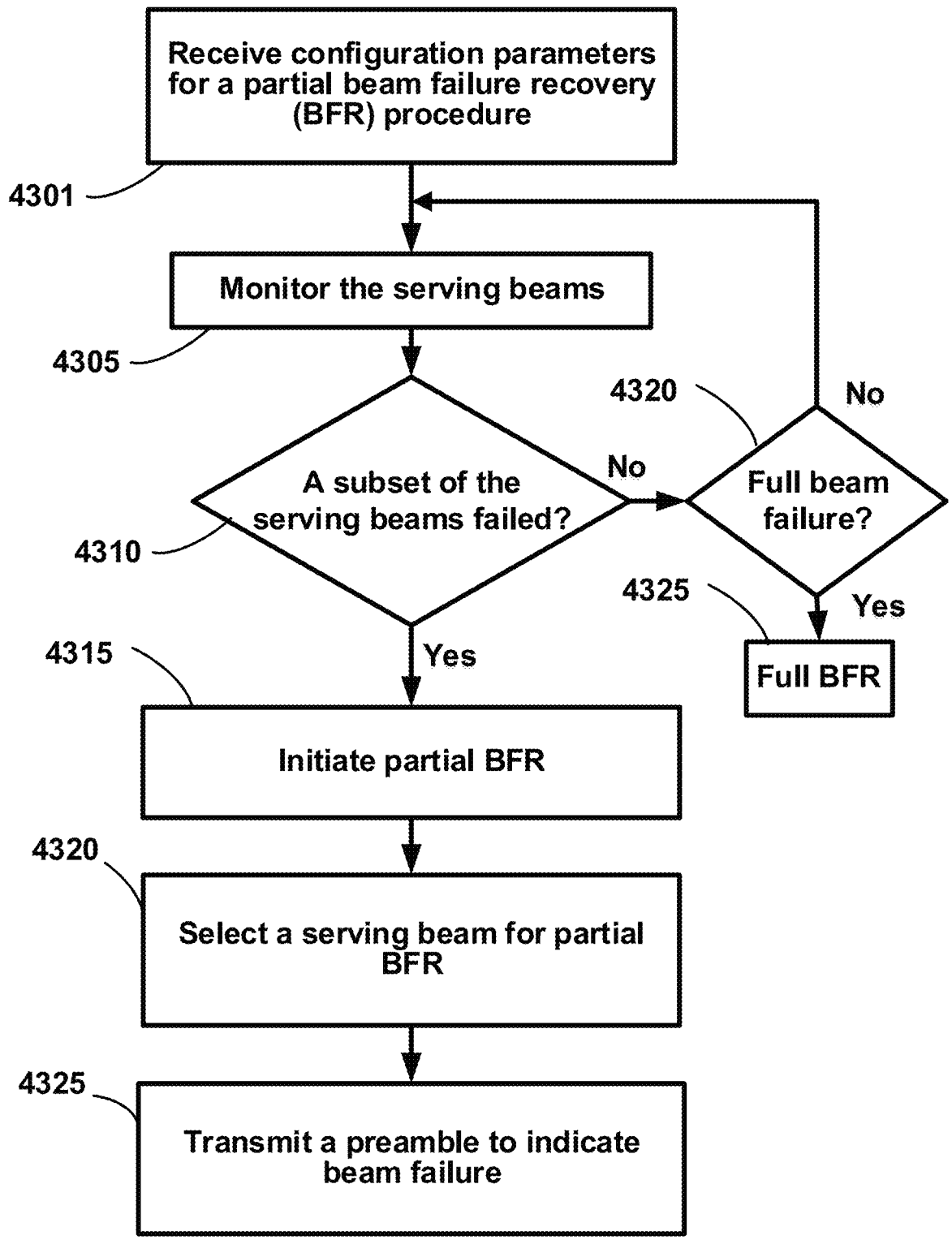
FIG. 43 shows an example of partial beam failure recovery by a wireless device.

FIG. 43 shows an example of partial beam failure recovery. At step 4301, a wireless device (e.g., a UE) may receive (e.g., from a base station) configuration parameters for a partial beam failure recovery procedure. The configuration parameters may comprise parameters for configuring a plurality of serving beams, at least one RACH resource (which may be associated with the plurality of serving beams), a predetermined threshold for beam failure, and/or a mapping rule. The mapping rule may associate a selection scheme (such as the example selection schemes depicted in FIG. 37, FIG. 38, and/or FIG. 39) with the serving beams.

At step 4305, the wireless device may monitor the plurality of serving beams, for example, to determine if a beam failure has occurred. The beam failure may be detected based on detecting a quality (e.g., a quality of RSRP and/or BLER) of at least one serving beam of the plurality of serving beams and/or the quality of the at least one serving beam falling below the predetermined threshold. At step 4305, the wireless device may determine if a subset of the plurality of serving beams has failed. A failure of the subset may comprise a failure of the at least one serving beam with at least one other serving beam of the plurality of serving beams not failing. If the subset has failed, the wireless device may proceed with initiating a partial beam failure recovery procedure at step 4315. The wireless device may determine if a full beam failure has occurred at step 4320 (e.g., if all serving beams of the plurality of serving beams have failed), which may cause the wireless device to proceed with full beam failure recovery at step 4325. If no failure is detected, the wireless device may continue to monitor the plurality of serving beams at step 4305

At step 4315, the wireless device may initiate partial beam failure recovery (e.g., using systems or methods as described herein). At step 4320, the wireless device may select a serving beam of the plurality of serving beams for beam recovery. The selected serving beam may be a serving beam with a quality above the predetermined threshold. The selected serving beam may be randomly selected. The selected serving beam may be selected based on the mapping rule. At step 4325, the wireless device may send a preamble via the at least one RACH resource. The preamble may be sent using the selected serving beam (and/or a RACH resource associated with the selected serving beam). The preamble may indicate the beam failure regarding the subset of the plurality of serving beams.

Figure 44:
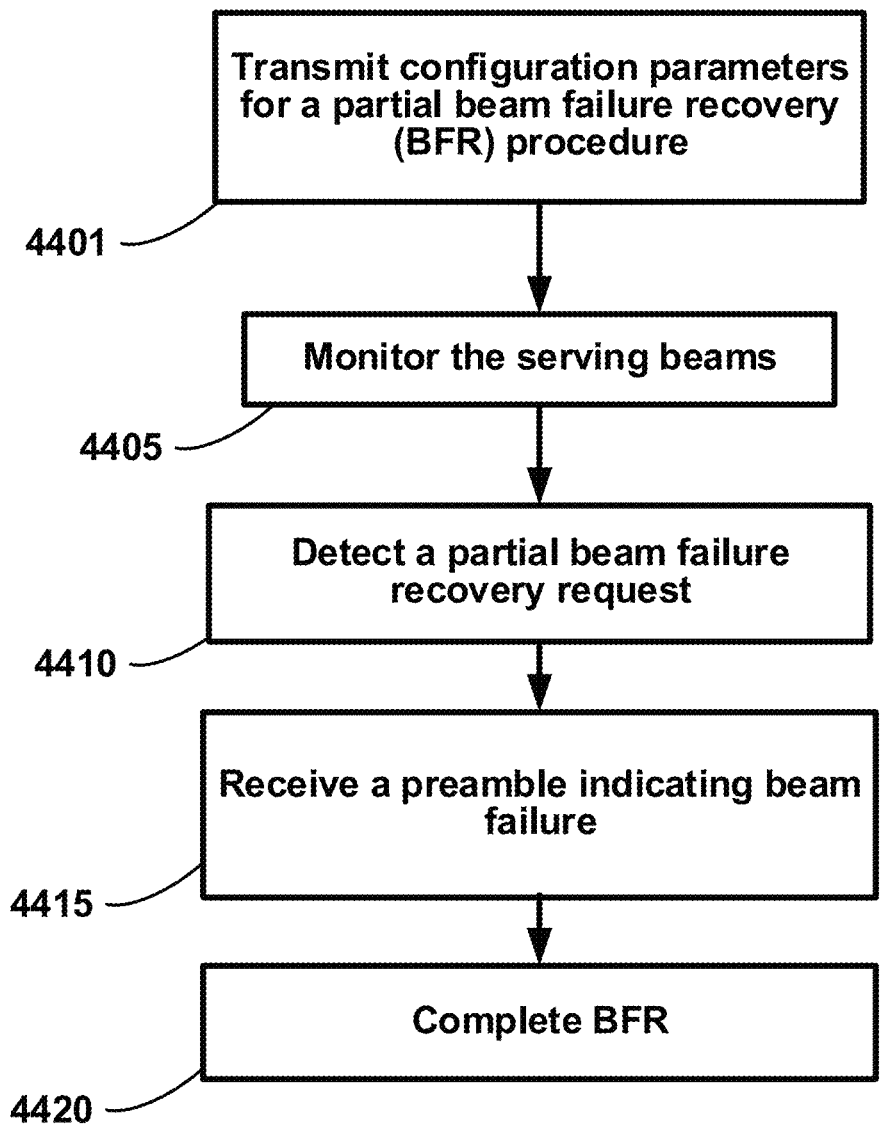
FIG. 44 shows an example of partial beam failure recovery by a base station.

FIG. 44 shows an example of partial beam failure recovery. At step 4401, a base station may send (e.g., to a wireless device) configuration parameters for a partial beam failure recovery procedure. The configuration parameters may comprise parameters for configuring a plurality of serving beams, at least one RACH resource (which may be associated with the plurality of serving beams), a predetermined threshold for beam failure, a mapping rule, and/or other parameters used in beam failure recovery. The mapping rule may associate a selection scheme (such as the example selection schemes depicted in FIG. 37, FIG. 38, and/or FIG. 39) with the serving beams.

At step 4405, the base station may monitor the plurality of serving beams, for example, to determine if a beam failure has occurred. At step 4410, the base station may detect a partial beam failure recovery request, which may indicate that a subset of the plurality of serving beams has failed. A failure of the subset may comprise a failure of the at least one serving beam with at least one other serving beam of the plurality of serving beams not failing.

At step 4415, the base station may receive (e.g., from the wireless device) a preamble indicating the beam failure. The preamble may indicate the failed subset and/or a selected beam for beam failure recovery. The selected serving beam may be a serving beam with a quality above the predetermined threshold. The selected serving beam may be randomly selected. The selected serving beam may be selected based on the mapping rule. The preamble may be received by the at least one RACH resource, which may be assigned based on the mapping rule. The preamble may be sent using the selected serving beam (and/or a RACH resource associated with the selected serving beam). The preamble may indicate the beam failure regarding the subset of the plurality of serving beams. At step 4420, the base station may complete BFR, such as using the systems or methods described herein.

Candidate beams selected based on a highest RSRP may cause additional latency, congestion, and/or beam failure (e.g., because the high RSRP may cause a large number of devices to connect to the candidate beam, causing overload and/or beam failure). A wireless device (e.g., a UE) may identify new candidate beams (e.g., the candidate beam and/or a replacement candidate beam if the initial candidate beam fails) based on one or more other criteria (which may be in addition to RSRP). The wireless device may determine the replacement candidate beam based on one or more of a time criterion and/or a frequency criterion. The wireless device may select a particular criterion to determine the replacement candidate, for example, based on a mobility level of a wireless device (e.g., above or below a speed threshold) and/or based on an interference level of a wireless device (e.g., above or below an interference threshold). If a wireless device is above a first mobility level (and/or if a wireless device is below a first interference level), a replacement candidate may be determined based on a time criterion. If a wireless device is above a second interference level (and/or if a wireless device is below a second mobility level), a replacement candidate may be determined based on a frequency criterion.

The wireless device may determine the replacement candidate beam based on a time criterion (e.g., the replacement candidate beam may be broadcast a threshold time after the initial/previous candidate beam). Beams may be broadcast in a "sweep" by a base station, so beams broadcast close together may be directed in a similar direction. Waiting a threshold time may have the advantage of selecting the replacement candidate beam directed to a different direction than the initial/previous candidate beam. This may have the advantage of compensating for the wireless device moving at high speed, as beams directed similarly to the initial/previous candidate beam may not be directed toward the wireless device if the wireless device is disconnected due to being moved.

The wireless device may determine the replacement candidate beam based on a frequency criterion. In a high interference environment, frequencies for multiple RSs may overlap and cause interference, and/or external interference (e.g., microwaves, cordless home phones, or other wireless devices) may cause interference resulting in beam failure. The wireless device may select the replacement candidate beam with a frequency that is a threshold distance from a frequency of the initial/previous candidate beam, which may reduce the probability that the replacement candidate beam will not successfully complete BFR due to interference. The wireless device may use one or more criteria or methods discussed herein to select the replacement candidate beam (e.g., the wireless device may randomly select the replacement candidate beam from a group of candidate beams meeting the time criterion and the frequency criterion). The wireless device may then repeat the BFR process with the replacement candidate beam.

Figure 45:
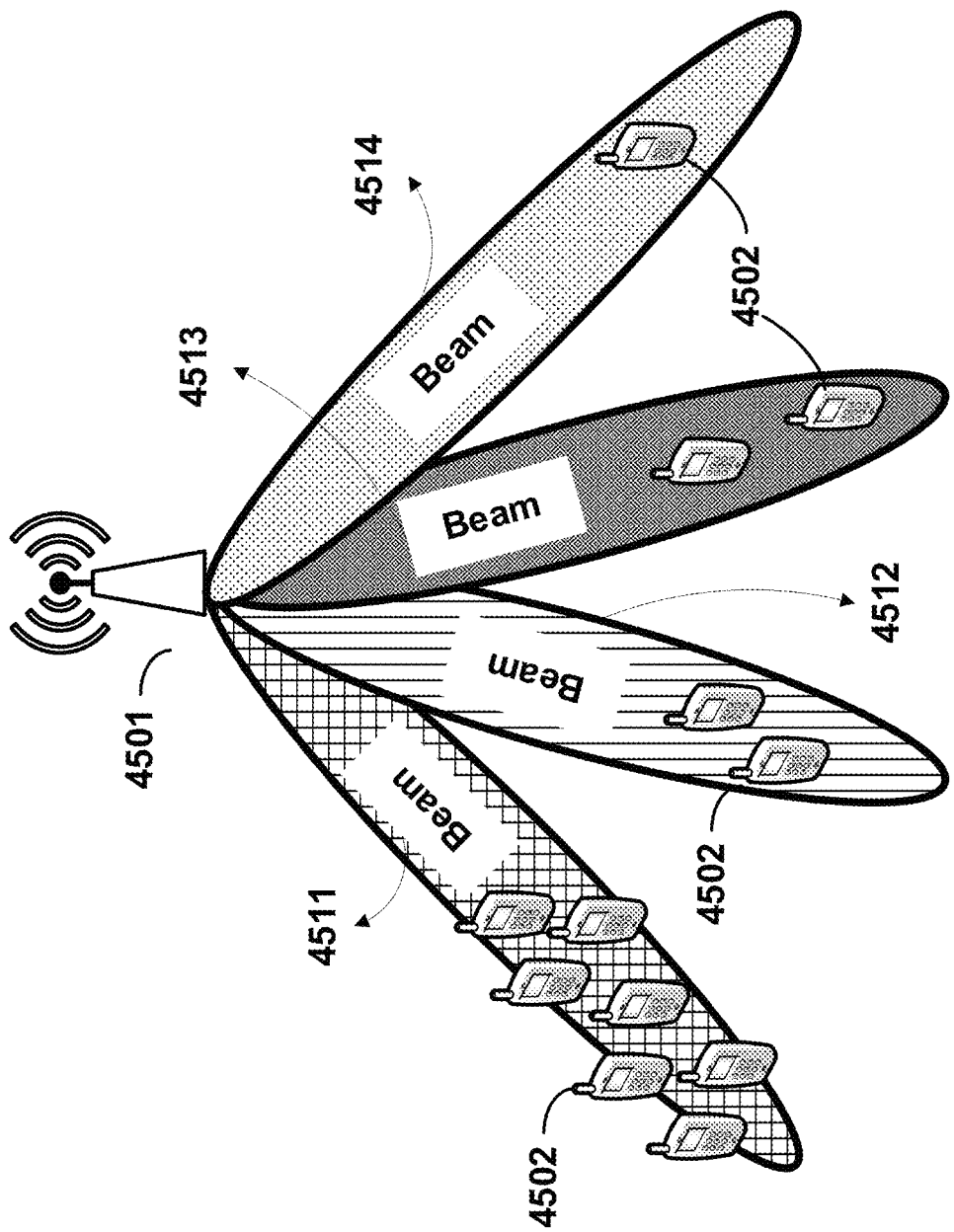
FIG. 45 shows an example of a plurality of candidate beams in a crowded environment.

FIG. 45 shows an example of a plurality of candidate beams being identified by a plurality of wireless devices (e.g., UEs). At least one wireless device of the wireless devices 4502 may detect a beam failure based on measuring at least one reference signal associated with at least one downlink serving control channel with a BLER higher than a first threshold. The at least one wireless device may identify (e.g., based on the beam failure detection) at least one candidate beam (e.g., at least one of a beam 4511, a beam 4512, a beam 4512, and/or a beam 4514) different from the at least one reference signal based on a second threshold. The at least one candidate beam may be selected by the at least one of the wireless devices as a candidate beam. One candidate beam may be identified by multiple of the wireless devices 4502 (e.g., due to various wireless device locations and/or the mobility of the wireless devices 4502). Some candidate beams may associate with a larger number of the wireless devices 4502 than others (e.g., due to various wireless device locations and/or the mobility of the wireless devices 4502). If the beam failure recovery procedure on a beam with a larger number of the wireless devices 4502 (e.g., the beam 4511) completes successfully, a base station 4501 may serve the larger number of wireless devices 4502 with the at least one candidate beam (e.g., the beam 4512). Adding the larger number of the wireless devices 4502 may cause an overload problem on the at least one candidate beam due to oversubscription (e.g., scheduling problem of PUSCH, PUCCH, PDSCH, and/or PDCCH).

At least one of the wireless devices 4502, based on a beam failure detection, may select the beam 4511 as a candidate beam. The at least one of the wireless devices 4502 may send, based on selecting beam 4511 as the candidate beam, a preamble via a BFR-PRACH resource associated with the beam 4511 and/or via a BFR-PUCCH resource. The base station 4501 may not have enough resources (e.g., PUSCH/PUCCH and/or PDCCH/PDSCH resources) to serve the at least one of the wireless devices 4502 (e.g., due to high overload on a serving beam). The base station 4501 may use analog beamforming. The base station 4501 may periodically sweep through multiple beams (e.g., from beam 4511 through beam 4514). As the base station 4501 sweeps through the multiple beams, the base station 4501 may progress through beams directed at various angles. Beams broadcast more closely in time may be directed to more similar angles than beams broadcast more distantly in time. Selecting a new candidate beam, broadcast a threshold time after an initial candidate beam, may select a beam that is more likely to broadcast at a sufficiently different angle to connect to the wireless device, for example, if the wireless device has moved from a prior location. There may be a delay on UL/DL transmission to schedule one or more resources for the larger number of the wireless devices 4502 (e.g., if the beam 4511 is associated with the larger number of the wireless devices 4502). The delay may cause a beam management procedure on the large number of the wireless devices 4502 to distribute the large number of the wireless devices 4502 to other beams (e.g., from beam 4511 to at least one of beam 4512, beam 4513, and/or beam 4514), which may introduce latency. The wireless devices 4502 may use a beam selection mechanism to identify the candidate beam. The beam selection mechanism may be used to select the candidate beam from several possible candidate beams. The beam selection mechanism may be specific to the at least one of the wireless devices 4502 and/or may be predefined. The beam selection mechanism may distribute the wireless devices 4502 between each beam (e.g., evenly across beam 4511, beam 4512, beam 4513, and/or beam 4514) to avoid overloading a single beam (e.g., beam 4511) and/or to achieve an efficient utilization of resources.

There may be criteria for selecting a candidate beam during a retransmission of BFRQ triggered for at least one failed beam. The at least one of the wireless devices 4502 may select a candidate beam (e.g., the beam 4511) based on a received signal strength (e.g., a highest signal strength among multiple detected beams) and/or a quality (e.g., a quality of RSRP and/or BLER). The at least one of the wireless devices 4502 device may randomly select a candidate beam (e.g., the beam 4512). The randomly selected beam may be selected from a plurality of beams with a received signal strength and/or a quality exceeding a threshold. The plurality of beams may exclude any failed beams. The selected beam may be selected using a second threshold (which may be predefined and/or semi-statically configured) that may based on an allowable backoff value from a beam quality of a previous candidate beam (e.g., a lower beam quality than the quality of the previous candidate beam).

The at least one of the wireless devices 4502 may receive (e.g., from the base station 4501) at least one message comprising: first parameters indicating at least one reference signal (RS); second parameters indicating at least one RACH resource for a beam failure recovery request; and/or third parameters indicating at least one association between at least one of the at least one RS and/or the at least one RACH resource. The at least one of the wireless devices 4502 may send a first preamble via a first RACH resource associated with a first RS (e.g., based on detecting a beam failure). The at least one of the wireless devices 4502 may monitor (e.g., during a response window) a PDCCH for a response from the base station 4501. The at least one of the wireless devices 4502 may select (e.g., based on not detecting a response during the response window) a second RS, wherein a difference between a first received signal strength (RSS) of the first RS and a second RSS of the second RS exceeding (or failing to exceed) a first threshold. The at least one of the wireless devices 4502 may send (e.g., based on the RS selection) a second preamble via a second RACH resource. The second preamble and the second RACH resource may be associated with the second RS. The at least one RS may comprise at least one CSI-RS and/or at least one SS block. A RACH resource (e.g., the at least one RACH resource or the second RACH resource) may comprise a time resource, a frequency resource, and/or a preamble. Beam failure may be detected based on a received signal strength of at least downlink control channels being lower than a first threshold. Based on the detection, at least one candidate beam associated with the at least one reference signal may be identified based on a second threshold. An RSS may be measured based on the received power of the at least one RS.

Figure 46:
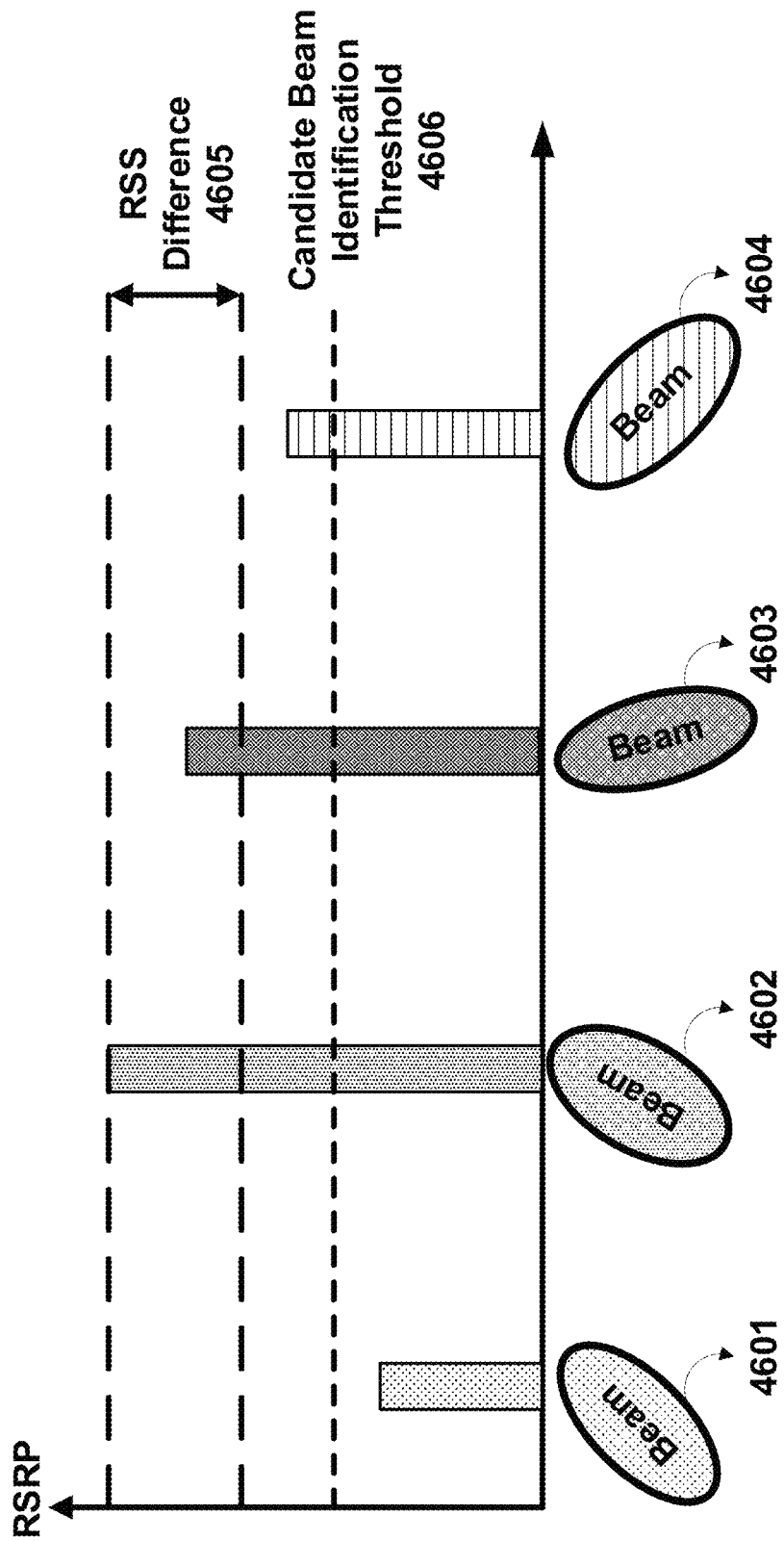
FIG. 46 shows an example of a beam selection based on thresholds.

FIG. 46 shows an example of a beam selection. A wireless device may be configured to measure and/or determine (e.g., based on detecting a beam failure) a quality (e.g., a quality of RSRP and/or BLER) of one or more candidate beams (e.g., a beam 4601, a beam 4602, a beam 4603, and/or a beam 4604). The wireless device may identify a first candidate beam based on a quality exceeding a threshold (e.g., the beam 4602, the beam 4603, and/or the beam 4604 may be identified based on exceeding the candidate beam identification threshold 4606). The wireless device may send (e.g., based on detecting a beam failure) a first preamble via a first RACH resource associated with a first beam (e.g., the beam 4602). The first beam may be selected based on the first beam having a highest RSRP and/or a lowest BLER among the one or more candidate beams. The wireless device may select, based on not detecting a response during a response window (e.g., the timer 3320 of FIG. 33), a second beam (e.g., beam the 4603). The wireless device may select the second beam to alleviate an overload problem on the first beam. The wireless device may employ a second value (e.g., the RSS difference 4605), which may be predefined and/or semi-statically configured. The wireless device may determine if a difference between a first received signal strength (RSS) of the first beam and a second RSS of the second beam exceeds the first value. The difference exceeding the first value may indicate that the second beam is not sufficiently close in quality to the first beam. The wireless device may send, based on the selection, a second preamble via a second RACH resource. The second preamble and the second RACH resource may be associated with the second beam.

Figure 47:
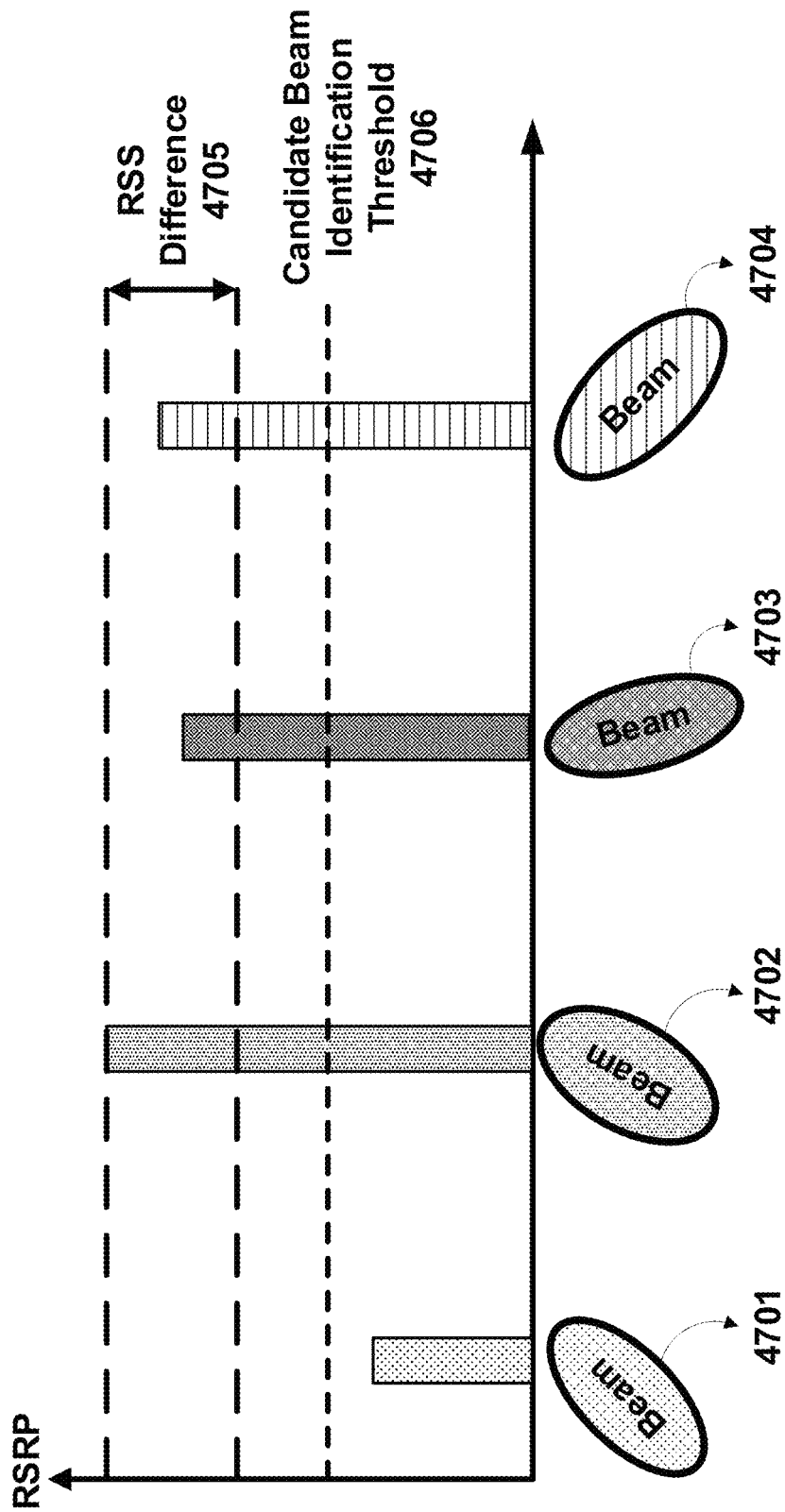
FIG. 47 shows an example of a beam selection based on thresholds.

FIG. 47 shows an example of a beam selection. A wireless device (e.g., a UE) may be configured to measure and/or determine (e.g., based on detecting a beam failure) a quality (e.g., a quality of RSRP and/or BLER) of one or more candidate beams (e.g., a beam 4701, a beam 4702, a beam 4703, and/or a beam 4704). The wireless device may identify a first candidate beam based on a quality exceeding a threshold (e.g., the beam 4702, the beam 4703, and/or the beam 4704 may be identified based on exceeding the candidate beam identification threshold 4706). The wireless device may send (e.g., based on detecting the beam failure) a first preamble via a first RACH resource associated with a first beam (e.g., the beam 4702). The first beam may be selected based on the first beam having a highest RSRP and/or a lowest BLER among the one or more candidate beams. The wireless device may select (e.g., randomly select) (e.g., based on not detecting a response within a response window, such as the timer 3320 of FIG. 33) a second beam among the one or more candidate beams whose quality is higher than the threshold (e.g., the wireless device may randomly select the beam 4703 or the beam 4704). The wireless device may select the second beam based on determining that a difference between a first RSS of the first beam and a second RSS of the second beam does not exceed a first value (e.g., the RSS difference 4705). The wireless device may select the second beam to alleviate an overload problem on the first beam. The wireless device may select (e.g., based on not detecting a response within a response window, such as the timer 3320 of FIG. 33) the second beam among the one or more candidate beams that have a quality that is higher than the threshold (e.g., the wireless device may randomly select the beam 4703 or the beam 4704) and that have a second-highest RSRP and/or a lowest BLER from among the one or more candidate beams. The wireless device may send, based on the selection, a second preamble via a second RACH resource. The second preamble and the second RACH resource may be associated with the second beam. wireless device.

The wireless device may receive, from a base station, one or more messages comprising at least one of: first parameters indicating the at least one reference signal (RS); second parameters indicating the at least one RACH resource for a beam failure recovery request; and/or third parameters indicating at least one association between the at least one RS and the at least one RACH resource. The wireless device may send a first preamble via a first RACH resource associated with a first RS based on detecting a beam failure. The wireless device may monitor (e.g., during a response window, such as the timer 3320 in FIG. 33) a PDCCH for a response from the base station. The wireless device may select a second RS (e.g., based on no response being detected during the response window) based on a time difference between a first TTI for receiving the first RS and a second TTI for receiving the second RS exceeding a second threshold. The wireless device may select (e.g., based on not detecting a response during the response window) the second RS based on determining that the RSS of the second RS is lower than the RSS of the first RS and higher than the second threshold, and/or based on determining that the time difference exceeds the second threshold. The wireless device may send, based on the RS selection, a second preamble via a second RACH resource, wherein the second preamble and the second RACH resource are associated with the second RS.

Criteria may be used to select a candidate beam for use in a retransmission of BFRQ triggered for a failed beam. The wireless device may select a candidate beam, for example, based on an RS transmission time associated with the candidate beam. The wireless device may randomly select a first beam, from one or more beams, as a candidate beam. The selection may be based on a time difference between an RS transmission time of the one or more beams and an RS transmission time of a previous candidate beam selected in a previous BFRQ transmission being higher than a time threshold. The time threshold may indicate a time difference in terms of transmission time (e.g., TTI, slot, mini-slot, or symbol value from the transmission time of the previous candidate beam). The time threshold may provide time diversity and/or a distributed candidate beam selection mechanism. The time threshold may be useful for UEs with high mobility. A wireless device may select a first beam for a candidate beam based on the first beam having a highest received signal strength and/or a highest quality of the one or more beams. The one or more beams may comprise beams that have not failed. The one or more beams may comprise beams for which a second time difference, between an RS transmission time of the one or more beams and the RS transmission time of the previous candidate beam selected in the previous BFRQ transmission, exceeds the time threshold.

Figure 48:
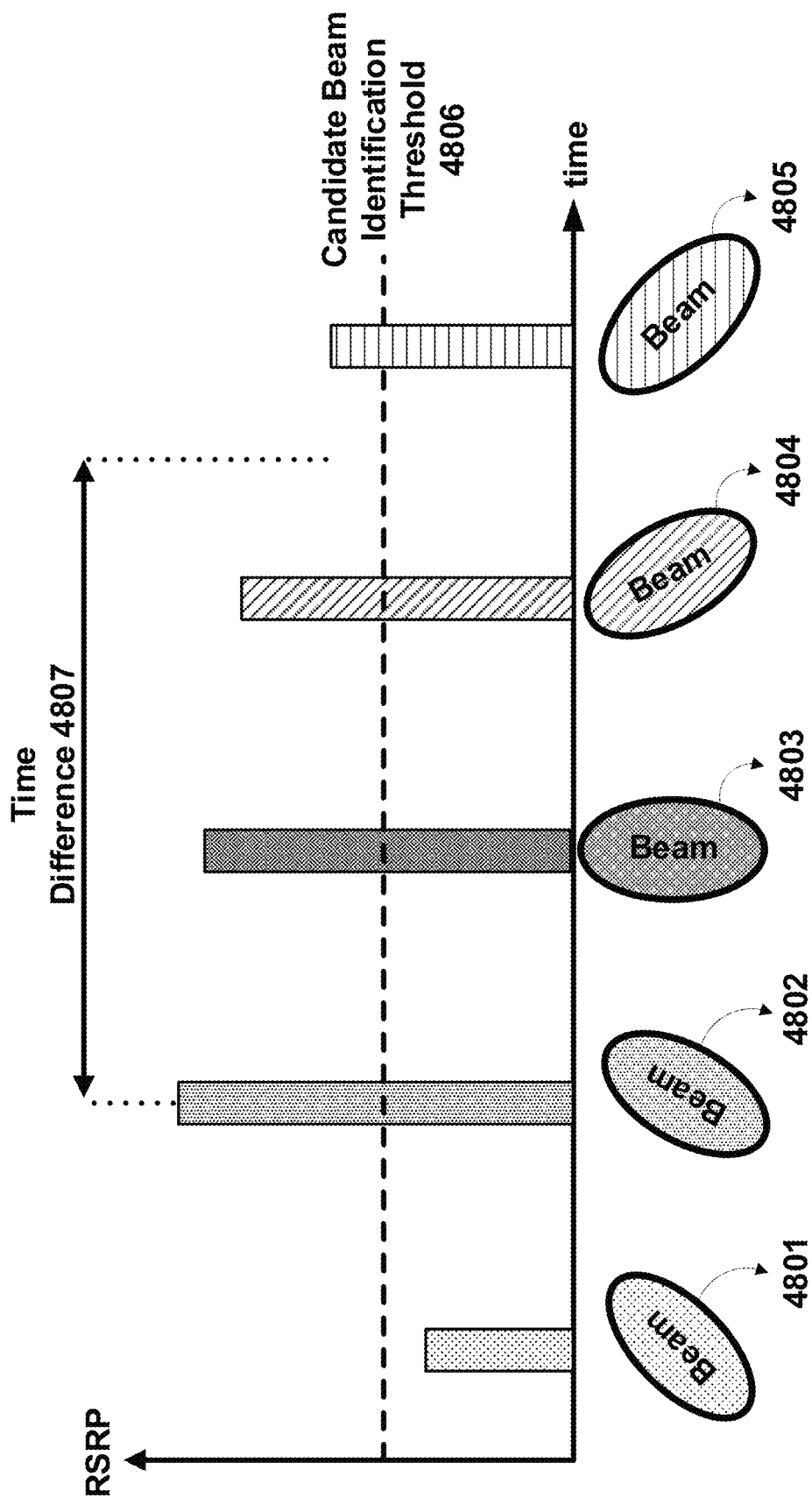
FIG. 48 shows an example of a beam selection based on a time difference.

FIG. 48 shows an example of a beam selection. A wireless device (e.g., a UE) may be configured to measure and/or determine (e.g., based on detecting a beam failure) a quality (e.g., a quality of RSRP and/or BLER) of one or more candidate beams (e.g., a beam 4801, a beam 4802, a beam 4803, a beam 4804, and/or a beam 4805). The wireless device may identify (e.g., based on measuring the beam quality) at least one candidate beam with a quality that exceeds a threshold (e.g., the beam 4802, the beam 4803, the beam 4804, and/or the beam 4805 may be identified as exceeding a candidate beam identification threshold 4806). The wireless device may send (e.g., based on detecting the beam failure) a first preamble via a first RACH resource associated with a first beam (e.g., the beam 4802). The first beam may be selected based on the first beam having a highest RSRP and/or a lowest BLER among the one or more candidate beams. The wireless device may select (e.g., based on not detecting a response within a response window, such as the timer 3320 of FIG. 33) a second beam based on a RSS and/or RS transmission time associated with each of the one or more candidate beams. The wireless device may select the second beam based on a quality of the second beam exceeding the candidate beam identification threshold 4802. The wireless device may select the second beam based on determining that a difference, between a first RS transmission time of the first beam and a second RS transmission time of the second beam, exceeds a time difference 4807. The wireless device may send, based on the selection, a second preamble via a second RACH resource. The second preamble and the second RACH resource may be associated with the second beam.

Figure 49:
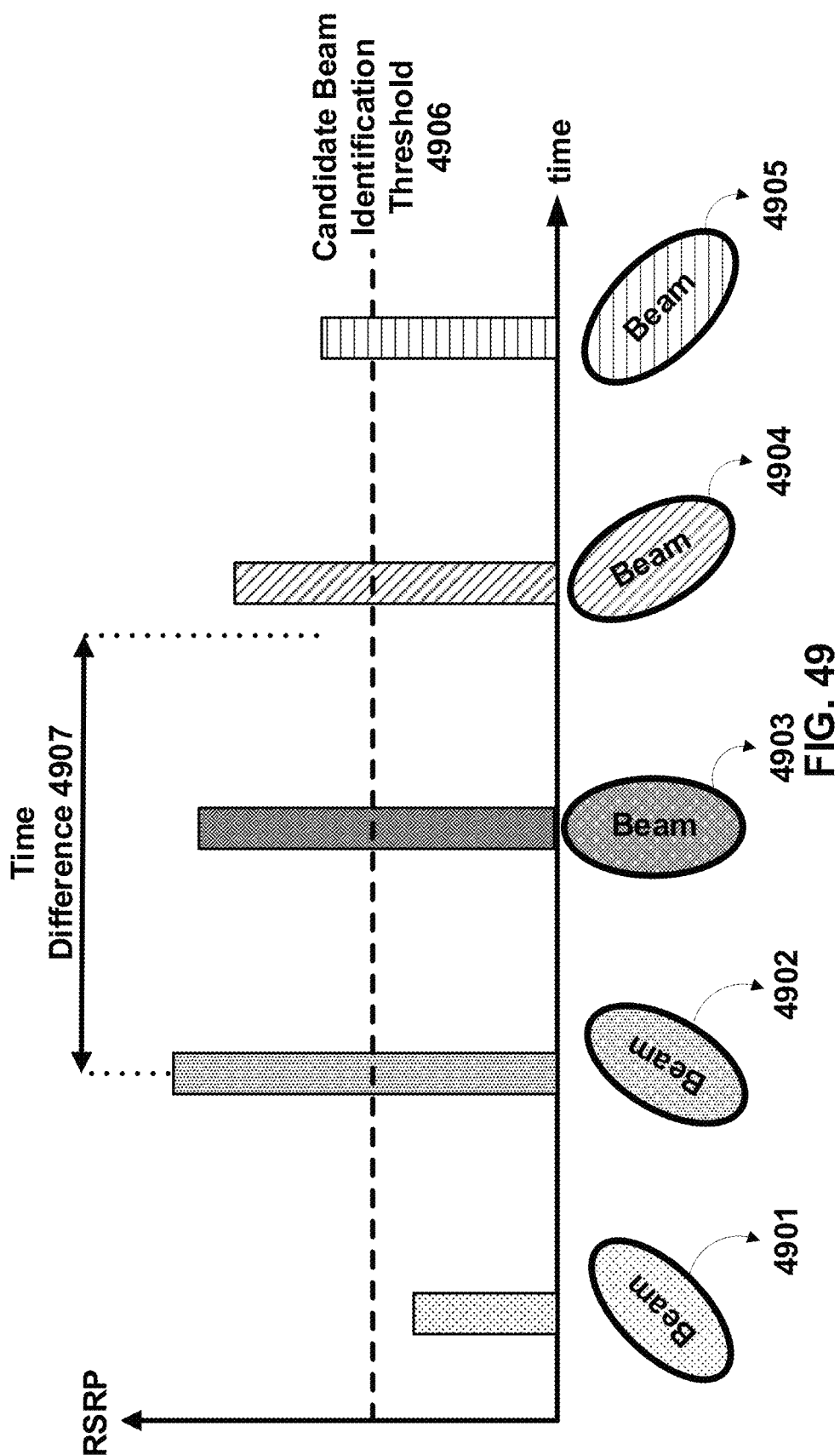
FIG. 49 shows an example of a beam selection based on a time difference.

FIG. 49 shows an example of a beam selection. A wireless device (e.g., a UE) may be configured to measure and/or determine (e.g., based on detecting a beam failure) a quality (e.g., a quality of RSRP and/or BLER) of one or more candidate beams (e.g., a beam 4901, a beam 4902, a beam 4903, a beam 4904, and/or a beam 4905). The wireless device may identify (e.g., based on measuring the beam quality) at least one candidate beam with a quality that exceeds a threshold (e.g., the beam 4902, the beam 4903, the beam 4904, and/or the beam 4905 may be identified as exceeding a candidate beam identification threshold 4906). The wireless device may send (e.g., based on detecting the beam failure) a first preamble via a first RACH resource associated with a first beam (e.g., the beam 4902). The first beam may be selected based on the first beam having a highest RSRP and/or a lowest BLER among the one or more candidate beams. The wireless device may select (e.g., based on not detecting a response within a response window, such as the timer 3320 of FIG. 33) a second beam based on a RSS and/or RS transmission time associated with each of candidate beams. The wireless device may randomly select the second beam from a plurality of beams for which a quality exceeds the candidate beam identification threshold 4902 (e.g., beam the 4904 and/or the beam 4905). The wireless device may select the second beam based on determining that a difference between a first RS transmission time of the first beam and a second RS transmission time of the second beam exceeds a time difference 4907. The wireless device may select the second beam based on the second beam having a highest RSRP and/or a lowest BLER among the one or more candidate beams. The wireless device may select the second beam such that the second beam may be sent outside the time difference 4907 from the first beam (e.g., the beam 4904 exceeds the time difference 4907 from the beam 4902). The wireless device may select the second beam from among multiple beams after the time difference 4907 based on the highest RSRP (e.g., the beam 4904 has a higher RSRP than the beam 4905). The wireless device may send, based on the selection, a second preamble via a second RACH resource. The second preamble and the second RACH resource may be associated with the second beam.

The wireless device may receive, from a base station, one or more messages comprising at least one of: first parameters indicating at least one reference signal (RS); second parameters indicating at least one RACH resource for a beam failure recovery request; and/or third parameters indicating oat least one association between the at least one RS and the at least one RACH resource. The wireless device may send a first preamble via a first RACH resource associated with a first RS based on detecting a beam failure. The wireless device may monitor (e.g., during a response window) a PDCCH for a response from the base station. The wireless device may select (based on not detecting a response during the response window, such as the timer 3320 in FIG. 33) a second RS, based on determining that the RSS of the second RS may be higher than the RSS of the first RS, and/or based on determining that a time difference between a first TTI for the first RS and a second TTI for the second RS exceeds a time threshold. Selecting the second RS based on exceeding the time threshold may have the advantage of avoiding overload on the first beam and/or providing time diversity.

Figure 50:
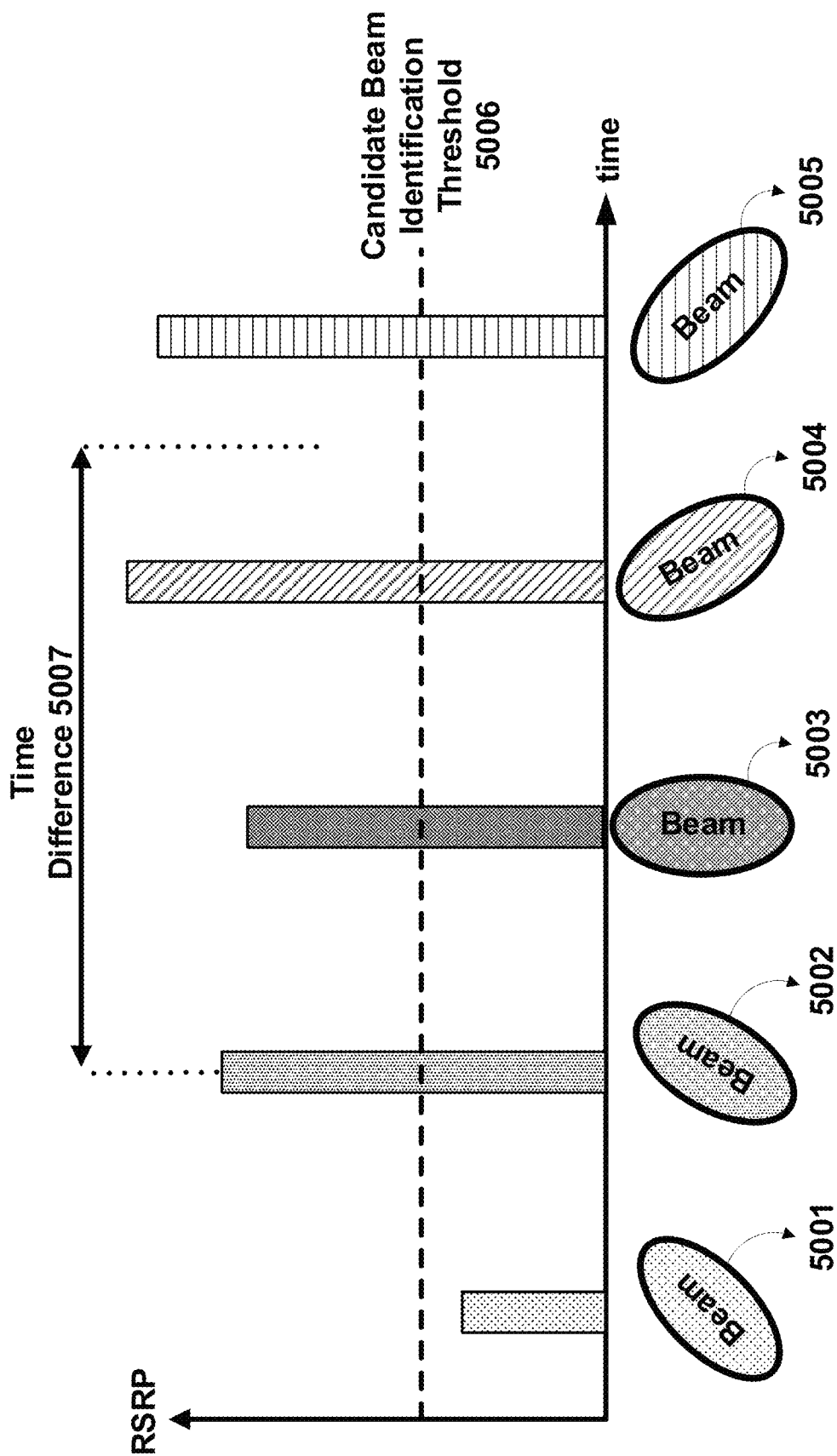
FIG. 50 shows an example of a beam selection based on a time difference.

FIG. 50 shows an example of a beam selection. A wireless device (e.g., a UE) may be configured to measure and/or determine (e.g., based on detecting a beam failure) a quality (e.g., a quality of RSRP and/or BLER) of one or more candidate beams (e.g., a beam 5001, a beam 5002, a beam 5003, a beam 5004, and/or a beam 5005). The wireless device may identify (e.g., based on measuring the beam quality) at least one candidate beam with a quality that exceeds a threshold (e.g., the beam 5002, the beam 5003, the beam 5004, and/or the beam 5005 may be identified as exceeding a candidate beam identification threshold 5006). The wireless device may send (e.g., based on detecting the beam failure) a first preamble via a first RACH resource associated with a first beam (e.g., the beam 5002). The wireless device may select (e.g., based on not detecting a response during a response windows, such as the timer 3320 of FIG. 33) a second beam based on a RSS and/or an RS transmission time associated with each of the one or more candidate beams. The wireless device may identify the second beam based on a quality of the second beam exceeding the candidate beam identification threshold 5006. The wireless device may randomly select the second beam from a plurality of beams exceeding a time difference 5007 from the first beam (e.g., the beam 5005 exceeds the time difference 5007 from the beam 5002). The wireless device may select the second beam from the plurality of beams (e.g., the beams after the time difference 5007) by selecting the beam with the highest RSRP and/or lowest BLER among the plurality of beams. The wireless device may send, based on the selection, a second preamble via a second RACH resource. The second preamble and the second RACH resource may be associated with the second beam. wireless device.

The wireless device may receive, from a base station, one or more messages comprising at least one of: first parameters indicating at least one reference signal (RS); second parameters indicating at least one RACH resource for a beam failure recovery request; and/or third parameters indicating at least one association between the at least one RS and the at least one RACH resource. The wireless device may send a first preamble via a first RACH resource associated with a first RS based on to detecting a beam failure. The wireless device may monitor (e.g., during a response window, such as timer 3320 of FIG. 33) a PDCCH for a response from the base station. The wireless device may select (e.g., based on not detecting a response during the response window) a second RS, wherein the second RS has a second-highest RSRP among a plurality of candidate beams (e.g., the beam 5005 may be selected because it has the second-highest RSRP). The selection of the second beam with the second-highest RSRP may have the advantage of avoiding overloading a beam with a highest RSRP (e.g., the beam 5004), which may have a large number of connected clients. A quality (e.g., RSRP) of the second beam may be enough for successful transmission of a beam failure recovery request. The wireless device may select (e.g., based on not detecting a response during the response window) a second RS, wherein the second RS has a highest RSS among the plurality of candidate beams. The wireless device may send, based on the selection, a second preamble via a second RACH resource. The second preamble and the second RACH resource may be associated with the second beam.

Figures 51A, 51B:
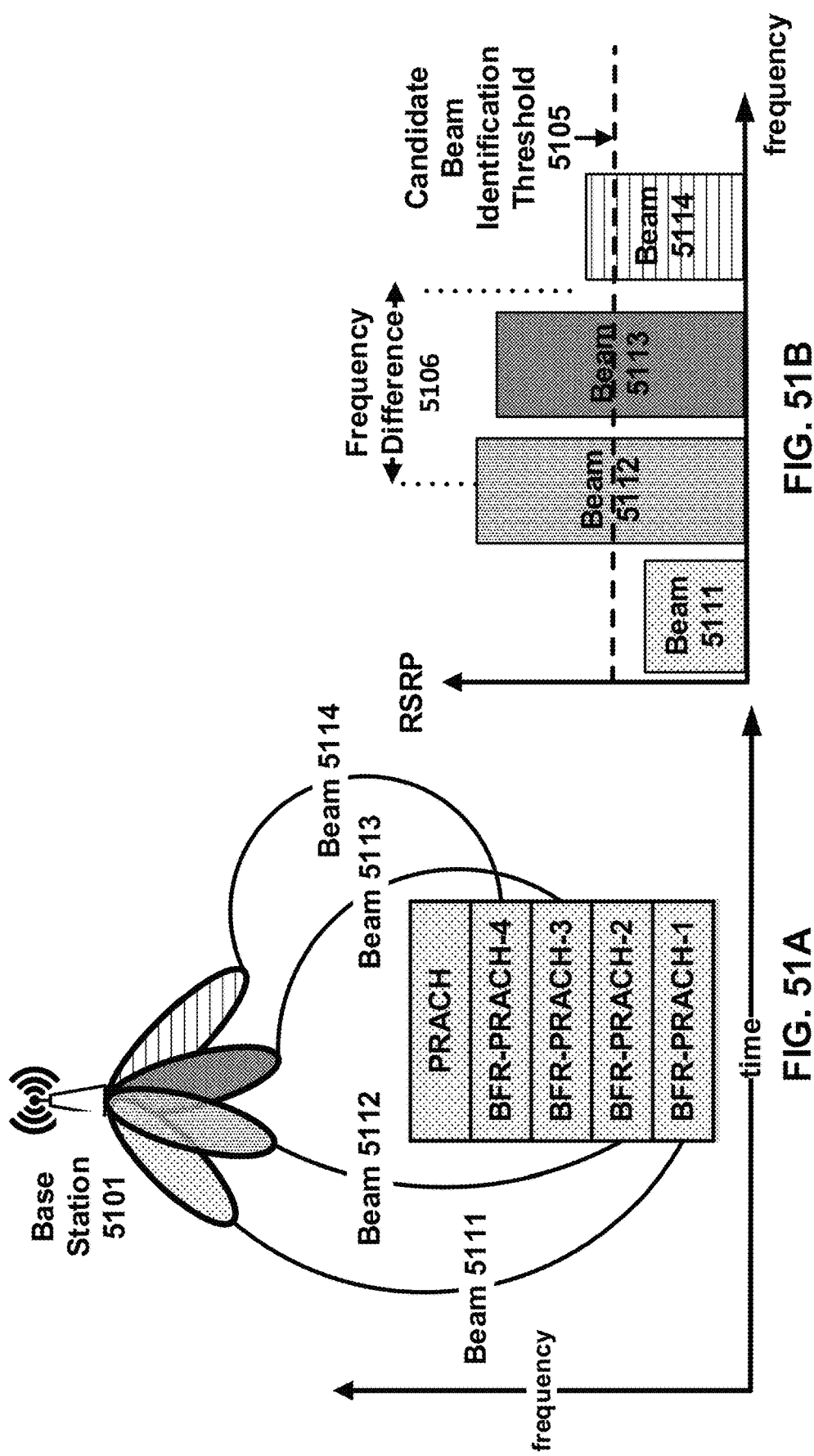
FIG. 51A shows an example of a beam selection.
FIG. 51B shows an example of a beam selection.

FIG. 51A and FIG. 51B show examples of beam selections. Criteria may be used to select a candidate beam for use in a retransmission of BFRQ triggered for a failed beam. A wireless device (e.g., a UE) may select a candidate beam based on transmission frequency. The wireless device may select a candidate beam based on frequency resources associated with the candidate beam. The wireless device may randomly select a candidate beam among candidate beams that are beyond a specified frequency interval (e.g., frequency difference 5106) from a prior candidate beam. The frequency interval may indicate a frequency difference in terms of a resource block, a subcarrier, and/or a bandwidth value. The wireless device may select the candidate beam based on determining a group of beams outside the frequency interval, and choosing a beam based on a criteria from the group (e.g., selecting a beam with a highest received signal strength and/or highest quality from the group as the candidate beam). Selecting a beam based on the frequency interval may have the advantage of avoiding overloading the previous candidate beam and/or providing frequency diversity.

A wireless device may be configured to measure and/or determine a quality (e.g., a quality of RSRP and/or BLER) of one or more candidate beams to a base station 5101 (e.g., a beam 5111, a beam 5112, a beam 5113, and/or a beam 5114). The wireless device may identify (based on measuring the beam quality) at least one candidate beam with a quality that exceeds a threshold (e.g., the beam 5112, the beam 5113, and/or the beam 5114 may be identified as exceeding a candidate beam identification threshold 5105). The wireless device may send (e.g., based on detecting a beam failure) a first preamble via a first RACH resource associated with a first beam (e.g., the beam 5112). The wireless device may select (e.g., based on not detecting a response within a response window, such as the timer 3320 of FIG. 33) a second beam based on a RSS and/or a RS transmission frequency associated with each of the one or more candidate beams. The RS transmission frequency may comprise the frequency resources used for BFR-PRACH transmission associated with the one or more candidate beams (e.g., the candidate beams in FIG. 40A and/or FIG. 40B). The wireless device may identify one or more beams based on determining that a quality of the one or more beams is higher than the candidate beam identification threshold 5105. The wireless device may randomly select one of the one or more beams exceeding a frequency threshold (e.g., the frequency difference 5106) from a prior beam (e.g. the beam 5114 may exceed the frequency threshold from the beam 5112). The wireless device may select a candidate beam by selecting a beam with a highest RSRP and/or lowest BLER (e.g., not randomly) from among the beams exceeding the frequency threshold wireless device. The wireless device may send, based on the selection, a second preamble via a second RACH resource. The second preamble and the second RACH resource may be associated with the second beam.

Criteria may be used to select a candidate beam during a retransmission of BFRQ triggered for one or more failed beams. The wireless device may select a candidate beam based on received signal strength, quality, RS transmission time, and/or RS transmission frequency. Combining multiple criteria and/or selection techniques may have the advantage of promoting time diversity and/or frequency diversity, as well as avoiding beam overload.

Figure 52:
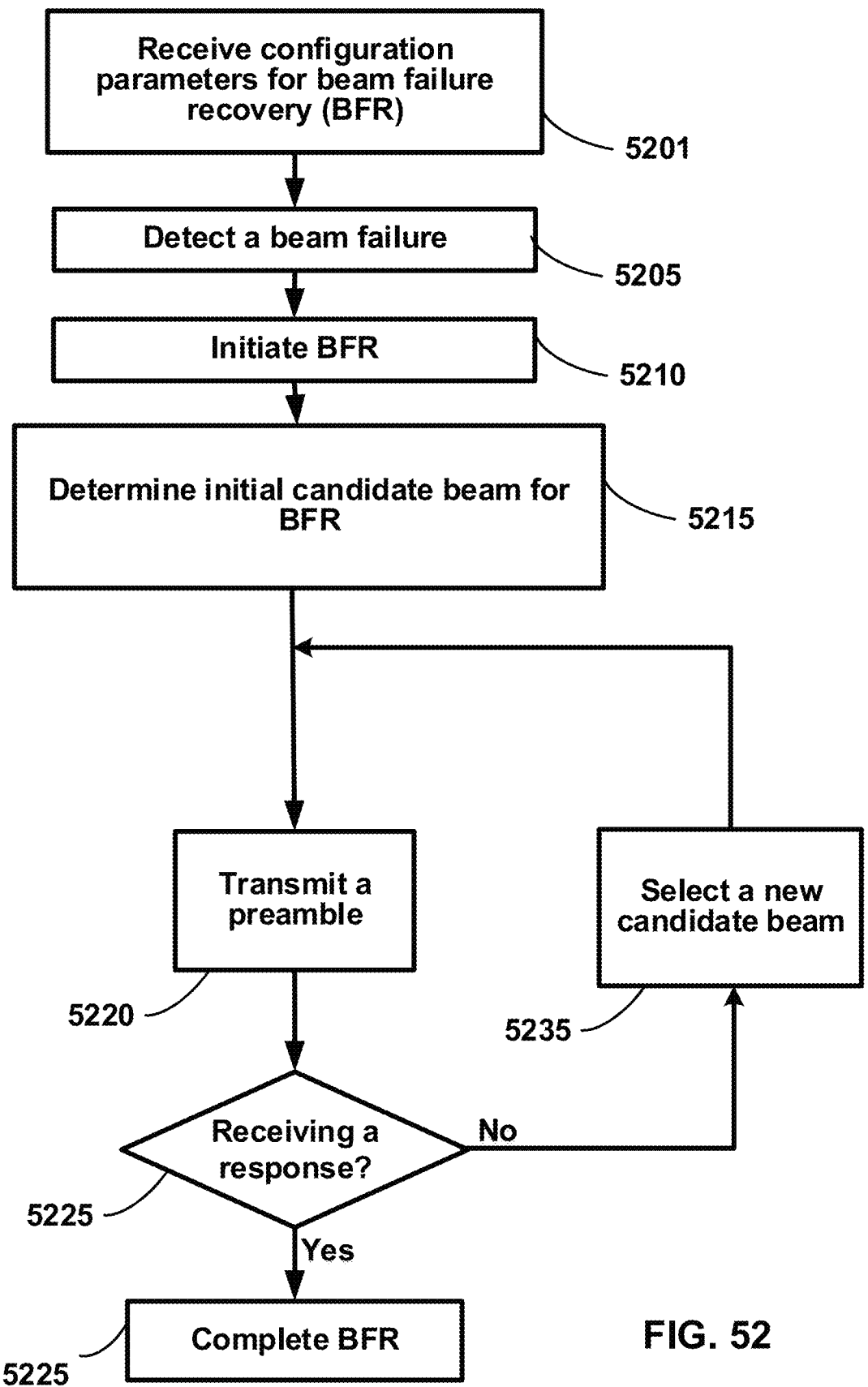
FIG. 52 shows an example of beam failure recovery by a wireless device.

FIG. 52 shows an example of beam failure recovery. A wireless device (e.g., a UE) may receive (e.g., from a base station) configuration parameters for beam failure recovery at step 5201. The configuration parameters may comprise various parameters for beam failure recovery as discussed herein (e.g., candidate beams, thresholds, etc.). At step 5205, the wireless device may detect a beam failure associated with a cell. The wireless device may detect a beam failure based on metrics associated with a beam (e.g., RSRP) following below a threshold. At step 5210, the wireless device may initiate a BFR procedure according to one or more systems or methods described herein.

At step 5215, the wireless device may select an initial candidate beam for BFR. The wireless device may determine the candidate beam based on the configuration parameters. The wireless device may determine the initial candidate beam based on determining a beam with a highest RSRP from a plurality of possible beams. The wireless device may determine the candidate beam by selecting a random beam from the plurality of possible beams. The wireless device may determine the initial candidate beam by selecting a beam with a second-highest RSRP from the plurality of possible beams.

At step 5220, the wireless device may send a preamble via an RS associated with the candidate beam (e.g., the initial candidate beam, or a new candidate beam for a later attempt). At step 5225, the wireless device may determine if a response is received (e.g., using DCI) from a base station. If a response is received, the wireless device may complete BFR at step 5230. If no response is received (e.g., after a time threshold), the wireless device may determine the new candidate beam at step 5235.

At step 5235, the wireless device may determine the new candidate beam. The wireless device may determine the new candidate beam based on a time criterion (e.g., the new candidate beam may be broadcast a threshold time after the initial/previous candidate beam). Beams may be broadcast in a "sweep" by a base station, so beams broadcast close together may be directed in a similar direction. Waiting a threshold time may have the advantage of selecting the new candidate beam directed to a different direction than the initial/previous candidate beam. This may have the advantage of compensating for the wireless device moving at high speed, as beams directed similarly to the initial/previous candidate beam may not be directed toward the wireless device if the wireless device disconnected due to being moved. The wireless device may determine the new candidate beam based on a frequency criterion. In a high interference environment, frequencies for multiple SRs may overlap and cause interference, and/or external interference (e.g., microwaves, cordless home phones, or other wireless devices) may cause interference resulting in beam failure. The wireless device may select the new candidate beam with a frequency that is a threshold distance from a frequency of the initial/previous candidate beam, which may reduce the probability that the new candidate beam will not successfully complete BFR due to interference. The wireless device may use one or more criteria or methods discussed herein to select the new candidate beam (e.g., the wireless device may randomly select the new candidate beam from a group of candidate beams meeting the time criterion and the frequency criterion). The wireless device may then repeat the BFR process with the new candidate beam. If the new candidate beam is unsuccessful, the wireless device may repeat step 5235 to select yet another candidate beam.

Figure 53:
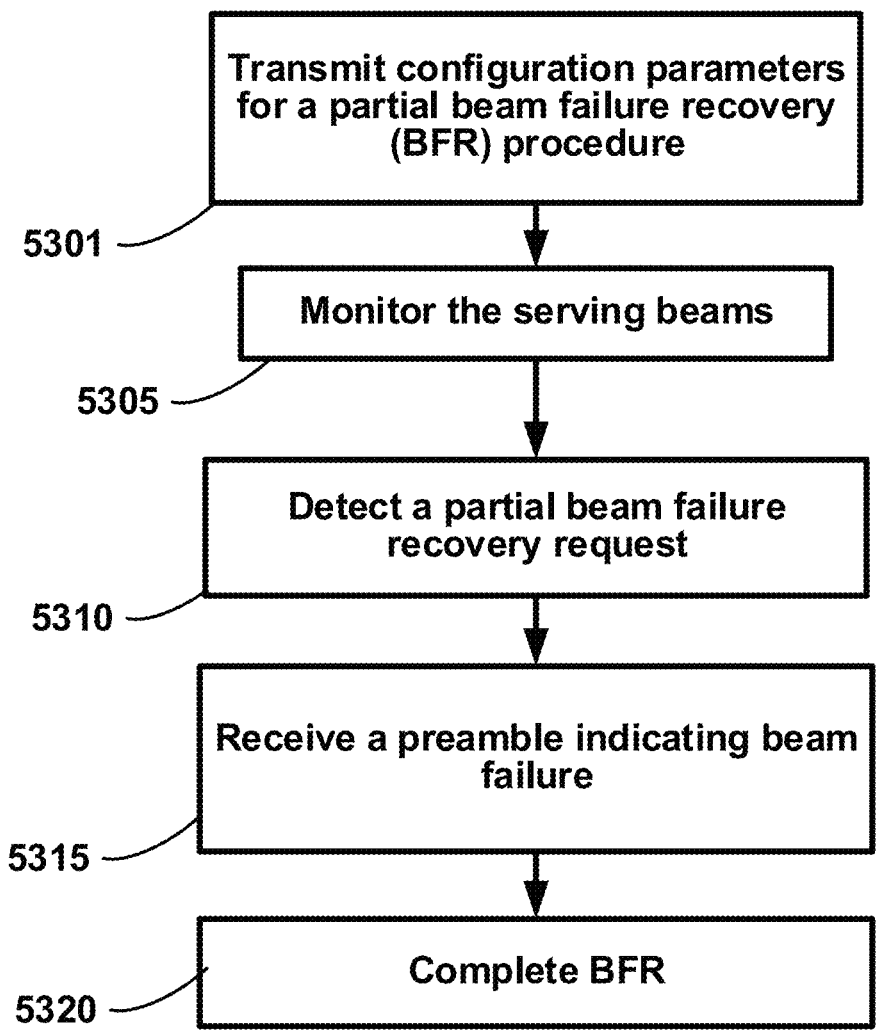
FIG. 53 shows an example of beam failure recovery by a base station.

In FIG. 53 shows an example of beam failure recovery. At step 5301, a base station may send (e.g., to a wireless device) configuration parameters for a beam failure recovery procedure. The configuration parameters may comprise parameters for selecting a candidate beam, at least one RACH resource (which may be associated with the candidate beam), a predetermined threshold for beam failure, and/or other parameters used in beam failure recovery. The parameters for selecting a candidate beam may comprise criteria such as those discussed in FIG. 45 through FIG. 52.

At step 5305, the base station may monitor the plurality of serving beams to determine if a beam failure has occurred. At step 5310, the base station may detect a beam failure recovery request. At step 5315, the base station may receive (e.g., from the wireless device) a preamble indicating the beam failure. The preamble may indicate the failed beam and/or a selected candidate beam for beam failure recovery. The selected candidate beam may be a serving beam with a quality above the predetermined threshold. At step 5320, the base station may complete BFR, such as using any of the systems or methods described herein.

Figure 54:
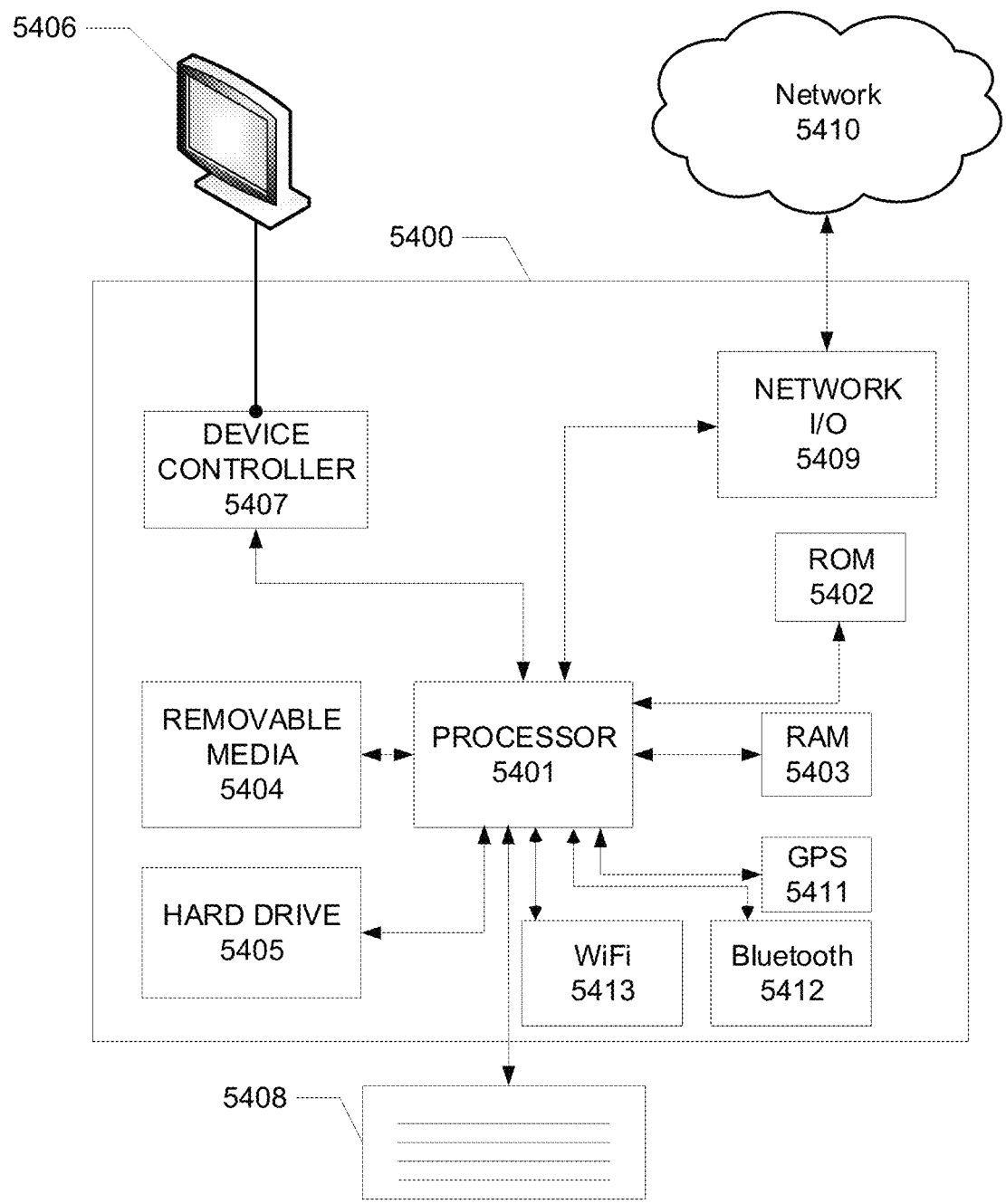
FIG. 54 shows example elements of a computing device that may be used to implement any of the various devices described herein.

FIG. 54 shows general hardware elements that may be used to implement any of the various computing devices discussed herein, including, e.g., the base station 401, the wireless device 406, or any other base station, wireless device, or computing device described herein. The computing device 5400 may include one or more processors 5401, which may execute instructions stored in the random access memory (RAM) 5403, the removable media 5404 (such as a Universal Serial Bus (USB) drive, compact disk (CD) or digital versatile disk (DVD), or floppy disk drive), or any other desired storage medium. Instructions may also be stored in an attached (or internal) hard drive 5405. The computing device 5400 may also include a security processor (not shown), which may execute instructions of one or more computer programs to monitor the processes executing on the processor 5401 and any process that requests access to any hardware and/or software components of the computing device 5400 (e.g., ROM 5402, RAM 5403, the removable media 5404, the hard drive 5405, the device controller 5407, a network interface 5409, a GPS 5411, a Bluetooth interface 5412, a WiFi interface 5413, etc.). The computing device 5400 may include one or more output devices, such as the display 5406 (e.g., a screen, a display device, a monitor, a television, etc.), and may include one or more output device controllers 5407, such as a video processor. There may also be one or more user input devices 5408, such as a remote control, keyboard, mouse, touch screen, microphone, etc. The computing device 5400 may also include one or more network interfaces, such as a network interface 5409, which may be a wired interface, a wireless interface, or a combination of the two. The network interface 5409 may provide an interface for the computing device 5400 to communicate with a network 5410 (e.g., a RAN, or any other network). The network interface 5409 may include a modem (e.g., a cable modem), and the external network 5410 may include communication links, an external network, an in-home network, a provider's wireless, coaxial, fiber, or hybrid fiber/coaxial distribution system (e.g., a DOCSIS network), or any other desired network. Additionally, the computing device 5400 may include a location-detecting device, such as a global positioning system (GPS) microprocessor 5411, which may be configured to receive and process global positioning signals and determine, with possible assistance from an external server and antenna, a geographic position of the computing device 5400.

The example in FIG. 54 may be a hardware configuration, although the components shown may be implemented as software as well. Modifications may be made to add, remove, combine, divide, etc. components of the computing device 5400 as desired. Additionally, the components may be implemented using basic computing devices and components, and the same components (e.g., processor 5401, ROM storage 5402, display 5406, etc.) may be used to implement any of the other computing devices and components described herein. For example, the various components described herein may be implemented using computing devices having components such as a processor executing computer-executable instructions stored on a computer-readable medium, as shown in FIG. 54. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    receiving, by a wireless device, a configuration message indicating:
        a first scheduling request (SR) configuration for first beam failure recovery, wherein the first beam failure recovery is beam failure recovery associated with a first reference signal (RS) while beam failure associated with a second RS is not detected, and wherein the first RS is for beam failure detection of a first beam; and
        a second SR configuration for second beam failure recovery, wherein the second beam failure recovery is beam failure recovery associated with the second RS while beam failure associated with the first RS is not detected, and wherein the second RS is for beam failure detection of a second beam; and
    during a time period in which the first beam and the second beam are configured as serving beams for the wireless device for downlink channel transmission, sending, using the first SR configuration, a beam failure recovery request associated with the first beam, wherein the sending the beam failure recovery request is based on:
        a first measurement of the first RS not satisfying a threshold; and
        a second measurement of the second RS satisfying the threshold.

2. The method of claim 1, further comprising:
    determining a partial beam failure associated with serving beams of a cell, wherein the partial beam failure is determined based on:
        the first measurement of the first RS not satisfying the threshold; and
        the second measurement of the second RS satisfying the threshold.

3. The method of claim 1, wherein the first RS is associated with a first transmission and reception point (TRP) of a cell, and wherein the second RS is associated with a second TRP of the cell.

4. The method of claim 1, further comprising:
    receiving a plurality of reference signals (RSs) for beam failure detection of a cell, wherein the plurality of RSs comprise the first RS and the second RS.

5. The method of claim 1, further comprising:
receiving a plurality of reference signals (RSs) for beam failure detection of a cell, wherein the plurality of RSs comprise the first RS and the second RS; and
after sending the beam failure recovery request, determining, based on measurements of the plurality of RSs not satisfying the threshold, at least one measurement of a candidate beam RS for beam failure recovery of the cell.

6. The method of claim 5, further comprising sending, based on the measurements of the plurality of RSs not satisfying the threshold, a preamble for beam failure recovery of the cell.

7. The method of claim 1, wherein the sending the beam failure recovery request comprises sending, via a physical uplink control channel (PUCCH) resource associated with the second RS, an SR for beam failure recovery associated with the first RS.

8. The method of claim 1, further comprising:
during a second time period in which the first beam and the second beam are configured as serving beams for the wireless device for downlink channel transmission, sending, using the second SR configuration, a beam failure recovery request associated with the second beam, wherein the sending the beam failure recovery request associated with the second beam is based on:
a third measurement of the first RS satisfying a threshold; and
a fourth measurement of the second RS not satisfying the threshold.

9. A method comprising:
sending, by a base station, a configuration message indicating:
a first scheduling request (SR) configuration for first beam failure recovery, wherein the first beam failure recovery is beam failure recovery associated with a first reference signal (RS) while beam failure associated with a second RS is not detected, and wherein the first RS is for beam failure detection of a first beam; and
a second SR configuration for second beam failure recovery, wherein the second beam failure recovery is beam failure recovery associated with the second RS, and wherein the second RS is for beam failure detection of a second beam; and
during a time period in which the first beam and the second beam are configured as serving beams for a wireless device for downlink channel transmission, receiving, using the first SR configuration, a beam failure recovery request associated with the first beam, wherein the beam failure recovery request is based on:
a first measurement of the first RS not satisfying a threshold; and
a second measurement of the second RS satisfying the threshold.

10. The method of claim 9, further comprising:
determining, based on the beam failure recovery request, a partial beam failure associated with serving beams of a cell.

11. The method of claim 9, wherein the first RS is associated with a first transmission and reception point (TRP) of a cell, and wherein the second RS is associated with a second TRP of the cell.

12. The method of claim 9, further comprising:
sending a plurality of reference signals (RSs) for beam failure detection of a cell, wherein the plurality of RSs comprise the first RS and the second RS.

13. The method of claim 9, further comprising:
sending a plurality of reference signals (RSs) for beam failure detection of a cell, wherein the plurality of RSs comprise the first RS and the second RS; and
after receiving the beam failure recovery request, receiving a preamble, wherein the preamble is based on measurements of the plurality of RSs not satisfying the threshold.

14. The method of claim 9, wherein the receiving the beam failure recovery request comprises receiving, via a physical uplink control channel (PUCCH) resource associated with the second RS, an SR for beam failure recovery associated with the first RS.

15. The method of claim 9, further comprising:
during a second time period in which the first beam and the second beam are configured as serving beams for the wireless device for downlink channel transmission, receiving, using the second SR configuration, a beam failure recovery request associated with the second beam, wherein the beam failure recovery request associated with the second beam is based on:
a third measurement of the first RS satisfying a threshold; and
a fourth measurement of the second RS not satisfying the threshold.

16. A wireless device comprising:
one or more processors; and
memory storing instructions that, when executed by the one or more processors, cause the wireless device to:
receive a configuration message indicating:
a first scheduling request (SR) configuration for first beam failure recovery, wherein the first beam failure recovery is beam failure recovery associated with a first reference signal (RS) while beam failure associated with a second RS is not detected, and wherein the first RS is for beam failure detection of a first beam; and
a second SR configuration for second beam failure recovery, wherein the second beam failure recovery is beam failure recovery associated with the second RS while beam failure associated with the first RS is not detected, and wherein the second RS is for beam failure detection of a second beam; and
during a time period in which the first beam and the second beam are configured as serving beams for the wireless device for downlink channel transmission, send, using the first SR configuration, a beam failure recovery request associated with the first beam, wherein sending the beam failure recovery request is based on:
a first measurement of the first RS not satisfying a threshold; and
a second measurement of the second RS satisfying the threshold.

17. The wireless device of claim 16, wherein the instructions, when executed by the one or more processors, cause the wireless device to determine a partial beam failure associated with serving beams of a cell, and wherein the partial beam failure is determined based on:
the first measurement of the first RS not satisfying the threshold; and
the second measurement of the second RS satisfying the threshold.

18. The wireless device of claim 16, wherein the first RS is associated with a first transmission and reception point (TRP) of a cell, and wherein the second RS is associated with a second TRP of the cell.

19. The wireless device of claim 16, wherein the instructions, when executed by the one or more processors, cause the wireless device to receive a plurality of reference signals (RSs) for beam failure detection of a cell, and wherein the plurality of RSs comprise the first RS and the second RS.

20. The wireless device of claim 16, wherein the instructions, when executed by the one or more processors, cause the wireless device to:
receive a plurality of reference signals (RSs) for beam failure detection of a cell, wherein the plurality of RSs comprise the first RS and the second RS; and
after sending the beam failure recovery request, determine, based on measurements of the plurality of RSs not satisfying the threshold, at least one measurement of a candidate beam RS for beam failure recovery of the cell.

21. The wireless device of claim 20, wherein the instructions, when executed by the one or more processors, cause the wireless device to send, based on the measurements of the plurality of RSs not satisfying the threshold, a preamble for beam failure recovery of the cell.

22. The wireless device of claim 16, wherein the instructions, when executed by the one or more processors, cause the wireless device to send the beam failure recovery request by sending, via a physical uplink control channel (PUCCH) resource associated with the second RS, an SR for beam failure recovery associated with the first RS.

23. The wireless device of claim 16, wherein the instructions, when executed by the one or more processors, cause the wireless device to:
during a second time period in which the first beam and the second beam are configured as serving beams for the wireless device for downlink channel transmission, send, using the second SR configuration, a beam failure recovery request associated with the second beam, wherein sending the beam failure recovery request associated with the second beam is based on:
a third measurement of the first RS satisfying a threshold; and
a fourth measurement of the second RS not satisfying the threshold.

24. A base station comprising:
one or more processors; and
memory storing instructions that, when executed by the one or more processors, cause the base station to:
send a configuration message indicating:
a first scheduling request (SR) configuration for first beam failure recovery, wherein the first beam failure recovery is beam failure recovery associated with a first reference signal (RS) while beam failure associated with a second RS is not detected, and wherein the first RS is for beam failure detection of a first beam; and
a second SR configuration for second beam failure recovery, wherein the second beam failure recovery is beam failure recovery associated with the second RS, and wherein the second RS is for beam failure detection of a second beam; and
during a time period in which the first beam and the second beam are configured as serving beams for a wireless device for downlink channel transmission, receive, using the first SR configuration, a beam failure recovery request associated with the first beam, wherein the beam failure recovery request is based on:
a first measurement of the first RS not satisfying a threshold; and
a second measurement of the second RS satisfying the threshold.

25. The base station of claim 24, wherein the instructions, when executed by the one or more processors, cause the base station to determine, based on the beam failure recovery request, a partial beam failure associated with serving beams of a cell.

26. The base station of claim 24, wherein the first RS is associated with a first transmission and reception point (TRP) of a cell, and wherein the second RS is associated with a second TRP of the cell.

27. The base station of claim 24, wherein the instructions, when executed by the one or more processors, cause the base station to send a plurality of reference signals (RSs) for beam failure detection of a cell, and wherein the plurality of RSs comprise the first RS and the second RS.

28. The base station of claim 24, wherein the instructions, when executed by the one or more processors, cause the base station to:
send a plurality of reference signals (RSs) for beam failure detection of a cell, wherein the plurality of RSs comprise the first RS and the second RS; and
after receiving the beam failure recovery request, receive a preamble, wherein the preamble is based on measurements of the plurality of RSs not satisfying the threshold.

29. The base station of claim 24, wherein the instructions, when executed by the one or more processors, cause the base station to receive the beam failure recovery request by receiving, via a physical uplink control channel (PUCCH) resource associated with the second RS, an SR for beam failure recovery associated with the first RS.

30. The base station of claim 24, wherein the instructions, when executed by the one or more processors, cause the base station to:
during a second time period in which the first beam and the second beam are configured as serving beams for the wireless device for downlink channel transmission, receive, using the second SR configuration, a beam failure recovery request associated with the second beam, wherein the beam failure recovery request associated with the second beam is based on:
a third measurement of the first RS satisfying a threshold; and
a fourth measurement of the second RS not satisfying the threshold.

* * * * *